United States Patent
Shoji et al.

(10) Patent No.: US 7,457,550 B2
(45) Date of Patent: Nov. 25, 2008

(54) ABNORMALITY DETERMINING APPARATUS, IMAGE FORMING APPARATUS, COPYING MACHINE, AND INFORMATION OBTAINING METHOD

(75) Inventors: Hisashi Shoji, Kanagawa (JP); Osamu Satoh, Kanagawa (JP); Yasushi Nakazato, Tokyo (JP); Hitoshi Shimizu, Kanagawa (JP); Katsuaki Miyawaki, Kanagawa (JP); Seiji Hoshino, Kanagawa (JP); Satoshi Ouchi, Tokyo (JP); Nekka Matsuura, Kanagawa (JP); Shuji Hirai, Tokyo (JP); Yoshinori Nakagawa, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 86 days.

(21) Appl. No.: 11/333,702

(22) Filed: Jan. 18, 2006

(65) Prior Publication Data
US 2006/0182451 A1    Aug. 17, 2006

(30) Foreign Application Priority Data

| Jan. 18, 2005 | (JP) | ............................. 2005-010754 |
| Jan. 18, 2005 | (JP) | ............................. 2005-010992 |
| Jan. 18, 2005 | (JP) | ............................. 2005-010993 |
| Mar. 16, 2005 | (JP) | ............................. 2005-074929 |
| Mar. 18, 2005 | (JP) | ............................. 2005-079356 |

(51) Int. Cl.
*G03G 15/00* (2006.01)
(52) U.S. Cl. ........................................................ 399/9
(58) Field of Classification Search .................... 399/9, 399/81, 85; 702/185
See application file for complete search history.

(56) References Cited

U.S. PATENT DOCUMENTS

| 7,110,917 | B2 * | 9/2006 | Matsuura et al. ............ 702/185 |
| 2005/0002054 | A1 | 1/2005 | Shoji et al. |
| 2005/0154562 | A1 | 7/2005 | Matsuura et al. |
| 2005/0248801 | A1 | 11/2005 | Miyahara et al. |
| 2005/0286916 | A1 | 12/2005 | Nakazato et al. |

FOREIGN PATENT DOCUMENTS

| JP | 5-100517 | 4/1993 |
| JP | 5-281809 | 10/1993 |
| JP | 7-36323 | 2/1995 |
| JP | 7-104616 | 4/1995 |
| JP | 8-30152 | 2/1996 |

(Continued)

OTHER PUBLICATIONS

U.S. Appl. No. 11/671,475, filed Feb. 6, 2007, Shoji, et al.

(Continued)

*Primary Examiner*—Sandra L Brase
(74) *Attorney, Agent, or Firm*—Oblon, Spivak, McClelland, Maier & Neustadt, P.C.

(57) ABSTRACT

A time point at which a predetermined period elapses since the start of use of a copying machine as a detection subject after factory shipment or repair is obtained. Pieces of set information, which are combinations of various types of information until the time point is reached are sequentially stored to construct a normal set information group. After the time point is reached, presence of abnormality in the copying machine is determined based on the normal set information group and the various types of information obtained.

9 Claims, 24 Drawing Sheets

FOREIGN PATENT DOCUMENTS

| | | |
|---|---|---|
| JP | 8-137344 | 5/1996 |
| JP | 10-19662 | 1/1998 |
| JP | 2000-89623 | 3/2000 |
| JP | 2000-216943 | 8/2000 |
| JP | 2000-270141 | 9/2000 |
| JP | 2001-92688 | 4/2001 |
| JP | 2001-175328 | 6/2001 |
| JP | 2001-356655 | 12/2001 |
| JP | 3330463 | 9/2002 |
| JP | 2003-215986 | 7/2003 |

OTHER PUBLICATIONS

U.S. Appl. No. 11/546,251, filed Oct. 12, 2006, Tsukamoto, et al.
Genichi Taguchi, "Technical Development in the MT System", 2002, cover pp. I-VIII, pp. 1-466 (with partial English translation).
U.S. Appl. No. 11/857,132, filed Sep. 18, 2007, Satoh, et al.
U.S. Appl. No. 11/856,348, filed Sep. 17, 2007, Nakazato, et al.

\* cited by examiner

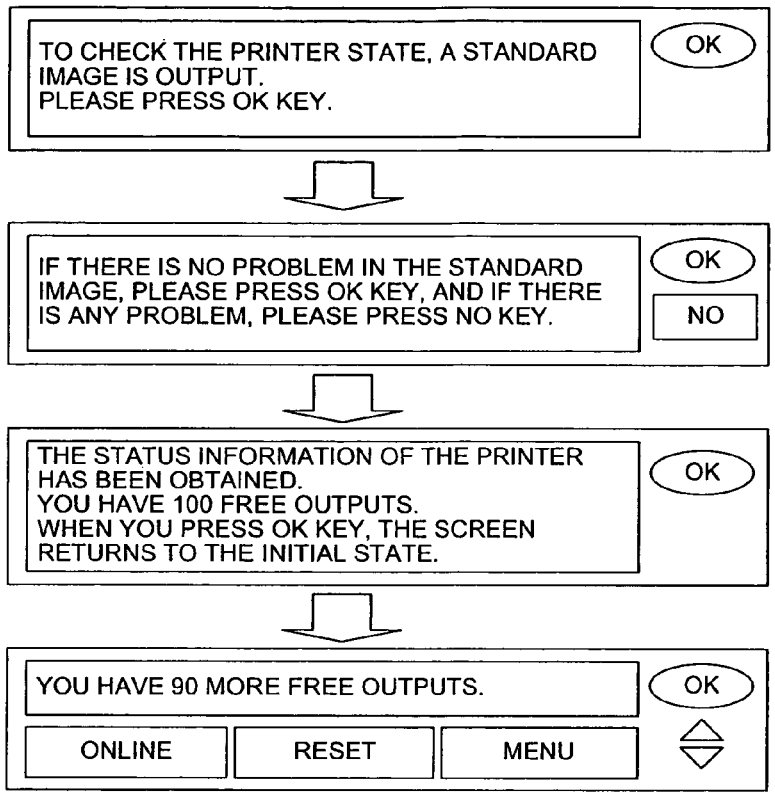
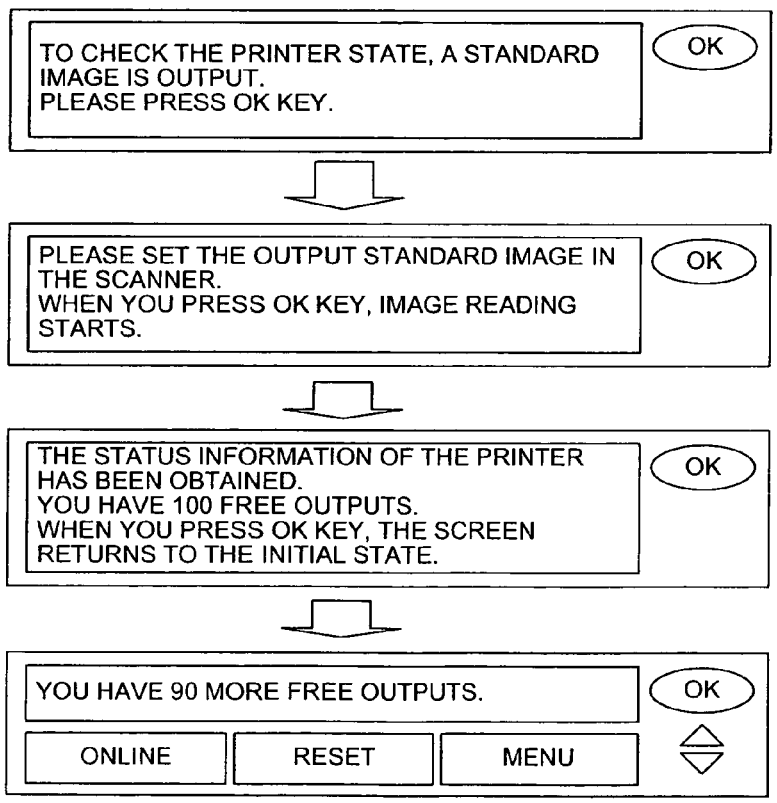

FIG.42

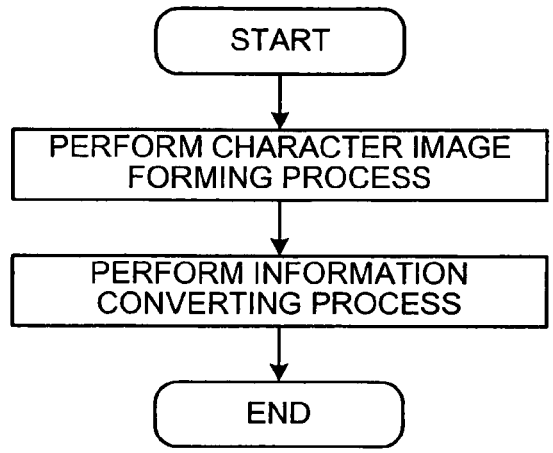

FIG.43

```
              △△△△△△ EXECUTION STATUS REPORT
        MACHINE NUMBER         **********
                   DATE    2004/8/27 12:00
   [OPERATION HISTORICAL INFORMATION]
     COUNTER    TOTAL COUNTER        291653
      VALUE     MONOCHROME COUNTER    79661
                COLOR COUNTER        211992
                MONOCHROME COLOR       5379
                TWO-SIDED
                                     45052
    NUMBER OF           A3           15306
    PHOTOCONDUCTOR      Black       422607
    OPERATION           Yellow      479242
                        Magenta     335248
    NUMBER OF           Cyan        525197
    OPERATION OF        Black       659423
    DEVELOPING DEVICE   Yellow      533794
                        Magenta     533794
    NUMBER OF FIXING    Cyan        533794
    OPERATION
                                   4407015
    NUMBER OF                       388780
    TRANSFER
    OPERATION           Black         3.93
                        Cyan          2.16
    AVERAGE IMAGE       Magenta       1.75
    AREA RATIO          Yellow        1.85

[SENSOR OUTPUT
    INFORMATION]        Black          -23
    DEVELOPMENT         Yellow         -33
    STARTING VOLTAGE    Magenta        -50
```

```
BC000 04 12 CF 04 2C CE 12 66 : 5B
BC008 04 2D CF 30 D2 34 D0 F4 : FA
BC010 0B 30 D0 37 D3 F4 0B 30 : A4
BC018 CC 5E 01 04 F3 CC 04 EE : E0
BC020 CD 04 62 C3 04 C2 C2 04 : 82
BC028 A2 D9 04 90 C2 04 E1 C2 : 78
BC030 04 03 CA 02 5B C1 04 33 : 26
BC038 C3 04 62 C3 04 C2 C2 30 : A4
```

ABNORMALITY DETERMINING APPARATUS, IMAGE FORMING APPARATUS, COPYING MACHINE, AND INFORMATION OBTAINING METHOD

CROSS-REFERENCE TO RELATED APPLICATIONS

The present document incorporates by reference the entire contents of Japanese priority document, 2005-010754 filed in Japan on Jan. 18, 2005, 2005-010993 filed in Japan on Jan. 18, 2005, 2005-010992 filed in Japan on Jan. 18, 2005, 2005-074929 filed in Japan on Mar. 16, 2005 and 2005-079356 filed in Japan on Mar. 18, 2005.

BACKGROUND OF THE INVENTION

1. Field of the Invention

The present invention relates to an abnormality determining apparatus that determines an abnormality in a detection subject, based on obtained results of a plurality of types of information of the detection subject different from each other, and a set information group, which is an aggregate of combination of various types of information stored in an information storage unit.

The invention also relates to an abnormality determining apparatus that determines whether there is an abnormality in the detection subject, based on a detection result of a tone detector that detects tone, i.e., sound, generated from the detection subject. Furthermore, the invention relates to an image forming apparatus such as a copying machine, a printer, and a facsimile machine equipped with such an abnormality determining apparatus.

The invention also relates to an image forming apparatus that forms an image such as an ink image and a toner image on a recording medium such as recording paper, for example, a copying machine, a printer, and a facsimile machine. Furthermore, the invention relates to an information obtaining method for obtaining electronic information stored in the information storage unit of the image forming apparatus.

2. Description of the Related Art

Conventionally, if an apparatus fails users cannot use the apparatus until it is repaired. Accordingly, it is need of a technology to predict whether an apparatus is going to fail before it fails.

On the other hand, various methods have been known in which a plurality of types of information is obtained from a detection subject when the detection subject is in a normal state, to construct a normal data group, and thereafter, the degree of normality of the detection subject is measured based on the normal data group and information obtained from the detection subject. For example, one of the methods is the Maharanobis Taguchi System (MTS) method described in "Technical Developments in the MT system" (by Genichi TAGUCHI, chairman of the publication group, published by Japanese Standards Association). According to the MTS method, set information including a plurality of types of information is first obtained from the detection subject in the normal state. Pieces of set information are then collected to construct the normal data group. Thereafter, when it is desired to check the degree of normality of the detection subject, various types of information are obtained from the detection subject. A Maharanobis distance, which indicates the relative position of the set information in a multidimensional space of the normal data group constructed beforehand, is then determined, and based on the result, the degree of normality of the detection subject is measured. By using the MTS method, slight abnormality of a machine or an apparatus as the detection subject can be detected, and the occurrence of a failure can be predicted beforehand.

However, as in the MTS method, when the presence of abnormality in a machine or an apparatus is determined by using the normal data group constructed beforehand, there is a problem, depending on the obtaining method of the normal data group, in that the determination accuracy is degraded or there is a cost increase. For example, it is assumed here that a certain type of machine product is manufactured in a factory, which is equipped with an abnormality determining apparatus that determines the presence of abnormality by using the MTS method. To determine the presence of abnormality in the product by the abnormality determining apparatus, it is necessary to store the normal data group. However, the normal data group has not been obtained from the just finished product. Therefore, if the time-consuming work to make a trial run of the product for a predetermined period to obtain the normal data group is carried out for each product, a cost increase occurs due to the work. To avoid such a cost increase, if the normal data group is obtained beforehand from a standard machine of the product, the determination accuracy is degraded since there is a specific normal data range in the individual product due to an assembly error of parts or the like, even if the normal data group is obtained from the standard machine of the same standard.

When the presence of abnormality in the detection subject is determined by using the normal data group constructed beforehand as in the MTS method, to increase the determination accuracy as much as possible, it is necessary to construct the normal data group in the following manner. That is, a trial run of the detection subject in the normal state is made under various conditions, to obtain data under conditions as many as possible.

On the other hand, when the integrity of products under development is matured and mass production becomes possible, it is desired to supply the products to the market as soon as possible, from the standpoint of return on investment. However, in many cases, sufficient amount of normal data group has not yet been collected for the products, whose mass production has just been possible. Accordingly, when the presence of abnormality in the products is determined by the abnormality determining apparatus, if supply to the market is hastily done, the determination accuracy can be degraded.

Therefore, the present inventors are currently developing an abnormality determining apparatus that constructs the set information group by obtaining the set information including a plurality of types of information from the product, during the initial operation period of the product after factory shipment. The set information group including various types of set information obtained from the product during the initial operation period, which has high possibility of normal state, can be used as the normal data group used at the time of determining the presence of abnormality. Accordingly, even if a sufficient amount of normal data group has not yet been stored at the time of factory shipment, determination accuracy can be increased by supplementing the data at a shipment destination.

However, in the limited period such as the initial operation period, users do not always use the products under various conditions. The product is used only under a particular condition corresponding to user's preference or the installed environment of the product, for example, in the case of an image forming apparatus, such that the image forming apparatus is frequently used in a high resolution mode at a relatively slow image forming speed. In such a case, the sufficient amount of normal data group cannot be supplemented during the initial operation period.

Furthermore, if a failure occurs in various machines and apparatuses on the market, conventionally, users cannot use the machine or apparatus until the repair has been completed, depending on the content of the failure, which is inconvenient for users. Accordingly, it is desired to find the abnormality in the machine or apparatus at an early stage and handle the failure, to suppress the occurrence of failures and reduce the down time.

On the other hand, various types of abnormality determining apparatuses that determine the presence of abnormality in a detection subject based on a detection result of tone generated from a machine or apparatus as the detection subject have been proposed (see for example, Japanese Patent Application Laid-open No. H10-19662, Japanese Patent Application Laid-open No. 2000-216943, and Japanese Patent Application Laid-open No. 2001-92688).

The present inventors are currently developing an image forming apparatus that determines the presence of abnormality based on a detection result by a vibration detector, to reduce the down time. This image forming apparatus forms an image according to the electrophotographic method in which an electrostatic latent image formed on the surface of a photoconductor, which is a latent image carrier, is developed by a toner to form a visual image, which is then transferred to a transfer body such as transfer paper from the photoconductor. In the image forming apparatus having such a configuration, if the residual toner adhering on the photoconductor surface after having passed through a transfer process is cleaned by a cleaning blade, the cleaning blade deteriorated due to wear can be a cause of various troubles. Accordingly, in the image forming apparatus under development, a vibration detector is fixed to the cleaning blade, so that abnormality in the cleaning blade and around thereof can be detected at an early stage, based on the detection result of vibrations.

In the image forming apparatus under development, if the fixed state of the vibration detector with respect to the cleaning blade varies for each apparatus due to a difference in thickness of an adhesive for fixation, an error occurs in the vibration detection result, thereby decreasing the abnormality determination accuracy. Furthermore, if an abnormal state occurs in a place relatively away from the fixed position of the vibration detector, it is difficult to detect abnormal vibrations by the vibration detector.

On the other hand, in the abnormality determining apparatus that determines the presence of abnormality based on the tone, since a difference in the fixed state of the tone detector hardly affects the detection of the tone, a decrease in the determination accuracy hardly occurs due to the difference. Furthermore, even an abnormal state occurring in a place relatively away from the tone detector can be detected based on the tone detected by the tone detector.

However, various types of tones generated by machines and apparatuses include a tone that changes the state with a change in the temperature, the humidity, and the composition in the air. For example, if a frictional resistance at a contact portion between the cleaning blade and the photoconductor changes due to a change in the temperature and the humidity, the state of tone generated from the contact portion also changes. Thus, if the state of tone changes with environmental variation, it is difficult to determine the presence of abnormality accurately based on the tone.

The present inventors have found that there is the possibility that the normal data group becomes not suitable for performing accurate determination according to circumstances, in the process of developing the abnormality determining apparatus that determines the presence of abnormality in the image forming apparatus by using the MTS method.

For example, in the information obtained from the image forming apparatus, there is one having the normal value different between the summer containing high humidity and the winter containing less humidity. If such information is included as a part of the normal data group, the normal data group becomes unsuitable for determination of abnormality in the summer or in the winter, corresponding to the obtaining period of the information. Furthermore, there is information in which the normal value changes between a plurality of detection subjects, for which the production lots are different from each other, although the reason is not known. If such information is included as a part of the normal data group, the normal data group becomes unsuitable for the image forming apparatus to be detected, in the determination of abnormality with respect to an image forming apparatus as the detection subject in a production lot different from the image forming apparatus, whose information has been obtained.

Conventionally, as a system useful for management companies which offer maintenance service of the image forming apparatus, an image forming apparatus service system (hereinafter, simply "service system") described in Japanese Patent Application Laid-Open No. 2003-215986 is known. When a transitory severe abnormality that cannot be handled by the user such as a severe paper jam occurs in the image forming apparatus, the service system notifies the occurrence to the management company through a communication line such as a phone line. The management company can quickly dissolve the transitory severe abnormality having occurred in the image forming apparatus, by dispatching a maintenance person to the user based on the notification.

The abnormality occurring in the image forming apparatus includes a transitory slight abnormality such as a slight paper jam that can be easily removed by the user, in addition to the transitory severe abnormality. Furthermore, there is a chronic slight abnormality continuously causing a phenomenon different from the normal state, due to deterioration progress of parts, although it does not show a noticeable phenomenon that can be easily recognized. The abnormality occurring in the image forming apparatus further includes a phenomenon, that is, such a failure that the image forming apparatus suffers a fatal damage so that the apparatus cannot be normally operated, resulting from further progress of deterioration of parts, which is a slight abnormality in which unrecognizable phenomenon occurs, for example, difference in paper feed timing relatively increases. Among these abnormalities, the transitory severe abnormality can be dissolved quickly by dispatching the maintenance person to the user, and the transitory slight abnormality can be dissolved quickly by the user without requesting a dispatch of the maintenance person. On the other hand, the chronic slight abnormality resulting from deterioration of parts does not show a noticeable phenomenon that can be easily recognized, therefore, it is left as it is without noticing the problem. Accordingly, if a failure occurs, long time is required for arrangement for renewal parts, thereby causing inconvenience.

Accordingly, the present inventors are currently developing an abnormality determining method that uses a statistical method such as the Maharanobis Taguchi System (MTS) method described in "Technical Developments in MT system" to find the chronic slight abnormality promptly, and predicts an occurrence of a failure beforehand. According to the MTS method, set information including a plurality of types of information, for example, linear velocity information of the photoconductor, information relating to whether the image forming apparatus is set to a high-speed print mode, and output color number information, is obtained from the detection subject in the normal state. The set information is collected for each time series from a detection subject clearly having no abnormality, for example, immediately after factory shipment or maintenance, to construct the normal data group formed of an aggregate of pieces of set information. Thereafter, when it is desired to check whether the detection subject is normal, the set information is obtained again from the detection subject. The Maharanobis distance, which indicates the relative position of the set information in the multi-dimensional space of the normal data group constructed beforehand, is determined for the pieces of information, and based on the result, the degree of normality of the detection subject is measured. By using the MTS method, an occurrence of the chronic slight abnormality in the image forming apparatus as the detection subject can be found quickly, and the occurrence of a failure can be predicted beforehand.

As in the MTS method, when the presence of a chronic slight abnormality is determined by using the normal data group constructed beforehand, it is necessary to obtain the set information as many as possible from the apparatus in the normal state, prior to the determination. To do this, it is desired to add the set information to the normal data group in the following manner. That is, set information obtained under the normal operation state during a period since the start of initial operation immediately after factory shipment until a predetermined period has passed is respectively obtained from a plurality of image forming apparatuses operating at the individual user, and the pieces of information are added to the normal data group.

It is assumed to adopt a configuration such that the set information stored in the user's image forming apparatus is automatically sent to the management company regularly via the communication line, to realize the addition of data. The user may have a concern, for example, not only the set information but also information of a FAX number list and copy image data of confidential documents can be automatically sent, thereby leaking the individual information and confidential information. Furthermore, even if such a method is adopted that when the maintenance person visits the user's place, the set information stored in the apparatus is obtained from a terminal connected to the image forming apparatus, the user may have a similar concern.

Conventionally, the maintenance service has been offered to improve the image forming apparatus after shipment, such that the maintenance person dispatched to the user connects a terminal to the image forming apparatus to update the control program of the apparatus. At this time, the user may have a similar concern.

SUMMARY OF THE INVENTION

It is an object of the present invention to at least solve the problems in the conventional technology.

According to an aspect of the present invention, an abnormality determining apparatus includes an information obtaining unit that obtains a plurality of various types of information relating to a detection subject; an information storage unit that stores therein a set information group formed of an aggregate of pieces of set information, which is a combination of the various types of information; a determining unit that determines presence of abnormality in the detection subject based on the set information group stored in the information storage unit and the various types of information obtained by the information obtaining unit; a timing obtaining unit that obtains a time point at which a predetermined period elapses since any one of start of use of the detection subject after factory shipment and repair of the detection subject; and a controlling unit that provides a control to sequentially store until the time point is reached the various types of information obtained by the information obtaining unit in the information storage unit to construct the set information group, and once the time has passed, causes the determining unit to determine the presence of the abnormality in the detection subject based on the set information group and the various types of information obtained by the information obtaining unit.

According to another aspect of the present invention, an abnormality determining apparatus includes an information obtaining unit that obtains a plurality of various types of information relating to a detection subject; an information storage unit that stores therein a set information group formed of an aggregate of pieces of set information, which is a combination of the various types of information; a determining unit that determines presence of abnormality in the detection subject based on the set information group stored in the information storage unit and the various types of information obtained by the information obtaining unit; and a mode setting information input unit that inputs mode setting information indicative of setting of a storage mode in which a set information storage process is performed for storing the set information obtained by the information obtaining unit in the information storage unit as a part of the set information group, and a determination mode in which an abnormality determination process is performed for determining the presence of abnormality in the detection subject based on the set information group stored in the information storage unit and the various types of information obtained by the information obtaining unit; and a controlling unit that performs a processing corresponding to the mode setting information input by the mode setting information input unit.

According to still another aspect of the present invention, an abnormality determining apparatus includes an information obtaining unit that obtains a plurality of various types of information relating to a detection subject; an information storage unit that stores therein a set information group formed of an aggregate of pieces of set information, which is a combination of the various types of information; a determining unit that determines presence of abnormality in the detection subject based on the set information group stored in the information storage unit and the various types of information obtained by the information obtaining unit; an initial operation period detecting unit that detects whether an initial operation period, which is a period from start of use of the detection subject after factory shipment until a predetermined period, has elapsed; and an information input unit that inputs maintenance completion information indicative of completion of maintenance of the detection subject; and a controlling unit that performs a process for storing the set information obtained by the information obtaining unit in the information storage unit as a part of the set information group is performed during the initial operation period, and upon the initial operation period detecting unit detecting elapsing of the initial operation period, performs a process for storing the set information obtained by the information obtaining unit in a predetermined period after input of the maintenance completion information additionally in the information storage unit as a part of the set information group is performed only for the predetermined period, based on the input of the maintenance completion information to the information input unit.

According to still another aspect of the present invention, an abnormality determining apparatus includes an information obtaining unit that obtains a plurality of various types of information relating to a detection subject; an information storage unit that stores therein a set information group formed of an aggregate of pieces of set information, which is a combination of the various types of information; a determining unit that determines presence of abnormality in the detection subject based on the set information group stored in the information storage unit and the various types of information obtained by the information obtaining unit; an initial operation period detecting unit that detects whether an initial operation period, which is a period from start of use of the detection subject after factory shipment until a predetermined period, has elapsed; an information input unit that inputs checked normal information indicating that no abnormality was found when the detection subject was checked; and a controlling unit that performs a process for storing the set information obtained by the information obtaining unit during the initial operation period in the information storage unit as a part of the set information group, wherein the set information obtained by the information obtaining unit after the initial operation period has passed is stored in the information storage unit separately from the set information group, and when there is an input of the checked normal information, additionally stores the set information stored separately from the set information group since the initial operation period has passed until the input of the checked normal information as a part of the set information group.

According to still another aspect of the present invention, an abnormality determining apparatus includes a tone detector that detects a tone value indicative of sound generated from a detection subject; an environment information detector that detects environmental information indicative of environment around the detection subject; and a determining unit that determines presence of abnormality in the detection subject based on the tone value and the environmental information.

According to still another aspect of the present invention, an abnormality determining apparatus includes an information obtaining unit that obtains various types of information from any one of a detection subject itself and a specimen detection subject having same structure as the detection subject; an information storage unit that stores therein a set information group formed of an aggregate of pieces of set information, which is a combination of the various types of information; an information input unit to input determination supporting information; a determining unit that determines presence of abnormality in the detection subject based on the set information group stored in the information storage unit and the set information obtained by the information obtaining unit; and a controlling unit that, when a plurality of set information groups is stored in the information storage unit, causes the determining unit to select one of the set information groups to be used for determining the presence of abnormality based on the determination supporting information input by the information input unit.

According to still another aspect of the present invention, an abnormality determining apparatus includes an information obtaining unit that obtains various types of information from any one of a detection subject itself and a specimen detection subject having same structure as the detection subject; an information storage unit that stores therein a set information group formed of an aggregate of pieces of set information, which is a combination of the various types of information; a timer unit that records current date; a determining unit that determines presence of abnormality in the detection subject based on the set information group stored in the information storage unit and the set information obtained by the information obtaining unit; and a controlling unit that, when a plurality of set information groups is stored in the information storage unit, causes the determining unit to select one of the set information groups to be used for determining the presence of abnormality based on the date recorded by the timer unit.

According to still another aspect of the present invention, an abnormality determining apparatus includes an information obtaining unit that obtains various types of information from any one of a detection subject itself and a specimen detection subject having same structure as the detection subject; an information storage unit that stores therein a set information group formed of an aggregate of pieces of set information, which is a combination of the various types of information; a determining unit that determines presence of abnormality in the detection subject based on the set information group stored in the information storage unit and the set information obtained by the information obtaining unit; a reception unit that receives the set information group transmitted via a communication line; and an information update unit that updates the set information group stored in the information storage unit with the set information group received by the reception unit.

According to still another aspect of the present invention, an abnormality determining apparatus includes an information obtaining unit that obtains various types of information from any one of a detection subject itself and a specimen detection subject having same structure as the detection subject; an information storage unit that stores therein a set information group formed of an aggregate of pieces of set information, which is a combination of the various types of information; a determining unit that determines presence of abnormality in the detection subject based on the set information group stored in the information storage unit and the set information obtained by the information obtaining unit; a housing that houses the information storage unit and the determining unit in a cavity, the housing including an opening configured to insert the information storage unit in the cavity.

According to still another aspect of the present invention, the abnormality determining apparatus according to above aspects is used to detect presence of abnormality in an image forming apparatus.

According to still another aspect of the present invention, an information obtaining method for obtaining information stored in an information storage unit in an image forming apparatus that forms an image on an image forming body includes the image forming apparatus forming the information as an image of character information; and an information processor not connected to the image forming apparatus converting the image of the character information formed by the image forming apparatus to a character code.

According to still another aspect of the present invention, an image forming apparatus including an image information obtaining unit that obtains image information, an image forming unit that forms an image on an image forming body based on the image information obtained by the image information obtaining unit, a controller that controls the drive of the image forming unit, a status information obtaining unit that obtains the status information indicating the state of the image forming unit, and an information storage unit that stores the status information, wherein the controller is constructed so as to control the image forming apparatus to form the status information stored in the information storage unit as an image of character information regularly or based on an instruction of an operator.

According to still another aspect of the present invention, a copying machine includes an image reader that reads an image and converts the image to image data; an image forming unit that forms an image on an image forming body based on the image data obtained by the image reader; a program storage unit that stores a control program; a controller that controls the drive of the image reader and the image forming unit based on the control program stored in the program storage unit; and a character identifying/converting unit that identifies a character included in the image data obtained by the image reader and converts the character to a character code, wherein a program update unit that updates the control program stored in the program storage unit based on the character code obtained by the character identifying/converting unit is further provided.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 23 is an explanatory diagram of a display screen in an operation display unit of the copying machine, which functions as a part of the abnormality determining apparatus according to Example 7;

FIG. 24 is an explanatory diagram of a display screen in an operation display unit of the copying machine, which functions as a part of the abnormality determining apparatus according to Example 8;

FIG. 42 is a flowchart of the outline of an operation process in an information obtaining method;

FIG. 43 is an explanatory diagram of an example of printout paper in which a character image is formed by the copying machine in a character image forming process in the information obtaining method;

DETAILED DESCRIPTION OF THE PREFERRED EMBODIMENTS

Exemplary embodiments of the present invention are explained below with reference to accompanying drawings.

First Embodiment

Embodiment 1-1

An example where the present invention is applied to an electrophotographic copying machine (hereinafter, "copying machine"), which is an image forming apparatus, is explained.

Figure 1:
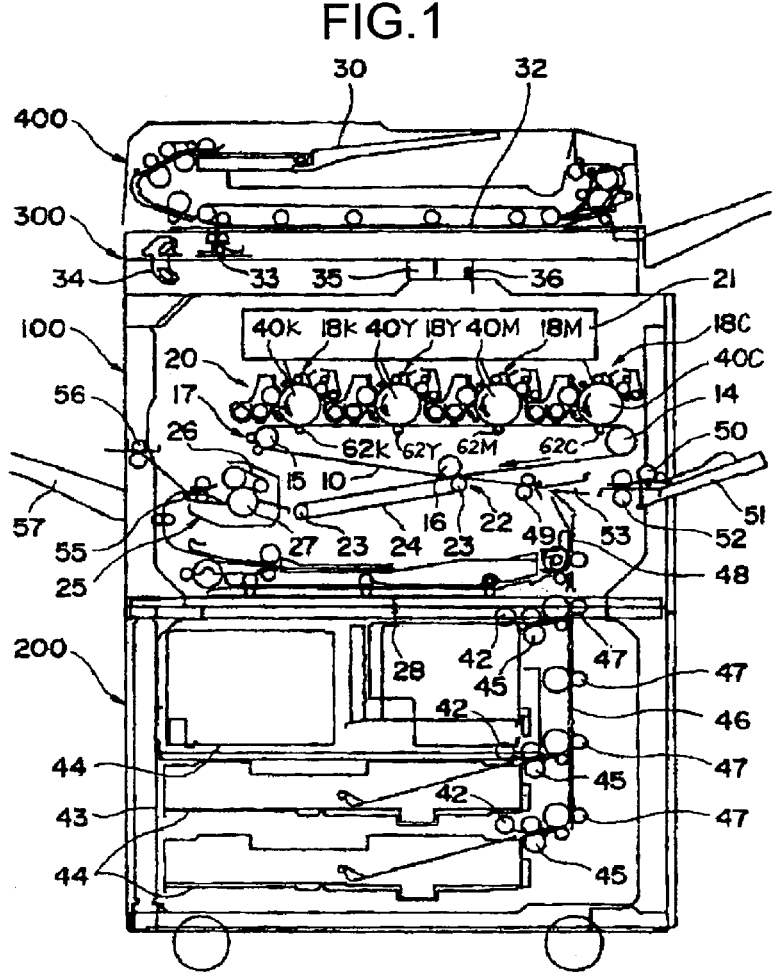
FIG. 1 is an explanatory diagram of a schematic configuration of a copying machine according to an embodiment of the present invention.

The basic configuration of the copying machine according to a first embodiment is explained first. FIG. 1 is a schematic block diagram of the copying machine. The copying machine includes an image forming unit formed of a printer 100 and a paper feed unit 200, a scanner 300, and a document carrying unit 400. The scanner 300 is mounted on the printer 100, and the document carrying unit 400 formed of an automatic document feeder (ADF) is mounted on the scanner 300.

The scanner 300 reads image information of the document placed on a contact glass 32 by a read sensor 36 and sends the read image information to a controller (not shown). The controller controls a laser or an LED (not shown) arranged in an exposure apparatus 21 in the printer 100 based on the image information received from the scanner 300, and irradiates laser write light L toward four drum-like photoconductors 40K, Y, M, and C. An electrostatic latent image is respectively formed on the surfaces of the photoconductors 40K, Y, M, and C, and the latent image is developed to a toner image via a predetermined development process. The suffixes K, Y, M, and C added after reference number indicate the specification for black, yellow, magenta, and cyan.

The printer 100 also includes primary transfer rollers 62K, Y, M, and C, a secondary transfer unit 22, a fixing unit 25, a paper ejection unit, a toner supply device (not shown), and the like, in addition to the exposure device 21.

The paper feed unit 200 includes an automatic paper feeder arranged below the printer 100 and a manual feed unit arranged on the side of the printer 100. The automatic paper feeder includes two paper feed cassettes 44 arranged in multistages in a paper bank 43, a paper feed roller 42 that feeds the transfer paper as a recording medium from the paper feed cassette, a separation roller 45 that separates and sends the fed transfer paper to a paper feed path 46, and the like. The automatic paper feeder also includes carrier rollers 47 that carry the transfer paper to a paper feed path 48. On the other hand, the manual feed unit includes a manual feed tray 51, a separation roller 52 that separates the transfer paper on a manual feed tray 51 toward a manual paper feed path 53 one by one, and the like.

A registration roller pair 49 is arranged near the end of the paper feed path 48 in the printer 100. The registration roller pair 49 receives the transfer paper carried from the paper feed cassette 44 or the manual feed tray 51 and sends the transfer paper to a secondary transfer nip formed between an intermediate transfer belt 10, which is an intermediate transfer body, and the secondary transfer unit 22 at predetermined timing.

In the copying machine, an operator sets a document on a document table 30 of the document carrying unit 400 when making a copy of a color image. Alternatively, the operator sets the document on the contact glass 32 of the scanner 300 by opening the document carrying unit 400, and then closes the document carrying unit 400 to hold the document. The operator then presses a start switch (not shown). The scanner 300 starts to drive after the document is carried onto the contact glass 32 when the document is set in the document carrying unit 400, or immediately when the document is set on the contact glass 32. A first traveling body 33 and a second traveling body 34 start traveling, and the light emitted from a light source of the first traveling body 33 is reflected by the document surface and directed to the second traveling body 34. The reflected light is then reflected by a mirror in the second traveling body 34, reaches the read sensor 36 via an imaging lens 35, and then is read as image information.

When the image information is read in this manner, the printer 100 rotates one of the support rollers 14, 15, 16 by a drive motor (not shown), to allow the other two support rollers to follow the rotation. Thereby, the intermediate transfer belt 10 laid across these rollers in a tensioned condition is moved endlessly. Furthermore, the printer 100 performs a laser write or development process. While rotating the photoconductors 40K, Y, M, and C, the printer 100 forms a monochrome image of black, yellow, magenta, and cyan thereon. These monochrome images are sequentially superposed at the primary transfer nip for the photoconductors K, Y, M, and C, at which the photoconductors K, Y, M, and C abut against the intermediate transfer belt 10, and electrostatically transferred to form a four color superposed toner image. The toner image is formed on the photoconductors 40K, Y, M, and C.

On the other hand, the paper feed unit 200 operates any one of three paper feed rollers to lead the transfer paper to the paper feed path 48 in the printer 100, to feed the transfer paper of a size corresponding to the image information. The transfer paper advancing into the paper feed path 48 is put between the registration roller pair 49, suspended once, and then fed to the secondary transfer nip, which is a contact portion between the intermediate transfer belt 10 and the secondary transfer roller 23 of the secondary transfer unit 22, with the timing matched therewith. At the secondary transfer nip, the four color superposed toner image on the intermediate transfer belt 10 sticks onto the transfer paper synchronously. The four color superposed toner image is secondarily transferred onto the transfer paper due to the influence of the transfer electric field, a nip pressure, or the like formed on the nip, to form a full color image together with the white color of the paper.

The transfer paper passed through the secondary transfer nip is fed to the fixing unit 25 due to the endless movement of the transfer belt 24 in the secondary transfer unit 22. After the full color image is fixed by the action of a welding pressure by a pressure roller 27 in the fixing unit 25 and heating by a heating belt, the transfer paper is ejected onto a paper ejection tray 57 provided on the side of the printer 100 via an ejection roller pair 56.

Figure 2:
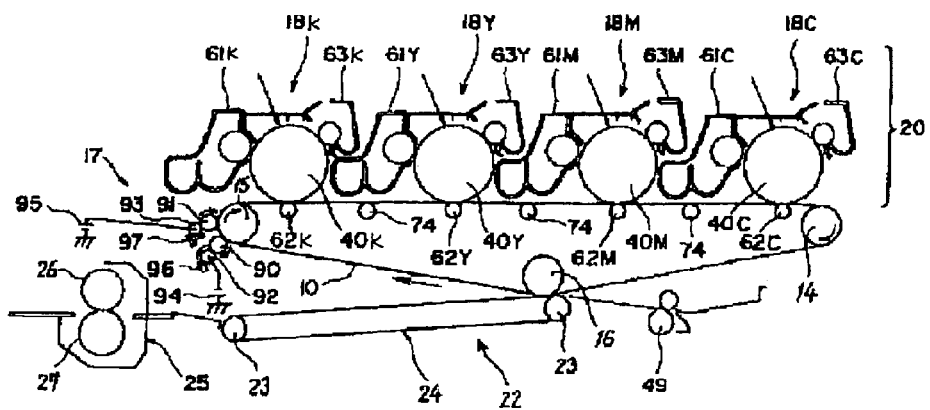
FIG. 2 is an explanatory diagram of a schematic configuration of a printer unit shown in FIG. 1.

FIG. 2 is an enlarged block diagram of the printer 100. The printer 100 includes a belt unit, four process units 18K, Y, M, and C that form each color toner image, the secondary transfer unit 22, a belt cleaning device 17, the fixing unit 25, and the like.

The belt unit endlessly moves the intermediate transfer belt 10 laid across a plurality of rollers in a tensioned condition, with the intermediate transfer belt 10 abutting against the photoconductors 40K, Y, M, and C. At the primary transfer nip for K, Y, M, and C at which the photoconductors 40K, Y, M, and C abut against the intermediate belt 10, the intermediate transfer belt 10 is pressed from the back thereof toward the photoconductors 40K, Y, M, and C by the primary transfer roller 62K, Y, M, and C. A primary transfer bias is applied to these primary transfer rollers 62K, Y, M, and C by a power supply (not shown). Accordingly, a primary transfer electric field for electrostatically moving the toner images on the photoconductors 40K, Y, M, and C toward the intermediate transfer belt 10 is formed at the primary transfer nip for K, Y, M, and C. A conductive roller 74 that comes in contact with the back of the intermediate transfer belt 10 is respectively arranged between the respective primary transfer rollers 62K, Y, M, and C. These conductive rollers 74 prevent the primary transfer bias applied to the primary transfer rollers 62K, Y, M, and C from flowing into the process unit adjacent thereto via a base layer 11 having an intermediate resistance on the back side of the intermediate transfer belt 10.

The process units (18K, Y, M, and C) support the photoconductors (40K, Y, M, and C) and other devices as one unit with respect to a common support body, and are detachable with respect to the printer 100. Taking an example of the process unit 18K for black, the process unit 18K includes a developing device 61K as developing means for developing an electrostatic latent image formed on the photoconductor 40K to a black toner image. The process unit 18K also includes a photoconductor cleaning device 63K that cleans a transfer residual toner adhering on the surface of the photoconductor 40K after having passed through the primary transfer nip. The process unit 18K also includes a discharger (not shown) that discharges the surface of the photoconductor 40K after cleaning, a charger (not shown) that uniformly charges the surface of the photoconductor 40K after discharging, and the like. The process units 18Y, M, and C for other colors have substantially the same configuration, except that the color of the toner to be handled is different. The copying machine has a so-called tandem configuration, in which the four process units 18K, Y, M, and C are arranged opposite to the intermediate transfer belt 10 along the direction of endless movement thereof.

Figure 3:
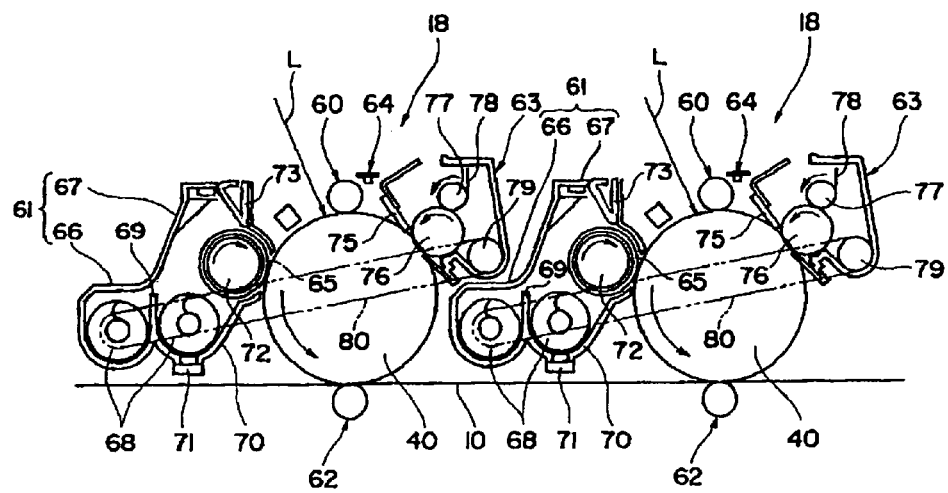
FIG. 3 is an explanatory diagram of a schematic configuration of a tandem unit in the copying machine shown in FIG. 1.

FIG. 3 is a partially enlarged view of a part of a tandem unit 20 formed of the four process units 18K, Y, M, and C. Note that apart from the color of the toner, the four process units 18K, Y, M, C are constituted substantially identically, and hence the suffixes K, Y, M, C attached to each reference numeral have been omitted from the drawing. As shown in FIG. 3, the process unit 18 includes a charger 60 as a charging unit, a developing device 61, a primary transfer roller 62 as a primary transfer unit, a photoconductor cleaning device 63, a discharger 64, and the like around the photoconductor 40.

A drum-like photoconductor constituted by a cylinder made of aluminum or the like, which is coated with an organic photosensitive material having photosensitivity to form a photosensitive layer, is used as the photoconductor 40. An endless belt-like photoconductor can be used. As the charger 60, the one which is rotated by causing a charging roller charged with a charging bias to come in contact with the photoconductor 40 is used. A scorotron charger or the like, which performs charging in a state of non-contact with the photoconductor 40, can be used.

The developing device 61 develops a latent image by using a two-component developer that contains a magnetic carrier and a non-magnetic toner. The developing device 61 includes an agitating unit 66 that carries the two-component developer housed therein while stirring and supplies it to a developing sleeve 65, and a developing device 67 that allows the toner in the two-component developer adhered to the developing sleeve 65 to be transferred to the photoconductors 40K, Y, M, and C.

The agitating unit 66 is provided in a lower position than the developing device 67, and includes two screws 68 arranged parallel to each other, a partition plate 69 provided between these screws, and a toner concentration sensor 71 provided at the bottom of a developing case 70.

The developing device 67 includes the developing sleeve 65 facing the photoconductor 40 through an opening of the developing case 70, a magnetic roller 72 provided in the developing sleeve 65 so as to be unable to rotate, a doctor blade 73, the tip end of which approaches the developing sleeve 65, and the like. A gap between the doctor blade 73 and the developing sleeve 65 is set to about 500 micrometers at the most approached portion. The developing sleeve 65 has a sleeve-form which is capable of non-magnetic rotation. The magnetic roller 72 that does not follow the rotation of the developing sleeve 65 has five magnetic poles of N1, S1, N2, S2, and S3 in the rotation direction of the developing sleeve 65, for example, from the position of the doctor blade 73. These magnetic poles respectively cause a magnetic force to act on the two-component developer on each sleeve at a predetermined position in the rotation direction. Accordingly, the two-component developer transferred from the agitating unit 66 is attracted to and carried on the surface of the developing sleeve 65, and a magnetic brush is formed on the surface of the sleeve along the line of magnetic force.

The thickness of the magnetic brush is restricted to an appropriate thickness as the magnetic brush passes through the position facing the doctor blade 73 with the rotation of the developing sleeve 65, and carried to a developing area facing the photoconductor 40. The magnetic brush is then transferred onto the electrostatic latent image due to the potential difference between the developing bias applied to the developing sleeve 65 and the electrostatic latent image on the photoconductor 40, and thus contributes to development. Furthermore, the magnetic brush is then returned to the developing device 67, where it is removed from the surface of the sleeve by the effect of a repulsive magnetic field between the magnetic poles on the magnetic roller 72, and returned to the agitating unit 66. In the agitating unit 66, the two-component developer is replenished with an appropriate amount of tone based on the detection result of the toner concentration sensor 71. As the developing device 61, the one using a one-component developer that does not include the magnetic carrier can be used, instead of the one using the two-component developer.

While a system whereby a polyurethane rubber cleaning blade 75 is pressed against the photoconductor 40 is used as the photoconductor cleaning device 63, other systems can be employed. In the embodiment, to improve cleanability, the cleaning device 63 includes a contact conductive fur brush 76, the outer peripheral surface of which contacts the photoconductor 40 and which is rotatable in the direction of the arrow in the drawing. A metallic field roller 77 for applying a bias to the fur brush 76 is provided rotatably in the direction of the arrow in the drawing, and the tip end of a scraper 78 is pressed against the field roller 77. The toner removed from the field roller 77 by the scraper 78 falls onto a collection screw 79 and collected.

The photoconductor cleaning device 63 having such a configuration removes the residual toner on the photoconductor 40 by the fur brush 76 rotating in a counter direction with respect to the photoconductor 40. The toner adhered to the fur brush 76 is removed by the field roller 77 which is applied with a bias and rotates in the counter direction to the fur brush 76 while contacting the fur brush 76. The toner adhered to the field roller 77 is cleaned by the scraper 78. The toner collected by the photoconductor cleaning device 63 is brought to one side of the photoconductor cleaning device 63 by the collection screw 79, returned to the developing device 61 by a toner recycling unit 80 and reused.

The discharger 64 is formed of a discharge lamp and the like, and removes the surface potential of the photoconductor 40 by irradiating light. The surface of the discharged photoconductor 40 is uniformly charged by the charger 60 and then subjected to an optical recording process.

The secondary transfer unit 22 is provided below the belt unit in the FIG. 2. In the secondary transfer unit 22, a secondary transfer belt 24 is spanned across two rollers 23 and endlessly moved. One of the two rollers 23 is a secondary transfer roller to which a secondary transfer bias is applied by the power supply (not shown), and the intermediate transfer belt 10 and the secondary transfer belt 24 are put between a roller 16 of the belt unit and the one of the two rollers 23. Thus the two belts move in the same direction while contacting each other at the contact portion, thereby forming a secondary transfer nip. The four color superposed toner image on the intermediate transfer belt 10 is subjected to secondary transfer batchwise onto the transfer paper fed from the registration roller pair 49 to the secondary transfer nip due to the influence of the secondary transfer electric field and the nip pressure, thereby forming a full color image. The transfer paper having passed the secondary transfer nip is separated from the intermediate transfer belt 10, held on the surface of the secondary transfer belt 24, and carried to the fixing unit 25 with the endless movement of the belt. The secondary transfer can be performed by a transfer charger or the like, instead of using the secondary transfer roller.

The surface of the intermediate transfer belt 10 having passed the secondary transfer nip approaches the support position by the support roller 15. The intermediate transfer belt 10 is inserted between the belt cleaning device 17 abutting against front surface (outer loop surface) and the support roller 15 abutting against the rear surface. After the transfer residual toner adhered to the front surface is removed by the belt cleaning device 17, whereupon the belt enters the K, Y, M, C primary transfer nips in succession so that the next four color toner image can be superposed.

The belt cleaning device 17 includes two fur brushes 90 and 91. These fur brushes wipe residual toner from the belt mechanically by having a plurality of filaments rotate in a counter direction to the filling direction of the filaments while contacting the intermediate transfer belt 10. The wiped residual toner is also attracted electrostatically and collected by applying a cleaning bias using a power source (not shown).

The metallic rollers 92 and 93 rotate with respect to the fur brushes 90 and 91 in the forward direction or backward direction, while contacting the fur brushes 90, 91 respectively. Of the two metallic rollers 92, 93, a negative voltage is applied to the metallic roller 92, of the metallic rollers 92 and 93, positioned on the upstream side in the rotation direction of the intermediate transfer belt 10 by a power source 94, whereas a positive voltage is applied to the metallic roller 93 positioned on the downstream side by a power source 95. The tip ends of the blades 96 and 97 contact the respective metallic rollers 92 and 93. By means of this configuration, while the intermediate transfer belt 10 performs an endless motion in the direction indicated by an arrow in the drawing, the upstream side fur brush 90 cleans the surface of the intermediate transfer belt 10. At this time, if −700 Volts, for example, are applied to the metallic roller 92 and −400 Volts are applied to the fur brush 90, first the positive polarity toner on the intermediate transfer belt 10 is transferred electrostatically to the fur brush 90 side. The toner transferred to the fur brush side is then transferred to the metallic roller 92 from the fur brush 90 due to the potential difference, and is scraped off by the blade 96.

A lot of toner is left on the intermediate transfer belt 10 even after the fur brush 90 has removed the toner from the intermediate transfer belt 10 in the manner described above. This toner is charged to negative polarity by the negative bias applied to the fur brush 90. This charging is assumed to be performed by charge injection or discharge. The downstream fur brush 91 is then used to perform cleaning by applying a positive bias, and thus the remaining toner can be removed. The removed toner is transferred to the metallic roller 93 from the fur brush 91 by the potential difference, scraped off by the blade 97, and collected in a tank (not shown).

Although most of the toner is removed from the surface of the intermediate transfer belt 10 by this cleaning performed by the fur brush 91, a little toner still remains. The remaining toner on the intermediate transfer belt 10 is charged to a positive polarity by the positive bias applied to the fur brush 91 as described above. This toner is transferred to the side of the photoconductors 40K, Y, M, C by a transfer electric field applied at the primary transfer position, and collected by the photoconductor cleaning device 63.

Although the registration roller pair 49 is, in many cases, grounded and used, a bias can be applied to remove paper particles of the transfer paper P.

A transfer paper turning device 28 (see FIG. 1) is provided below the secondary transfer unit 22 and the fixing unit 25 in parallel with the aforementioned tandem unit 20. Thus the transfer paper, having finished an image fixing process on one side, is turned over using a switching claw to switch the path of the transfer paper to the transfer paper turning device side, and returned to the secondary transfer nip. A secondary transfer process and a fixing process are then implemented on the image on the other side of the transfer paper, whereupon the transfer paper is ejected onto the paper ejection tray.

In the copying machine having such a configuration, the image forming unit that forms an image on the transfer paper which is a recording medium, is constructed by the respective process units 18K, Y, M, and C, the secondary transfer unit 22, an exposure unit 21, and the like.

The copying machine includes an information obtaining unit that obtains various types of information relating to the state of the constitutional components of the copying machine and phenomena occurring inside. The information obtaining unit is formed of a controller 1, various sensors 2, and an operation display unit 3 shown in FIG. 4. The controller 1 controls the entire copying machine, and includes read only memory (ROM) 1c serving as an information storage unit for storing a control program, a random access memory (RAM) 1b serving as an information storage unit for storing calculation data, control parameters, and the like, and a central processing unit (CPU) 1a serving as a calculation unit. The operation display unit 3 includes a display unit 3a formed of a liquid crystal display that displays character information or the like, and an operation unit 3b that receives information input from an operator by a ten key or the like, and transmits the input information to the controller 1. In the copying machine, the information obtaining unit formed of the controller 1, the various sensors 2 and the operation display unit 3 serves also as the abnormality determining apparatus that determines the presence of abnormality in the copying machine, which is the detection subject, based on the set information group stored in the information storage unit such as the ROM (1c) and the various types of information regularly obtained from the copying machine.

The information obtained by the information obtaining unit in the copying machine includes sensing information, control parameter information, input information, image reading information, and the like. These pieces of information are explained below.

(a) Sensing Information

The items that can be obtained as the sensing information include driving information, various characteristics of the recording medium, developer characteristics, photoconductor characteristics, various states of an electrophotographic process, environmental conditions, and various characteristics of the recorded object. This sensing information is described in outline below.

(a-1) Driving Information

Detect the rotation speed of the photoconductor drum by using an encoder, read the current value of the drive motor, and read the temperature of the drive motor.

Detect the driving state of cylindrical or belt-like rotary components, such as the fusing rollers, the paper transfer rollers, and the drive rollers.

Detect tone generated by driving using a microphone arranged inside or outside of the apparatus.

(a-2) Paper Transport Conditions

Read positions of the front end and the rear end of the transported paper by a transmission type or reflecting type optical sensor or a contact type sensor, detect the occurrence of a paper jam, and read deviations in the transition timing of the front end and the rear end of the paper, and variation in a direction perpendicular to the feed direction.

Determine the traveling speed of the paper according to the detection timing between a plurality of sensors.

Calculate slippage between the paper feed roller and the paper during paper feeding, by comparing a measured value of the roller rotation speed and the shift of the paper.

(a-3) Various Characteristics of a Recording Medium such as Paper

This type of information greatly affects the image quality and the sheet transport stability. The following methods are used to obtain information relating to the paper type.

The paper thickness is obtained by putting the paper between two rollers and detecting a relative positional displacement of the rollers by an optical sensor or the like, or by detecting a displacement magnitude equal to the shift of a member pushed upward when the paper is introduced.

The surface roughness of the paper is obtained by bringing a guide or the like into contact with the surface of the paper before transfer, and detecting vibrations or sliding noise generated by the contact.

The glossiness of the paper is obtained by allowing beams having a specified opening angle to enter at a specified incident angle, and measuring the beams having the specified opening angle reflected in a direction of mirror reflection by a sensor.

The rigidity of the paper is obtained by detecting the volume of deformation (curvature) of the pressed paper.

Determination as to whether the paper is recycled paper is performed by irradiating the paper with ultraviolet rays and detecting the permeability thereof.

Determination as to whether the paper is backing paper is performed by irradiating the paper with light from a linear light source such as a light emitting diode (LED) array and detecting the light reflected from the transfer surface by a solid-state image sensor such as a charge coupled device (CCD).

Determination as to whether the paper is overhead projector (OHP) paper is performed by irradiating the paper with light and detecting the regularly reflected light having a different angle from that of the transmitted light.

The moisture content of the paper is obtained by measuring the absorption of light of infrared rays or micro wave.

The amount of curls is detected by the optical sensor, a contact sensor, or the like.

The electrical resistance of the paper is directly measured by bringing a pair of electrodes (feed rollers or the like) into contact with the recording paper, or the surface potential of the photoconductor or the intermediate transfer body following transfer is measured to estimate the resistance of the recording paper from the measured value.

(a-4) Developer Characteristics

The characteristics of the developer (toner/carrier) in the apparatus fundamentally affect the functions of the electrophotographic process, therefore, are an important factor in the operation and output of the system. It is vital to obtain the information regarding the developer. The following items can be cited as examples of developer characteristics.

Regarding the toner, the charging amount and distribution thereof, fluidity, cohesion, bulk density, electrical resistance, amount of external additives, consumption or residual quantity, and toner concentration (mixing ratio of toner and carrier) can be cited as characteristics.

Regarding the carrier, the magnetic property, thickness of a coating film, and spent amount can be cited as characteristics.

It is usually difficult to detect items such as those described above individually in the image forming apparatus. Therefore, these pieces of information can be detected as an overall characteristic of the developer. The overall characteristic of the developer can be measured according to the following manner.

A test latent image is formed on the photoconductor, developed under predetermined developing conditions and the reflection density (optical reflectance) of the formed toner image is measured.

A pair of electrodes is provided in the developing device, and the relationship between the applied voltage and the current (resistance, dielectric constant, and the like) is measured.

A coil is provided in the developing device, and the voltage-current characteristic (inductance) is measured.

A level sensor is provided in the developing device, and the developer volume is detected. The level sensor can be an optical sensor or a capacitive sensor.

(a-5) Photoconductor Characteristics

The photoconductor characteristics closely relate to the function of the electrophotographic process, like the characteristics of the developer. Examples of information regarding the photoconductor characteristics include a film thickness of the photoconductor, the surface characteristics (frictional coefficient, irregularities), surface potential (before and after each process), surface energy, scattered light, temperature, color, surface position (deflection), linear velocity, potential attenuation speed, electrical resistance, capacitance, surface moisture content, and the like. The following information can be detected in the image forming apparatus.

Variation in the capacitance accompanying a change of the film thickness can be detected by detecting the current flowing from a charging member to the photoconductor, and simultaneously comparing the voltage applied to the charging member with the voltage-current characteristic relating to a preset dielectric thickness of the photoconductor to determine the film thickness.

The surface potential and the temperature can be obtained by a well-known sensor.

The linear velocity is detected by an encoder or the like fitted to rotary shaft of the photoconductor.

Scattered light from the surface of the photoconductor is detected by an optical sensor.

(a-6) State of the Electrophotographic Process

As is well-known, toner image formation through electrophotographic is performed by a succession of processes including uniform charging of the photoconductor, latent image formation (image exposure) by means of laser light or the like, development using toner (coloring particles) carrying an electric charge, transfer of the toner image onto a transfer material (in the case of a color image, this is performed by superposing toner onto an intermediate transfer body or the recording medium, which is the final transfer body, or by means of superposition development onto the photoconductor during development), and fixing of the toner image on the recording medium. The various types of information at each of these stages greatly affect the image and other system output. It is important to obtain these pieces of information to evaluate the stability of the system. Specific examples of the manner for obtaining information relating to the state of the electrophotographic process are listed below.

The charging potential and exposure potential are detected by a well-known surface potential sensor.

The gap between the charging member and the photoconductor during non-contact charging is detected by measuring the amount of light passing through the gap.

The electromagnetic wave caused by charging is perceived by a wideband antenna.

The tone generated by charging.

The exposure intensity.

The exposure light wavelength.

Furthermore, the following can be cited as methods of obtaining various states of the toner image.

The pile height (height of the toner image) is detected by measuring the depth from the vertical direction using a displacement sensor, and measuring shielding length from the horizontal direction using a parallel ray linear sensor.

The toner charging amount is measured by a potential sensor, which measures the potential of an electrostatic latent image on a solid portion and the potential when the latent image has been developed, and determined from the ratio thereof to an adhesion amount calculated by a reflection density sensor in the same location.

Dot fluctuation or scattering is determined by detecting a dot pattern image by using an infrared light area sensor on the photoconductor and area sensors of wavelengths corresponding to each color on the intermediate transfer body, and then implementing appropriate processing.

The offset amount (after fixing) is read by optical sensors in locations corresponding to the surface of the recording paper and the surface of the fixing roller respectively, and determined by comparing the two obtained sensor values.

The remaining transfer amount is determined by disposing optical sensors subsequent to the transfer step (on the PD and the belt) and measuring the amount of reflected light from the remaining transfer pattern following the transfer of a specific pattern.

Color unevenness during superposition is detected by a full color sensor that detects the surface of the recording paper following fixing.

(a-7) Characteristics of Formed Toner Image

Image density and color are detected optically (by either reflected light or transmitted light, the projection wavelength is selected according to the color). To obtain density and single color information, this detection can be performed on the photoconductor or intermediate transfer body; however, to measure a color combination, such as color nonuniformity, the detection must be performed on the paper.

Tone is determined using an optical sensor by detecting the reflection density of a toner image formed on the photoconductor or a toner image transferred onto a transfer body at each gradation level.

Definition is detected using a monocular sensor with a small spot diameter or a high resolution line sensor by reading a developed or transferred image to determine a repeated line pattern.

Graininess (roughness) is determined by the same method used to detect the definition, by reading a halftone image and calculating the noise component.

Registration skew is determined by providing an optical sensor at each end of the sub scanning direction following registration, and measuring the difference between the ON timing of the registration rollers and the detection timing of the two sensors.

Out of color registration is determined by detecting the edge portions of a superposed image on the intermediate transfer body or recording paper using a monocular small-diameter spot sensor or a high resolution line sensor.

Banding (density unevenness in the feed direction) is detected by measuring density unevenness in the main scanning direction using a small-diameter spot sensor or a high resolution line sensor, and measuring the signal quantity at a specific frequency.

Glossiness (unevenness) is detected by providing a piece of recording paper formed with a uniform image so as to be scanned by a regular reflection-type optical sensor.

Fogging is detected using a method of reading an image background portion using an optical sensor that scans a comparatively wide region on the photoconductor, intermediate transfer body, or recording paper, or a method of obtaining image information for each area of the background region using a high resolution area sensor, and counting the number of toner particles in the image.

(a-8) Physical Characteristics of Printed Objects in the Image Forming Apparatus Image deletion/fading and the like are determined by scanning a toner image on the photoconductor, intermediate transfer body, or recording paper using an area sensor, and subjecting the obtained image information to image processing.

Scattering is determined by scanning an image on the recording paper using a high resolution line sensor or an area sensor, and calculating the amount of toner scattered around the periphery of the pattern portion.

Rear end white spots and solid cross white spots are detected by a high resolution line sensor on the photoconductor, intermediate transfer body, or recording paper.

Curling, rippling, and folding of the recording paper are detected by a displacement sensor. It is effective to dispose the sensor in a location near to the both ends of the recording paper to detect folding.

Contamination and flaws on the cross-cut surface are detected by an area sensor provided vertically in the paper ejection tray by capturing an image of and analyzing the cross-cut surface when a certain amount of ejected paper has accumulated.

(a-9) Environmental Conditions

To detect temperature, a thermocouple system that extracts as a signal a thermoelectromotive force generated at a contact point joining two different metals or a metal and a semiconductor, a resistivity variation element using temperature-based variation in the resistivity of a metal or semiconductor, a pyroelectric element in which, with a certain type of crystal, the charge in the crystal is polarized with an increase in temperature to generate a surface potential, a thermomagnetic effect element that detects a change in the magnetic property according to temperature, or the like can be employed.

To detect humidity, an optical measurement method for measuring the optical absorption of $H_2O$ or an OH group, a humidity sensor that measures variation in the electrical resistance of a material due to water vapor adsorption, or the like can be employed.

Various gases are detected by measuring a change in the electrical resistance of an oxide semiconductor basically accompanying gas adsorption.

To detect airflow (direction, flow speed, gas type), an optical measurement method or the like can be used, and an air-bridge type flow sensor, which enables a reduction in the size of the system due to its small size, is particularly useful.

To detect air pressure and pressure, methods such as using a pressure sensitive material, or measuring the mechanical displacement of a membrane can be employed. Similar methods can be used to detect oscillation.

(b) Control Parameter Information

The operation of the image forming apparatus is determined by the controller, hence it is effective to use the input/output parameters of the controller directly.

(b-1) Image Formation Parameters

These are direct parameters output as a result of a calculation process performed by the controller for the purpose of image formation, such as ones listed below.

Set values of the process conditions set by the controller, for example, the charging potential, developing bias value, fixing temperature set value, and the like.

Similarly, set values of various image processing parameters for halftone processing, color correction, and the like.

Various parameters set by the controller to operate the apparatus, for example, the paper transport timing, the execution period of a preparatory mode prior to image formation, and the like.

(b-2) User's Operation History

The frequency of various operations selected by the user, such as the number of colors, number of sheets, image quality instructions.

The frequency of paper size selected by the user.

(b-3) Power Consumption

The total power consumption over the entire period or a specific time unit (one day, one week, one month, etc.), or the distribution, variation (derivative), and cumulative value (integral) thereof.

(b-4) Information Regarding Consumption of Consumables

Usage of the toner, the photoconductor, and the paper over the entire period or a specific time unit (one day, one week, one month, etc.), or the distribution, variation (derivative), and cumulative value (integral) thereof.

(b-5) Information Regarding the Occurrence of a Failure

The frequency with which a failure occurs (by type) over the entire period or a specific time unit (one day, one week, one month, etc.), or the distribution, variation (derivative), and cumulative value (integral) thereof.

(c) Input Image Information

The following information can be obtained from image information transmitted from a host computer as direct data or image information obtained by reading an original image by a scanner and subjecting the image to image processing.

The cumulative number of color pixels is determined by counting image data by GRB signal for each pixel.

By using a method such as that described in Japanese Patent Publication No. 2621879, for example, an original image can be divided into characters, halftone dots, photographs, and background, and thus the ratio of the character portion, halftone portion, and the like can be determined. The ratio of color characters can be determined in a similar manner.

By counting the cumulative value of the color pixels in each of a plurality of regions partitioned in the sub scanning direction, the toner consumption distribution in the sub scanning direction can be determined.

The image size is determined according to image size signals generated by the controller or the distribution of color pixels in the image data.

The character type (size, font) is determined from attribute data of the characters.

Specific methods of obtaining various types of information in the copying machine are explained next.

(1) Temperature

The copying machine includes a temperature sensor using a resistance variation element, which has the simple principles and configuration and can reduce the size, to obtain temperature information.

(2) Humidity

A humidity sensor which can be reduced to a small size is useful. The basic principle thereof is that when water vapor is adsorbed to a moisture-sensitive ceramic, ion conduction is increased by the adsorbed water such that the electrical resistance of the ceramic decreases. The moisture-sensitive ceramic material is a porous material such as an alumina-based ceramic, apatite-based ceramic, or $ZrO_2$—MgO based ceramic.

(3) Oscillation

The oscillation sensor is basically the same as a sensor that measures air pressure and pressure, and a sensor using silicon, which can be reduced to an extremely small size and installed in the system easily, is particularly useful. The motion of an oscillator manufactured on a thin silicon diaphragm can be measured by measuring a volumetric change between the oscillator and a counter electrode provided opposite to the oscillator, or using the piezoresistance effect of the Si diaphragm itself.

(4) Toner Concentration (for Four Colors)

The toner concentration is detected for each color. A known sensor can be used as the toner concentration sensor. For example, the toner concentration can be detected by using a sensing system disclosed in Japanese Patent Application Laid-Open No. H6-289717, which measures variation in the magnetic permeability of the developer in developing device.

(5) Uniform Charging Potential of Photoconductor (for Four Colors)

The uniform charging potential is detected in the photoconductors (40K, Y, M, C) for each color. A known surface potential sensor that detects the surface potential of an object can be used.

(6) Post-Exposure Potential of Photoconductor (for Four Colors)

The surface potential of the photoconductors 40K, Y, M, C following optical recording is detected in the same manner as that described in (5).

(7) Colored Area Ratio (for Four Colors)

The colored area ratio is determined for each color from the ratio between the total cumulative value of the pixels to be colored and the total cumulative value of all pixels, which is learned from the input image information, and the colored area ratio is used.

(8) Developing Toner Amount (for Four Colors)

The toner adhesion amount per unit area on each of the color toner images developed on the photoconductors 40K, Y, M, C is determined based on the optical reflectance produced by a reflection type photosensor. The reflection type photosensor irradiates the object with LED light, and detects the reflected light by a photodetector. A correlation is established between the toner adhesion amount and the optical reflectance, hence the toner adhesion amount can be determined based on the optical reflectance.

(9) Inclination of Front End Position of Paper

A pair of optical sensors is disposed at a point on the paper feed path from the feed roller of the paper feed unit 200 to the secondary transfer nip, which detects the transfer paper at both ends in an orthogonal direction to the feed direction, and thus the both ends of the transported transfer paper near the front end thereof are detected. The two optical sensors are used to measure the time required for the paper to pass through, using the time at which a drive signal of the feed roller is issued as a reference, and the inclination of the transfer paper with respect to the feed direction is determined based on the time lag.

(10) Paper Ejection Timing

The transfer paper is detected by the optical sensor after passing through the ejection roller pair (56 in FIG. 1). Similarly in this case, measurement is performed, with the time at which the drive signal of the feed roller is issued being used as a reference.

(11) Total Current of Photoconductor (for Four Colors)

The current flowing out to earth from the photoconductors 40K, Y, M, C is detected. The current can be detected by providing a current measuring unit between the photoconductor substrate and the ground terminal.

(12) Driving Power of Photoconductor (for Four Colors)

The driving power (current×voltage) consumed by the driving source (motor) of the photoconductors during driving is detected by an ammeter, a voltmeter, or the like.

A characteristic configuration of the copying machine is explained next.

The copying machine is designed to determine whether an abnormality has occurred in the apparatus by obtaining a Mahalanobis distance using the MTS method based on set information including a plurality of types of information obtained by the information obtaining unit. To obtain the Mahalanobis distance, it is necessary to construct a set information group, which is an aggregate of pieces of set information obtained from the copying machine in the normal state. However, construction of the set information group is carried out at the time of operation based on user's instruction, at the shipment destination of the copying machine. In the copying machine, the controller 1 functions as the determining unit that determines the presence of abnormality in the copying machine as the detection subject.

Figure 5:
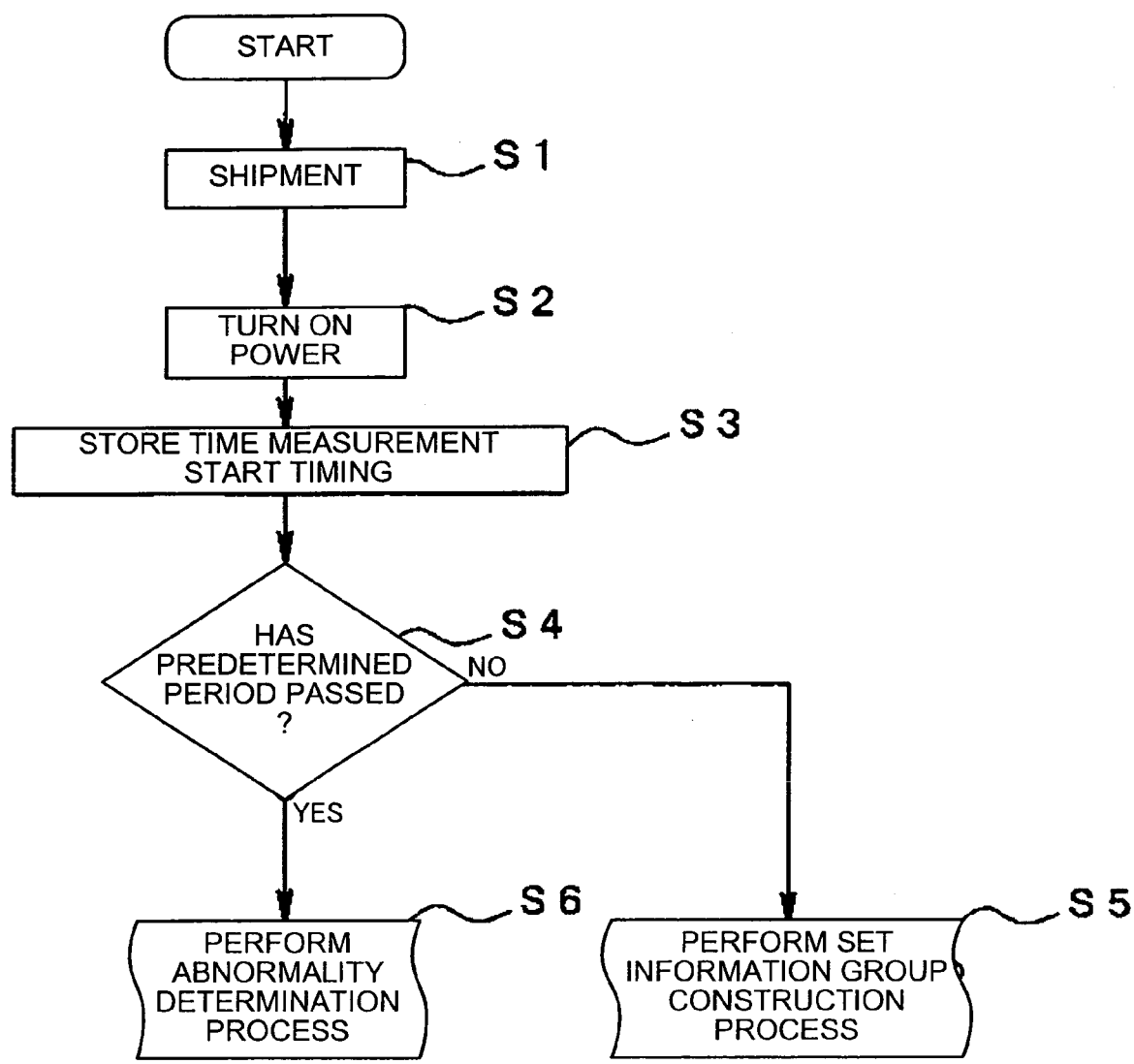
FIG. 5 is a flowchart of an outline of data processing performed by an abnormality determining apparatus in the copying machine shown in FIG. 1.

FIG. 5 is a flowchart of an outline of data processing performed by an abnormality determining apparatus in the copying machine. After the copying machine is shipped from the factory (step 1: hereinafter, step is described as S), when the main power supply for the copying machine is turned on initially by the user (S2), the CPU (1a), which is a part of the abnormality determining apparatus, stores the point in time as the time measurement start timing in the RAM 1b (S3). Time passage determining parameters required for determining that a certain period of time has passed since the time measurement start timing are stored in the RAM 1b in advance before factory shipment. The time passage determining parameters include an elapsed time threshold, an elapsed day threshold, an elapsed month threshold, a threshold of printed number of sheets, and an operation time threshold. The period from the time measurement start timing until the certain time period determined based on these time passage determining parameters has passed, that is, until a predetermined period has passed, a set information group construction process is performed (S4, No, and S5). During this predetermined period, user-friendliness does not change as seen from the user of the copying machine, and stable state data are accumulated. In the set information group construction process performed during such a predetermined period, the set information, which is a combination of various types of information that can be obtained by the information obtaining unit, is obtained during a print job, and stored in the RAM 1b as the information storage unit, as a part of the set information group. When the predetermined period has passed since the time measurement start timing (S4, Yes), an abnormality determination process is performed instead of the set information group construction process (S6). In this abnormality determination process, the Mahalanobis distance is obtained based on the set information formed of pieces of information obtained by the information obtaining unit during the print job after the predetermined period has passed, and the set information group stored in the RAM 1b. Based on the obtained Mahalanobis distance, it is determined whether there is an abnormality in the copying machine. In this control, the CPU 1a functions as a timing obtaining unit that obtains the timing when the predetermined period has passed after the factory shipment or since use of a repaired detection subject is started.

Table 1 shown below is one example of an obtained data table constructed in the set information group construction process. This obtained data table shows an example where set information including k types of information is obtained in n sets, to form an inverse matrix.

TABLE 1

| Group number (i) | Type (j) of information | | | |
|---|---|---|---|---|
| | (1) | (2) | ... | (k) |
| 1 | $y_{11}$ | $y_{12}$ | ... | $y_{1k}$ |
| 2 | $y_{21}$ | $y_{22}$ | ... | $y_{2k}$ |
| . | . | . | ... | . |
| . | . | . | | . |
| . | . | . | | . |
| n | $y_{n1}$ | $y_{n2}$ | ... | $y_{nk}$ |
| Mean value ($\bar{y}$) | $\bar{y}_k$ | $\bar{y}_2$ | ... | $\bar{y}_k$ |
| Standard deviation ($\sigma$) | $\sigma_1$ | $\sigma_2$ | ... | $\sigma_k$ |

In the set information group construction process, at first, k types of information constituting the first set of set information ($y_{11}, y_{12}, \ldots, y_{1k}$) are respectively obtained by the information obtaining unit, and stored in the RAM 1b as data of the first row in the data table. Subsequently, k types of information constituting the second set of set information ($y_{21}, y_{22}, \ldots, y_{2k}$) are respectively obtained by the information obtaining unit, and stored in the RAM 1b as data of the second row in the data table. Thereafter, the third to the n-th set of set information are sequentially obtained accompanying the print job, and stored as the data in the data table. Immediately before the predetermined period passes, the n-th set information is obtained, and stored in the RAM 1b as the data of the n-th row in the data table. After the predetermined period has passed, an average and a standard deviation ($\sigma$) of the respective n groups are determined for the k types of information constituting each set of set information and stored in the RAM as data on the n+1 and n+2 rows.

After the predetermined has passed, and once the obtained data table construction process is complete, an inverse matrix construction process is carried out immediately. In the inverse matrix construction process, an information normalization process, a correlation coefficient calculation process, and an inverse matrix transformation process are performed.

In the information normalization process in the inverse matrix construction process, a normalized data table as shown in Table 2 below is constructed based on the obtained data table shown in Table 1.

TABLE 2

| Group number (i) | Type (j) of information | | | |
|---|---|---|---|---|
| | (1) | (2) | ... | (k) |
| 1 | $Y_{11}$ | $Y_{12}$ | ... | $Y_{1k}$ |
| 2 | $Y_{21}$ | $Y_{22}$ | ... | $Y_{2k}$ |
| . | . | . | ... | . |
| . | . | . | | . |
| . | . | . | | . |
| n | $Y_{n1}$ | $y_{n2}$ | ... | $Y_{nk}$ |
| Mean value ($\bar{y}$) | 0 | 0 | ... | 0 |
| Standard deviation ($\sigma$) | 1 | 1 | ... | 1 |

Data normalization refers to a process for transforming absolute value information of the obtained information into variable information. The normalized data of each piece of information is calculated based on the following relational expression. Note that in the following expression, the symbol i denotes any one of the n sets of set information. The symbol j denotes any one of the k types of information.

$$Y_{ij} = (y_{ij} - \bar{y}_j)/\sigma_j \quad (1)$$

Once this information normalization process is complete, the correlation coefficient calculation process is performed. In the correlation coefficient calculation process, a correlation coefficient $r_{pq}$ ($r_{pq}$) is calculated based on the following equation (3) for all possible combinations ($_kC_2$ variants) of two different types of the k types of normalized data in the n sets of normalized data groups.

$$r_{pq} = r_{qp} = \frac{\sum_{i=1}^{n}(Y_{ip} \times Y_{iq})}{\sqrt{\sum_{i=1}^{n}(Y_{ip})^2 \times \sum_{i=1}^{n}(Y_{iq})^2}} \quad (2)$$

When the correlation coefficient $r_{pq}$ ($r_{pq}$) has been calculated for all of the combinations, k×k correlation coefficient matrices R having 1 as its diagonal element and the correlation coefficient $r_{pq}$ as the remaining elements of the rows p and columns q are constructed. The content of the correlation coefficient matrix R is as shown in the following equation.

$$R = \begin{pmatrix} 1 & r_{12} & r_{13} & \ldots & r_{1k} \\ r_{21} & 1 & r_{23} & \ldots & r_{2k} \\ r_{31} & r_{32} & 1 & \ldots & r_{3k} \\ \ldots & \ldots & \ldots & \ldots & \ldots \\ r_{k1} & r_{k2} & r_{k3} & \ldots & 1 \end{pmatrix} \quad (3)$$

Once this correlation coefficient calculation process is complete, the matrix transformation process is implemented. By means of this matrix transformation process, the correlation coefficient matrix R shown in equation 3 is transformed into an inverse matrix. A ($R^{-1}$) shown in the following equation.

$$A = \begin{pmatrix} a_{11} & a_{12} & a_{13} & \ldots & a_{1k} \\ a_{21} & a_{22} & a_{23} & \ldots & a_{2k} \\ a_{31} & a_{32} & a_{33} & \ldots & a_{3k} \\ \ldots & \ldots & \ldots & \ldots & \ldots \\ a_{k1} & a_{k2} & a_{k3} & \ldots & a_{kk} \end{pmatrix} = R^{-1} \quad (4)$$

In the copying machine, the inverse matrix A is constructed by the series of processes described above, including the information normalization process, the correlation coefficient calculation process, and the matrix transformation process, prior to the execution of the abnormality determination process, after the set information group construction process for constructing the obtained data table, as the set information group shown in Table 1, has been performed. The inverse matrix A is then stored in the RAM 1b.

When the inverse matrix A is constructed, the abnormality determination process is performed for determining the presence of abnormality in the copying machine. In the abnormality determination process, the Mahalanobis distance D on the multidimensional space produced by the inverse matrix A is calculated based on the following equation for the set information formed of all or a partial combination of the various types of information obtained regularly by the information obtaining unit for each print job.

$$D^2 = \frac{1}{k}\sum_{p=1}^{k}\sum_{q=1}^{k} a_{pq} Y_p Y_q \qquad (5)$$

Figure 6:
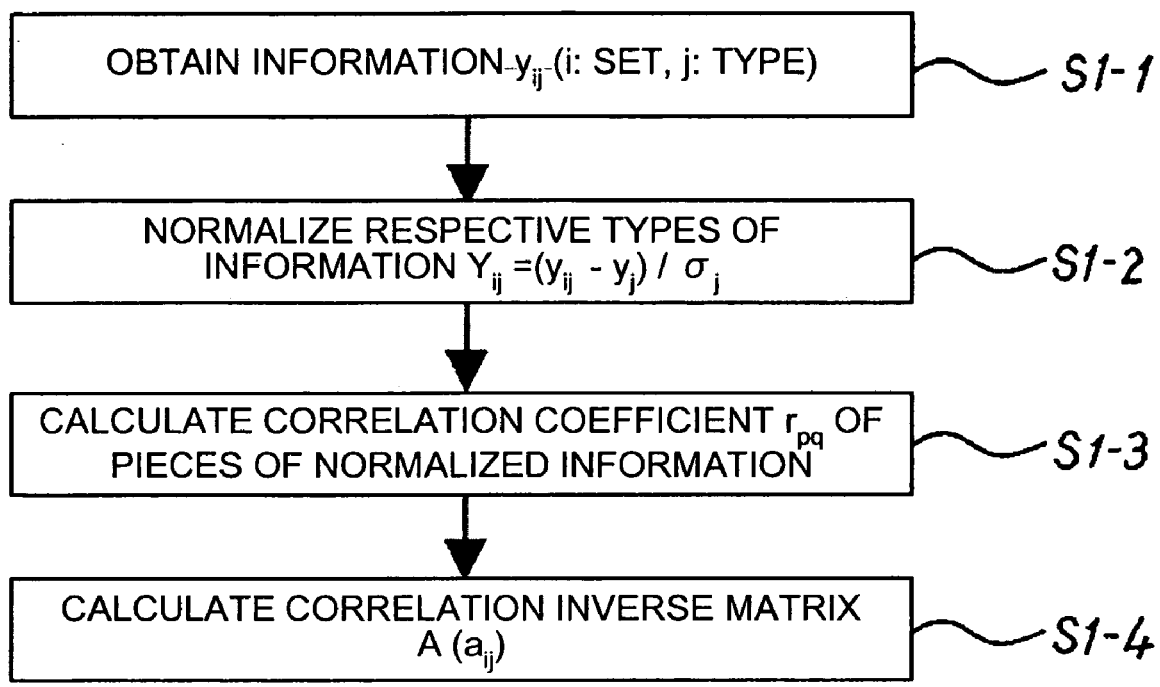
FIG. 6 is a flowchart of a series of processes from a set information group construction process to a matrix transformation process performed by the copying machine shown in FIG. 1.

FIG. 6 is a flowchart of a series of processes from the set information group construction process to the matrix transformation process. In FIG. 6, k types of information relating to the state of the copying machine are obtained for n sets, during the operation of the copying machine (step 1-1: hereinafter, step is described as S). Subsequently, a mean value and a standard deviation s based on the relational expression 1 are calculated for each type (j) of information, and based on the calculation result, a normalized data table is constructed (S1-2). After the correlation coefficient matrix R is constructed based on the normalized data table (S1-3), the matrix R is transformed into the inverse matrix A (S1-4).

Figure 7:
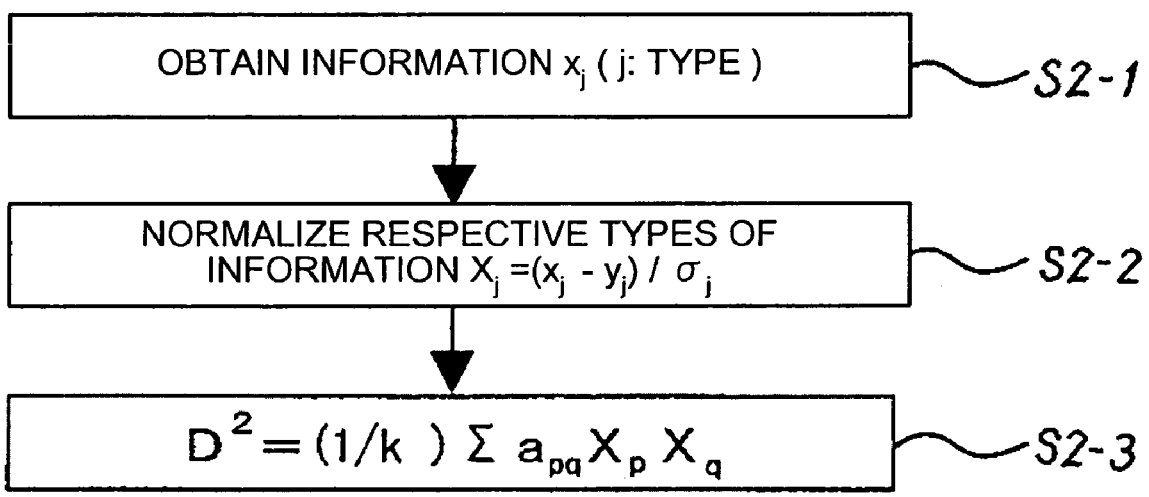
FIG. 7 is a flowchart of a calculation procedure of a Mahalanobis distance based on inverse matrix and various types of obtained data.

FIG. 7 is a flowchart of a calculation procedure of the Mahalanobis distance D based on the inverse matrix A and various types of obtained data. In this procedure, first, k types of data $x_1, x_2, \ldots, x_k$ in an optional state are obtained (S2-1). The types of data correspond to $y_{11}, y_{12}, \ldots, y_{1k}$. Based on the relational expression 1, respective obtained data are normalized as $X_1, X_2, \ldots, X_k$. A square of the Mahalanobis distance D is then calculated according to the relational expression 5 determined by using an element $a_{kk}$ in the constructed inverse matrix A. $\Sigma$ in the FIG. 7 expresses the sum total relating to the suffixes p and q.

The controller 1 compares the Mahalanobis distance D determined in this manner with a preset threshold. If the Mahalanobis distance D is greater than the threshold, the obtained set information is determined as abnormal data deviating greatly from the normal distribution, and failure warning information is displayed on the operation display unit 3.

While an example where the inverse matrix A functioning as the normal grouped data group is stored in the RAM 1b has been explained, the following set information group can be stored instead of the inverse matrix A. That is, the obtained data table constructed in the set information group construction process, the normalized data table obtained during the inverse matrix construction process, and the correlation coefficient matrix R. When any of the normal grouped data group is stored instead of the inverse matrix A, the inverse matrix A can be constructed based on the data prior to the abnormality determination.

According to the copying machine constituted as described above, abnormalities in the actual measurement values of the set information formed of all or a partial combination of the various types of information are determined using the MTS method, hence various types of failures can be detected. Furthermore, since it is not necessary to monitor the presence of a cause of individual abnormality, it can be avoided that the control becomes complicated due to monitoring. Furthermore, the presence of abnormality can be determined at the shipment destination after obtaining the normal data group from the copying machine in the normal state, without requiring trial run of the copying machine in the factory prior to the shipment. As the normal data group used for the determination, the data obtained from the copying machine itself can be used, instead of the data obtained from the standard machine. Accordingly, a cost increase due to obtaining of the normal data group for each product prior to shipment, and a decrease in the determination accuracy due to the use of the normal data group obtained from the standard machine for each of the products can be avoided.

An example where the set information group as the normal data group is constructed during a period from a point in time when the operation is initially started after factory shipment until the predetermined period has passed has been explained. However, the set information group as the normal data group can be constructed during a period from a point in time when the operation is initially started after completion of repair until the predetermined period has passed has been explained. In this case, the normal data group suitable for a parts or unit replaced at the time of repair can be constructed.

Copying machines in respective examples where more characteristic configuration is added to the copying machine according to the first embodiment are explained next.

EXAMPLE 1

Figure 4:
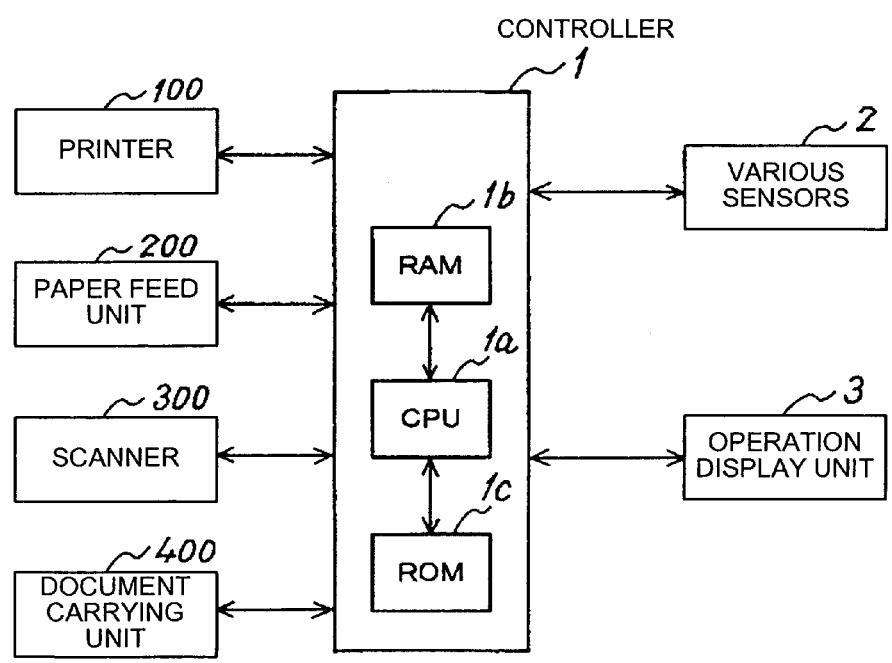
FIG. 4 is a block diagram of a partial configuration of an electric circuit in the copying machine shown in FIG. 1.

In the copying machine according to Example 1, by inputting the time passage determining parameters to the operation display unit 3 shown in FIG. 4, the value thereof can be changed from the one set at the time of factory shipment. Furthermore, the controller 1 as the timing obtaining unit is constituted so as to obtain the timing at the point in time when the predetermined period has passed from the operation start time based on the time passage determining parameters, which are values of the updated period by the change. In such a configuration, when it is determined according to an inspection by a maintenance person that a sufficient amount of set information is obtained before the predetermined period passes, the abnormality determination process can be started earlier than the initial schedule to determine the presence of abnormality. Furthermore, when it is determined that the sufficient amount of set information has not been obtained immediately before the predetermined period passes, the execution period of the set information group construction process is extended to obtain the sufficient amount of set information, and then the abnormality determination process can be performed. In the copying machine, the operation display unit 3 functions as a period input unit that inputs a period.

EXAMPLE 2

In an image forming apparatus such as a copying machine, a temporary abnormality may occur due to some reasons during the predetermined period passes. For example, if a user forgets to buy and keep a toner container for storing toner for replenishment to be set in the copying machine body, the user may execute printing forcibly, acknowledging that insufficient image density will occur, even though the copying machine issues a warning of insufficient toner concentration. In such a case, until the toner is replenished, an abnormality of insufficient image density occurs temporarily. Furthermore, when the copying machine is temporarily used in a state inclined diagonally, or when transfer paper having a fold or wrinkles is used, temporary abnormality such as jam likely occurs. The set information obtained in such an abnormal state is not suitable as the constituent of the normal data group.

Figure 8:
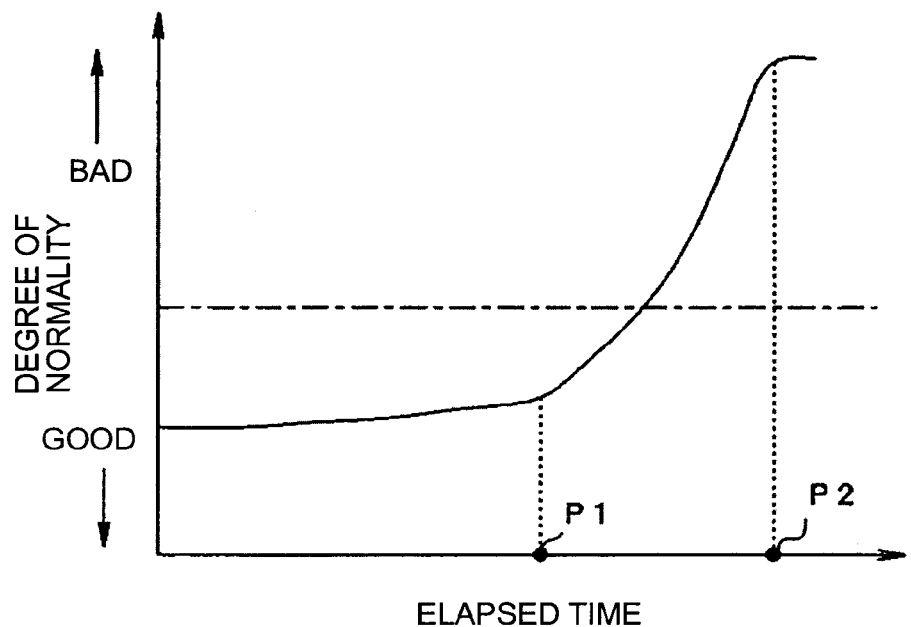
FIG. 8 is a graph of a change in the degree of normality of set information until abnormality visible to user's eyes occurs.

FIG. 8 is a graph of a change in the degree of normality of the set information until an abnormality visible to user's eyes occurs. In FIG. 8, it is shown that as the value in the Y-axis direction increases, the degree of normality degrades. Reference sign P1 denotes a point in time when a cause of a visible abnormality occurs, for example, when forcible printing is started regardless of toner shortage, or when the transfer paper starts to cause folding or wrinkles. At the point in time when the cause occurs, the degree of normality of the entire copying machine is relatively good. Thereafter, as the print job is carried out, the degree of normality gradually degrades. This degradation is due to a temporary cause, and once the cause is eliminated, the copying machine resumes the normal state. One-dot chain line in FIG. 8 indicates a boundary between a state where there is no problem even if the obtained set information is handled as normal data and a state where there is a problem if the obtained set information is handled as normal data. At a point in time when a visible abnormality occurs, the copying machine is already in the latter state, and even in a certain period going back therefrom, the copying machine is in the latter state. When the copying machine becomes a visible abnormal state, some of the pieces of information obtained by the information obtaining unit often indicate values largely deviated from the normal values clearly. For example, jams occur frequently, or the toner concentration greatly decreases.

In the copying machine, therefore, when at least one of the pieces of information obtained by the information obtaining unit exceeds or falls below a predetermined threshold, the following process is performed. That is, a process for removing the set information stored during the certain period going back from the point in time when one of the pieces of information is obtained is performed. Specifically, in the copying machine, obtained date and time are stored in the RAM, in association with each of the pieces of set information stored in the obtained data table. When a certain type of information exceeds the predetermined threshold, the set information obtained, for example, within one week from the point in time when the certain type of information has been obtained is removed from the obtained data table. More specifically, for example, when the frequency of jams as the information exceeds the frequency threshold as the predetermined threshold, the set information obtained during a certain period going back from the point in time is removed from the obtained data table. Furthermore, for example, when the toner concentration falls below a predetermined concentration as the predetermined threshold, the set information obtained during a certain period going back from the point in time is removed from the obtained data table.

In the copying machine having such a configuration, when a temporary abnormality occurs during a period when the set information group construction process is performed, the set information inappropriate as the normal data is removed from the set information group, thereby avoiding a decrease in the determination accuracy due to including this set information in the set information group.

EXAMPLE 3

In the copying machine, a user determines that a visible abnormality has occurred, instead of determination based on at least one of the pieces of information obtained by the information obtaining unit. Specifically, the user can input abnormality occurrence information to the operation display unit 3. That is, the operation display unit 3 functions as an abnormality occurrence information input unit. Accordingly, when the abnormality occurrence information is input, the set information stored during the certain period going back from the point in time is removed from the obtained data table, as in Example 2.

Embodiment 1-2

The copying machine in embodiment 1-2 according to the present invention is explained. The configuration of the copying machine according to this embodiment is the same as the embodiment 1-1, unless otherwise specified.

With the copying machine, mode setting information can be input to the operation display unit 3. The copying machine can switch a mode for performing the set information group construction process as the set information storing process in which the set information obtained by the information obtaining unit is stored in the obtained data table in the RAM 1b as a part of the set information group, and a mode for performing the abnormality determination process in which the presence of abnormality is determined based on the set information group stored in the RAM 1b and the result of the set information obtained by the information obtaining unit. In the copying machine, the operation display unit functions as a mode setting information input unit that inputs the mode setting information.

Also in this configuration, the presence of abnormality can be determined after obtaining the normal data group from the copying machine in the normal state at the shipment destination, without requiring trial run of the copying machine in the factory prior to the shipment. Furthermore, as the normal data group used for the determination, the one obtained from the copying machine itself can be used instead of the one obtained from the standard machine. Accordingly, a cost increase due to obtaining of the normal data group for each product prior to shipment, and a decrease in the determination accuracy due to the use of the normal data group obtained from the standard machine for each of the products can be avoided.

Also in this copying machine, it is desired to delete the set information obtained in a certain period going back from the point in time when a visible abnormality has occurred from the already stored obtained data table in the set information group construction process.

While an example where the abnormality determining apparatus is installed in the copying machine body has been explained, the abnormality determining apparatus and the copying machine can be constructed as separate bodies. In this case, a reception unit in the abnormality determining apparatus that receives various types of information transmitted from the copying machine via a communication line functions as the information obtaining unit in the abnormality determining apparatus, instead of various sensors or the controller installed in the copying machine. Abnormality determination and diagnosis can be performed at a remote place from the copying machine. Furthermore, a plurality of copying machines can be centrally controlled by one abnormality determining apparatus and the presence of abnormality can be determined in respective copying machines. If a transmission unit that transmits the determination result to external devices via the communication line is provided in the abnormality determining apparatus, the determination result can be transmitted and informed to operators of respective copying machines installed at different remotes places. For the communication line, wired and wireless communication lines can be used, and other than electric lines, all sorts of lines, such as the one using an optical fiber, can be used.

In the copying machine according to Example 1, the operation display unit 3 as the period input unit is provided, and the controller 1 as the timing obtaining unit is constructed so as to obtain the timing at the point in time when the predetermined period has passed after the start of operation, based on the time passage determining parameters, which are values of the periods stored in the RAM 1b as the information storage unit. In this configuration, when it is determined according to an inspection by the maintenance person that a sufficient amount of set information is obtained before the predetermined period passes, the abnormality determination process can be started earlier than the initial schedule to determine the presence of abnormality. Furthermore, when it is determined that the sufficient amount of set information has not been obtained immediately before the predetermined period passes, the execution period of the set information group construction process is extended to obtain the sufficient amount of set information, and then the abnormality determination process can be performed.

Furthermore, in the copying machine according to Example 2, when at least one of the pieces of information obtained by the information obtaining unit exceeds or falls below a predetermined threshold, a process for removing the set information stored during the certain period going back from the point in time when one of the pieces of information is obtained is performed. In this configuration, when a temporary abnormality occurs during a period when the set information group construction process is performed due to the reasons described above, the set information inappropriate as the normal data is removed from the set information group, thereby avoiding a decrease in the determination accuracy due to including this set information in the set information group.

Furthermore, in the copying machine according to Example 3, the operation display unit 3 as the abnormality occurrence information input unit is provided, so as to perform the process for removing the set information stored during the predetermined period going back from the input time of the abnormality occurrence information from the obtained data table. Also in this configuration, when a temporary abnormality occurs during a period when the set information group construction process is performed, the set information inappropriate as the normal data is removed from the set information group, thereby avoiding a decrease in the determination accuracy due to including this set information in the set information group.

Furthermore, in the copying machines according to respective embodiments and respective examples, the Mahalanobis distance is calculated based on the set information group and the types of information obtained by the information obtaining unit, to determine the presence of abnormality based on the calculation result. In this configuration, by determining the presence of abnormality regarding the result of the obtained set information formed of all or a part of the respective types of information according to the MTS method, various types of abnormalities can be detected over a wide range. Furthermore, since it is not necessary to monitor the presence of a cause respectively for each of the abnormalities, it can be avoided that the control becomes complicated due to the monitoring.

SECOND EMBODIMENT

Embodiment 2-1

An embodiment of the abnormality determining apparatus to which the present invention is applied is explained as a second embodiment.

The configuration of the image forming apparatus according to the second embodiment is the same as that shown in FIGS. 1 to 3, therefore, redundant explanations thereof are omitted.

The basic configuration of the abnormality determining apparatus is explained first. The abnormality determining apparatus can be mounted in the detection subject such as the copying machine, or can be formed separately. When the abnormality determining apparatus is formed separately from the detection subject, the abnormality determining apparatus can be arranged near the detection subject, or at a remote place. When the abnormality determining apparatus is arranged at a remote place, the abnormality determining apparatus can perform determination process by performing data communication between the detection subject and the abnormality determining apparatus via the communication line. Furthermore, when the abnormality determining apparatus is arranged inside of the detection subject, the maintenance person visits the installation site to write or read data to/from the abnormality determining apparatus.

Figure 9:
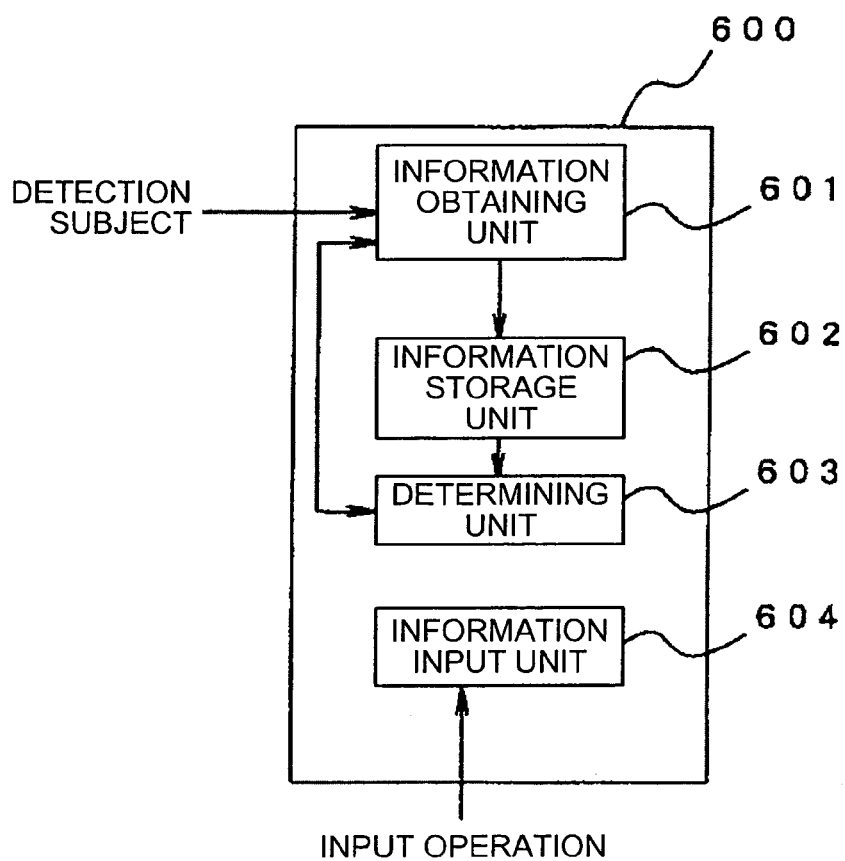
FIG. 9 is a block diagram of a partial configuration of the electric circuit of the abnormality determining apparatus according to the embodiment.

FIG. 9 is a block diagram of a partial configuration of the electric circuit of the abnormality determining apparatus 600 according to the second embodiment. In FIG. 9, the abnormality determining apparatus 600 includes an information obtaining unit 601 that obtains various types of information indicating the condition of the copying machine as the detection subject, an information storage unit 602 that stores the set information formed of setting of the various types of information or the set information group as the aggregate of the set information. Furthermore, the abnormality determining apparatus 600 includes a determining unit 603 that determines the presence of abnormality in the copying machine as the detection subject based on the set information obtained by the information obtaining unit 601 and the set information group stored in the information storage unit 602. The abnormality determining apparatus 600 also includes an information input unit 604 formed of a keyboard for inputting the information by the input operation by the user and the like.

When a controller formed of the CPU, the RAM, and the like is used for the abnormality determining apparatus 600, the RAM and the like in the controller can function as the information storage unit 602. The RAM and the like in the controller can function also as the determining unit 603 that determines the presence of abnormality.

Figure 10:
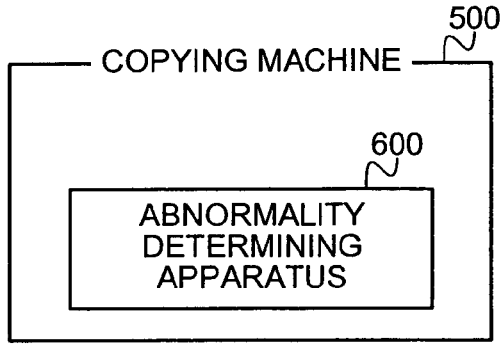
FIG. 10 is a block diagram of an example where the abnormality determining apparatus according to the embodiment is installed in the copying machine.

FIG. 10 is a block diagram of an example where the abnormality determining apparatus 600 is installed in the copying machine 500. In this case, various sensors and the operation unit installed in the copying machine 500 can function as the information obtaining unit 601 in the abnormality determining apparatus 600. A main controller that controls the entire copying machine 500 can function as the determining unit 603 in the abnormality determining apparatus 600.

Figure 11:
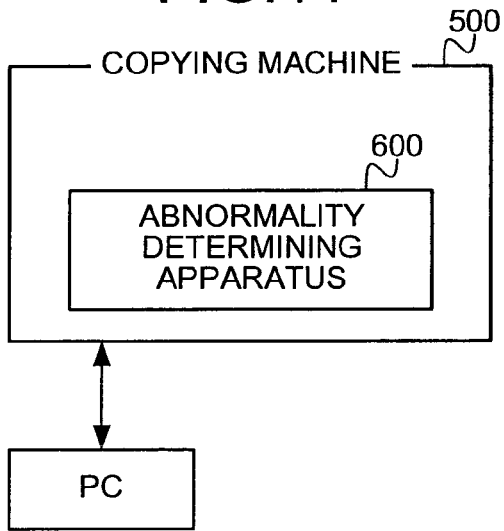
FIG. 11 is a block diagram of an example where a personal computer is connected to the copying machine.

FIG. 11 is a block diagram of an example where a personal computer (PC) is connected to the copying machine 500 having the configuration shown in FIG. 10. In this case, a communication unit such as a communication port installed in the copying machine 500 for enabling the communication with the PC can function as the information obtaining unit 601 or the information input unit 604 in the abnormality determining apparatus 600. The operation display unit installed in the copying machine 500 can function also as the information input unit in the abnormality determining apparatus 600.

Figure 12:
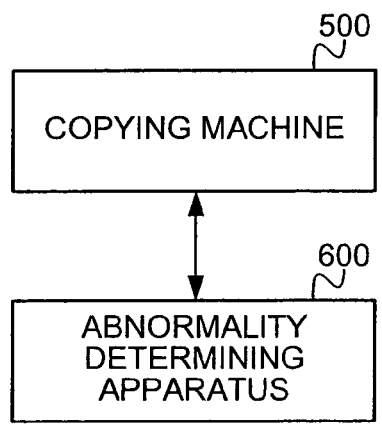
FIG. 12 is a block diagram of an example where the abnormality determining apparatus is installed in a remote place far away from an installation site of the copying machine.

FIG. 12 is a block diagram of an example where the abnormality determining apparatus 600 is installed in a remote place far away from the installation site of the copying machine 500. In this example, the copying machine 500 and the abnormality determining apparatus 600 can perform data exchange via the wired or wireless communication line. The communication unit such as the communication port installed in the abnormality determining apparatus 600 for enabling communication with the copying machine 500 can function as the information obtaining unit 601 or the information input unit 604.

Figure 13:
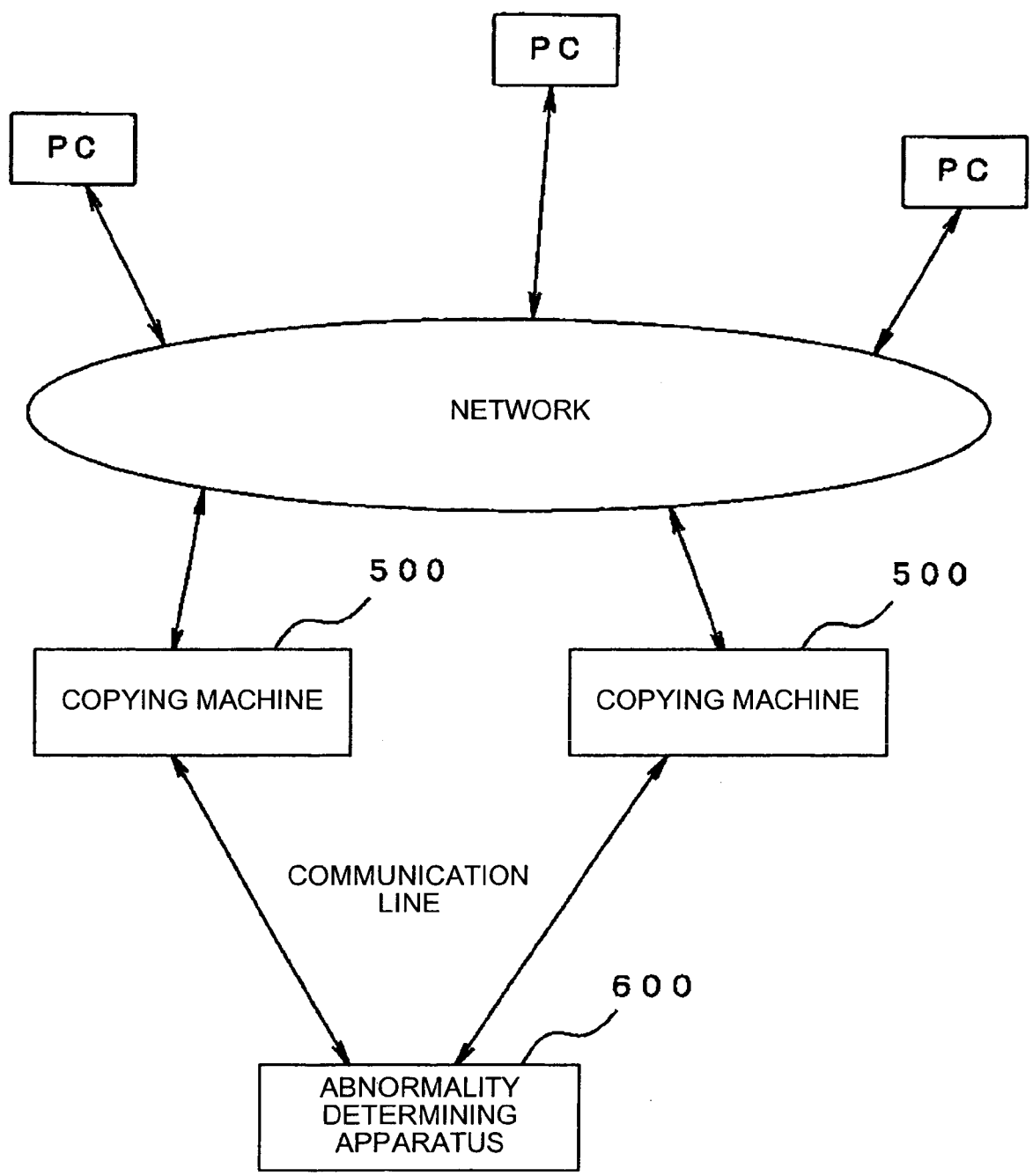
FIG. 13 is a flowchart of an example where the abnormality determining apparatus is connected via a communication line to a plurality of copying machines connected to a plurality of personal computers via a network.

FIG. 13 depicts an example where the abnormality determining apparatus 600 is connected via a communication line to a plurality of copying machines 500 connected to a plurality of PCs via a network. In this example, one abnormality determining apparatus 600 can determine the presence of abnormality for each of the copying machines 500.

As shown in FIGS. 10 to 13, the abnormality determining apparatus 600 can be installed in the detection subject or can be formed separately. Furthermore, only a part of the abnormality determining apparatus 600 can be installed in the detection subject and the others can be formed separately. In this case, determination of the presence of abnormality can be performed inside the detection subject, or by the separate body. In the second embodiment, an example where the abnormality determining apparatus 600 is installed in the copying machine 500 is explained.

The characteristic configuration of the abnormality determining apparatus 600 according to the second embodiment is explained.

The abnormality determining apparatus 600 determines the presence of abnormality in the copying machine as the detection subject based on the set information formed of various types of information obtained by the various sensors, the main controller, the operation display unit, and the like of the copying machine 500 that functions as the information obtaining unit 601. More specifically, the abnormality determining apparatus 600 obtains the Mahalanobis distance by the MTS method based on the set information, and determines whether an abnormality has occurred in the apparatus. To obtain the Mahalanobis distance, it is necessary to construct the set information group, which is the aggregate of the pieces of set information obtained from the copying machine in the normal state; however, the construction is performed at the time of operation based on the user's instruction at the shipment destination of the copying machine. Also at the time of shipment, although the amount of data is small, the set information group is stored in the RAM or the hard disk, and more types of set information are added to the set information group at the shipment destination.

Figure 14:
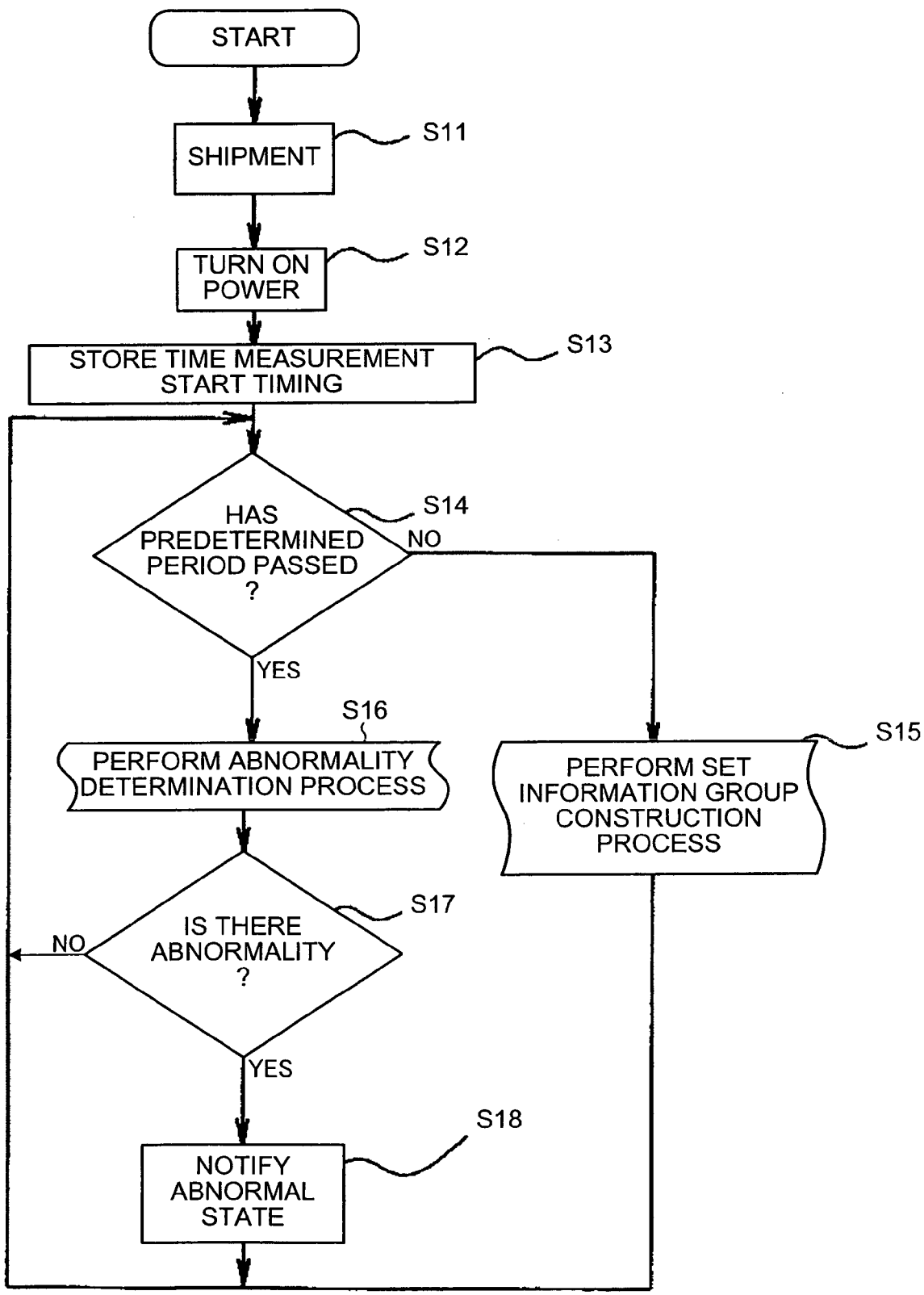
FIG. 14 is a flowchart of the outline of data processing performed by the abnormality determining apparatus.

FIG. 14 is a flowchart of the outline of data processing performed by the abnormality determining apparatus 600. As the assumption of performing the data processing, the main controller in the copying machine, which controls the various types of equipment by a well-known technique, functions as the information storage unit 602 or the determining unit 603 in the abnormality determining apparatus 600. The operation display unit (not shown) in the abnormality determining apparatus 600 functions as the information input unit 604 in the abnormality determining apparatus 600. The main controller, the various sensors installed in the copying machine, and the operation display unit respectively function as the information obtaining unit 601 in the abnormality determining apparatus 600.

After the copying machine as the detection subject is shipped from the factory (step 11: hereinafter, step is described as S), when a main power supply of the copying machine is turned on initially by the user (S12), the main controller stores the point in time as the initial operation start timing in the information storage unit such as the RAM (S13). The time passage determination parameters necessary for determining that the predetermined period has passed are stored in the information storage unit before the factory shipment. The time passage determination parameters include the elapsed time threshold, the elapsed day threshold, the elapsed month threshold, the threshold of printed number of sheets, and the operation time threshold.

The set information group construction process is performed during the period from the initial operation start timing until the certain period determined based on the time passage determination parameters, that is, the predetermined period has passed (S14: No, S15). In the set information group construction process, the set information, which is a combination of the various types of information that can be obtained by the information obtaining unit such as the sensor, is obtained during the print job, and stored in the information storage unit as a part of the set information group. After the predetermined period has passed from the initial operation start timing (S14: Yes), the abnormality determination process is performed instead of the set information group construction process (S16). In the abnormality determination process, the Mahalanobis distance is obtained based on the set information formed of the various types of information obtained by the information obtaining unit during the print job after the predetermined period has passed, and the set information group stored in the information storage unit. It is then determined whether there is an abnormality in the copying machine based on the obtained Mahalanobis distance. When it is determined that there is an abnormality (S17: Yes), a notification unit such as the operation display unit notifies that there is an abnormality (S18).

In the abnormality determining apparatus 600 that performs such a control, the main controller functions as the initial operation period detector that detects the initial operation period. The construction method of the set information group and the determination method of the presence of abnormality are explained in detail later.

Figure 15:
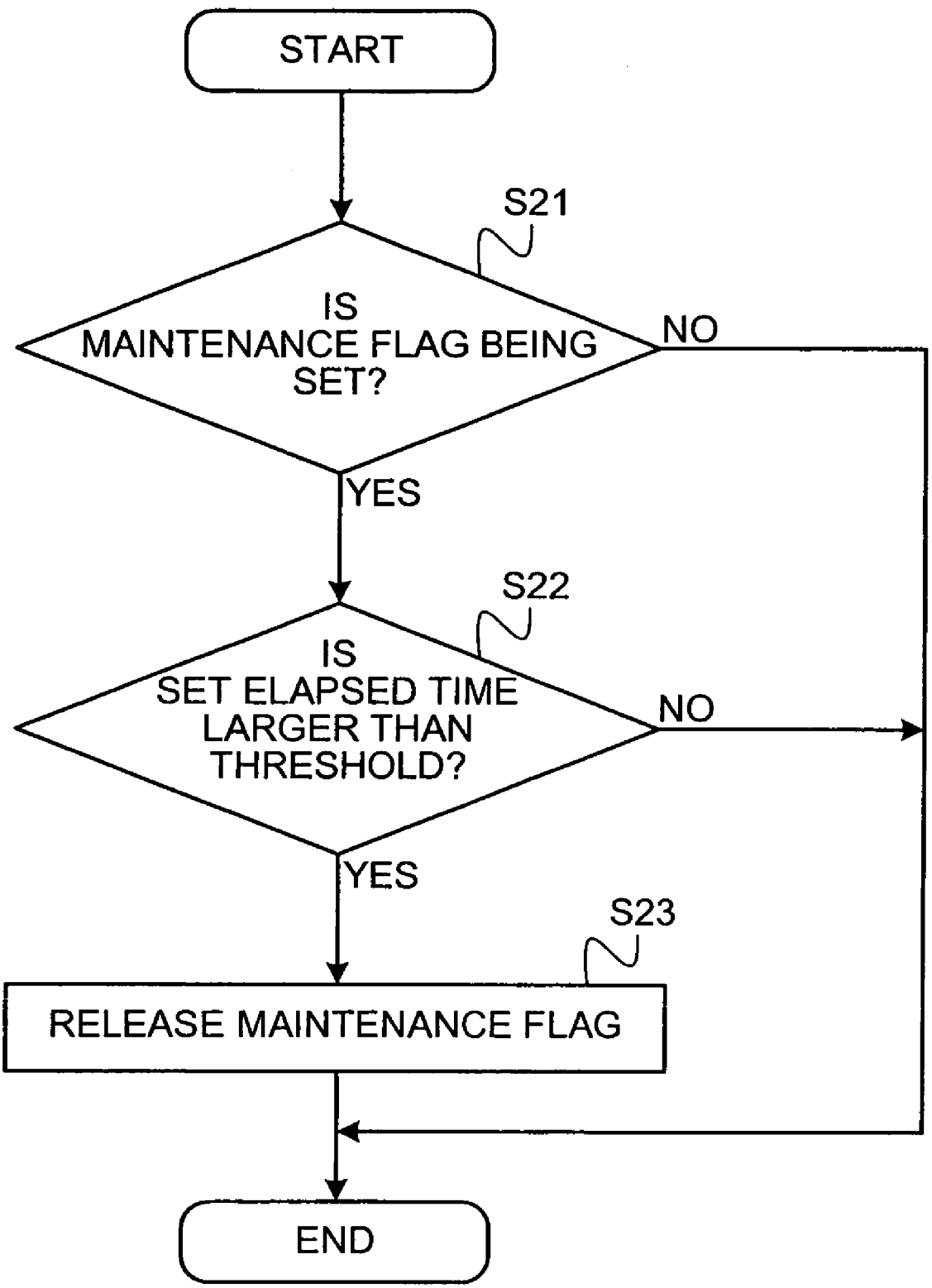
FIG. 15 is a flowchart of a maintenance flag confirmation process performed by the abnormality determining apparatus.

FIG. 15 is a flowchart of a control flow of a maintenance flag confirmation process performed by the abnormality determining apparatus 600. In the maintenance flag confirmation process, it is determined whether a maintenance flag is set (S21). The maintenance flag is set when a specialist such as a maintenance person who has checked the copying machine and determined that there is no abnormality in the copying machine inputs the result to the operation display unit of the copying machine.

When it is determined that the maintenance flag is not set (S21, No), the control flow immediately finishes. On the other hand, when it is determined that the maintenance flag is set (S21, Yes), it is then determined whether set elapsed time, which is the elapsed time since the maintenance flag has been set, exceeds a predetermined threshold (S22). When it is determined that the set elapsed time exceeds the predetermined threshold (S22, Yes), the maintenance flag is released. When it is determined that the set elapsed time does not exceed the predetermined threshold (S22, No), the control flow finishes.

The flowchart shown in FIG. 14 is performed when the maintenance flag is not set. When the maintenance flag is set, only the set information group construction process (S15) is performed.

In the second embodiment, the operation display unit in the copying machine functions as the information input unit that inputs maintenance completion information of the copying machine as the detection subject. The set information formed of the various types of information obtained by the information obtaining unit is stored in the information storage unit as a part of the set information group during the initial operation period of the copying machine. After the initial operation period has passed, the operation display unit performs a process in which the set information obtained by the information obtaining unit is additionally stored in the information storage unit as a part of the set information group, based on the input of the maintenance completion information to the operation display unit for a predetermined period. In this configuration, the set information capable of functioning as the normal data is obtained from the copying machine also during the predetermined period after completion of the maintenance, in addition to the initial operation period. Accordingly, the accuracy in determining the presence of abnormality can be increased.

In the second embodiment, the obtained data table is the same as Table 1, the normalized data table is the same as Table 2, the normalized data is the same as equation 1, the reciprocal coefficient is the same as equation 2, the correlation coefficient matrix is the same as equation 3, the inverse matrix A is the same as equation 4, and the Mahalanobis distance is the same as equation 5, therefore, redundant explanations thereof are omitted. The series of processes from the set information group construction process to the matrix transformation process is the same as that shown in the flowchart of FIG. 6, and the procedure for calculating the Mahalanobis distance D based on the inverse matrix A and various obtained data is the same as that shown in FIG. 7, therefore, redundant explanations thereof are omitted.

After performing the set information group construction process for constructing the obtained data table, which is the set information group shown in Table 1, the copying machine constructs the inverse matrix A by a series of processes, that is, the information normalization process, the correlation coefficient calculation process, and the matrix transformation process, prior to performing the abnormality determination process. The copying machine then stores the inverse matrix A in the information storage unit 602 (see FIG. 9).

The abnormality determining apparatus 600 compares the calculated Mahalanobis distance D with the preset threshold. When the Mahalanobis distance D is larger than the threshold, the abnormality determining apparatus 600 determines that the obtained set information is abnormal data, which largely deviates from the normal distribution, and displays failure warning information on the operation display unit.

Figure 16:
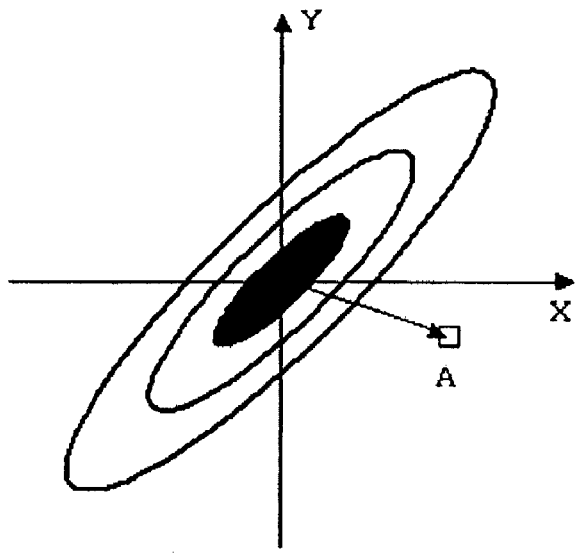
FIG. 16 is a pattern diagram of the Mahalanobis distance by the simplest bivariate space of X and Y.
Figure 17:
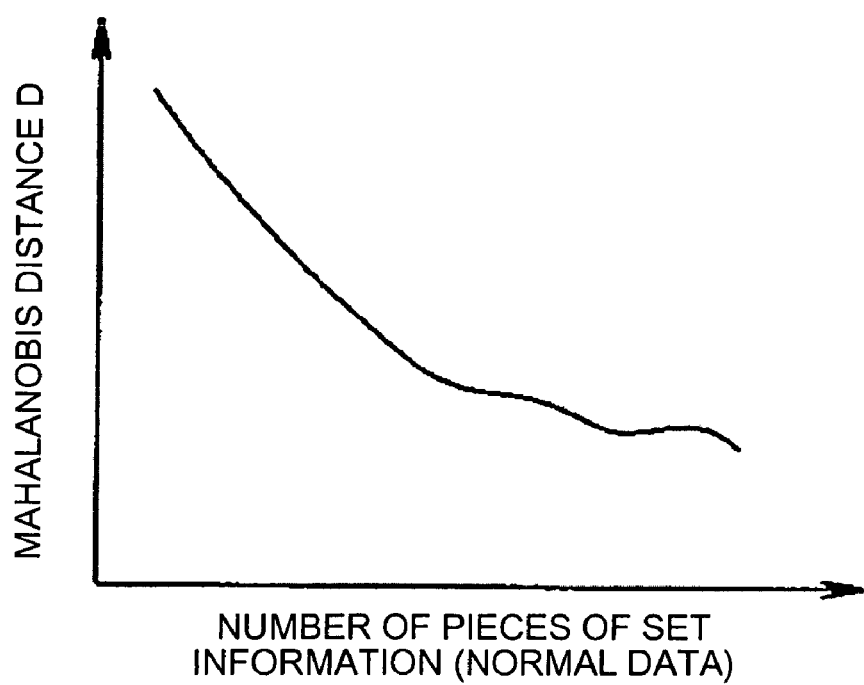
FIG. 17 is a graph of the relationship between the Mahalanobis distance and the number of normal data in a set information group relating to specific set information.

FIG. 16 is a pattern diagram of the Mahalanobis distance D by the simplest bivariate space of X and Y. When there is the correlation between variable X and variable Y, the distribution of the normal value is indicated by a contour line in FIG. 16 by an oval of the standard deviation. The Mahalanobis distance D indicates a small value with respect to the data on distribution and a larger value with respect to the data deviated from the distribution such as Point A, with the standard deviation in the direction being used as the standard. That is, as shown in FIG. 17, a smaller value is shown as the number of the normal data in the set information group increases.

While an example where the inverse matrix A functioning as the normal grouped data group is stored in the information storage unit has been explained, the following set information group can be stored instead of the inverse matrix A. That is, the set information group includes the obtained data table constructed in the set information group construction process, the normalized data table obtained in the inverse matrix construction process, the correlation coefficient matrix R, and the like. When any one of the normal grouped data group is stored instead of the inverse matrix A, the inverse matrix A can be constructed based on the data, prior to the abnormality determination.

According to the abnormality determining apparatus 500 having such a configuration, by determining an abnormality regarding the obtained result of the set information formed of all or a part of the combination of various types of information according to the MTS method, various types of abnormalities can be detected in a wide range. Since it is not necessary to monitor the presence of a cause respectively for each of the abnormalities, it can be avoided that the control becomes complicated due to the monitoring. Furthermore, the presence of abnormality can be determined after obtaining the normal data group from the copying machine as the detection subject in the normal state at the shipment destination, without requiring trial run of the copying machine in the factory prior to the shipment. Furthermore, as the normal data group used for the determination, the one obtained from the copying machine itself can be used instead of the one obtained from the standard machine. Accordingly, a cost increase due to obtaining of the normal data group for each product prior to shipment, and a decrease in the determination accuracy due to the use of the normal data group obtained from the standard machine for each of the products can be avoided.

Figure 18:
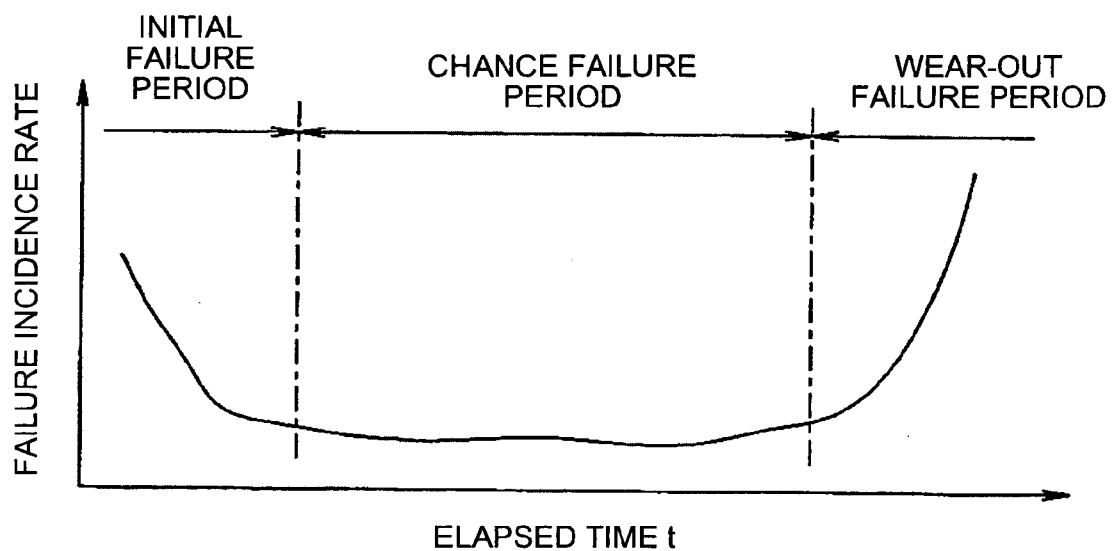
FIG. 18 is a graph of the relationship between the time while a specific product is operated and a failure incidence rate.

FIG. 18 is a graph of the relationship between the time while a specific product is operated and a failure incidence rate. The curve shown by the graph is generally referred to as a Bath-tub curve. A certain period immediately after the completion of the product is in a state likely to cause a failure stochastically due to reasons, such as a failure component being mixed and maladjustment in the production process (initial failure period), and it is effective in increasing the determination accuracy to extract and treat these defective items. When all products in the market are considered as a target, since products including the defective item are mixed in the products having no defective item, if all data is obtained, the information of abnormal state is included in a large amount as the status information of the product. After the initial failure period, a chance failure period indicating a stable failure incidence rate comes next. The failure incidence rate as the standard for comparing general reliability is for the chance failure period. When the operation is further continued, wear and deterioration of the parts make progress. The period shifts to a wear-out failure period during which the failure incidence rate increases. The presence of abnormality is determined to sense the timing shifting to the wear-out failure period as early as possible to deal with the failure, thereby maintaining the failure incidence rate as low as possible.

Figure 19:
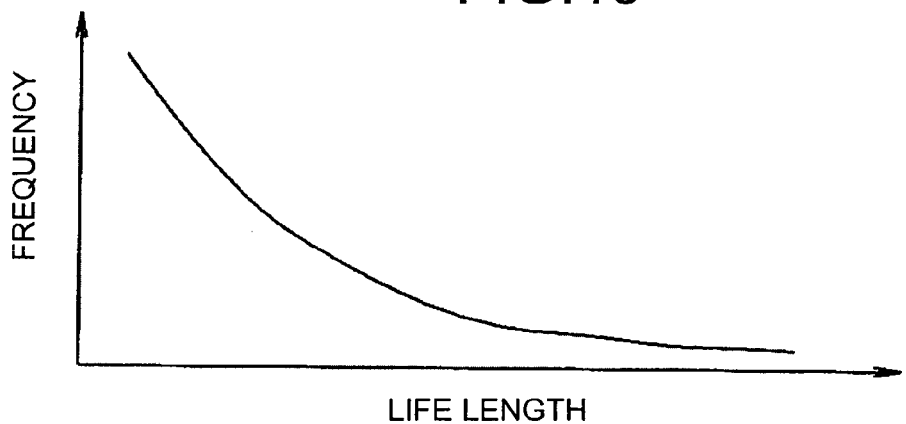
FIG. 19 is a graph of the distribution of failure incidence/frequency (with respect to the life length) during an initial failure period and a chance failure period.

FIG. 19 is a graph of the distribution of the failure incidence/frequency (with respect to the life length) during the initial failure period and the chance failure period. In the both periods, the distribution of the failure incidence is slanting down towards the right (exponential distribution).

Figure 20:
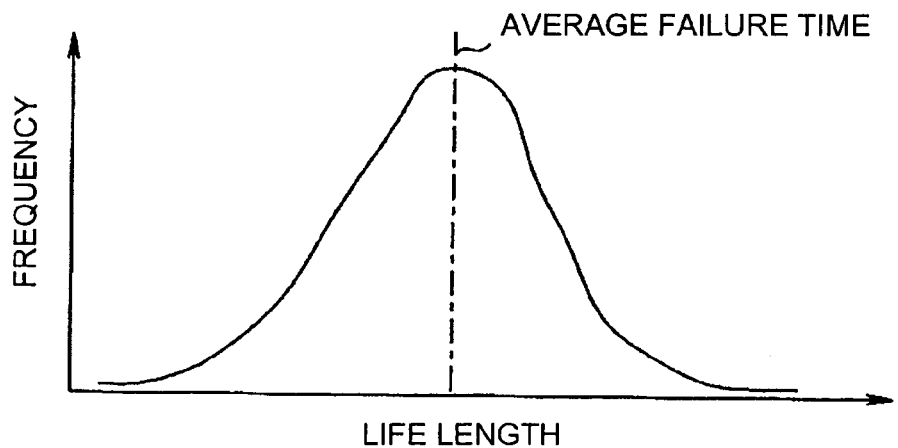
FIG. 20 is a graph of the distribution of the failure incidence/frequency (with respect to the life length) during a wear-out failure period.

FIG. 20 is a graph of the distribution of the failure incidence/frequency (with respect to the life length) during the wear-out failure period. In the wear-out failure period, the distribution of the failure incidence becomes the normal distribution. A mean value in the normal distribution becomes the average failure time. If the width of the distribution in FIG. 20 is narrow, a rough failure incidence period can be determined by monitoring the operation time. Accordingly, the degree of necessity to determine the presence of abnormality is low. However, if the width of distribution is wide, a failure occurs due to many factors other than the operation time, therefore, the degree of necessity of determination increases. In the electrophotographic image forming apparatus, since failure incidence factors cover wide range and many factors relate to each other in a complicated manner, determination of the presence of abnormality becomes highly necessary during the wear-out failure period.

Embodiment 2-2

The abnormality determining apparatus in embodiment 2-2 to which the present invention is applied is explained next. The configuration of the abnormality determining apparatus according to this embodiment is the same as the embodiment 2-1, unless otherwise specified.

The abnormality determining apparatus according to the embodiment 2-2, when a checked normal flag is set instead of the maintenance flag, a special process is performed. The checked normal flag is set when there is no abnormality in the detection subject at the time of checking by the maintenance person, based on the input by the maintenance person. The content of the special process is as follows. That is, when the initial operation period has passed, the abnormality determining apparatus determines the presence of abnormality based on the set information obtained from the copying machine and the set information group (normal data group) stored in the information storage unit, and stores the set information in the information storage unit together with the obtained date and time. In other words, the obtained set information is not included in the set information group, but stored separately together with the obtained date and time. When the checked normal flag is set (when the maintenance person determines that the apparatus is in the normal state), the set information, which has been stored separately from the set information group, is additionally stored in the set information group.

In the abnormality determining apparatus having such a configuration, the set information that can function as the normal data is obtained from the copying machine as the detection subject, during the initial operation period and thereafter until the completion of the maintenance. Accordingly, the determination accuracy of the presence of abnormality can be increased.

Abnormality determining apparatuses in respective examples where more characteristic configuration is added to the abnormality determining apparatus in the embodiment 2-1 or 2-2 are explained below.

EXAMPLE 1

The abnormality determining apparatus according to Example 1 has such a configuration that the set information can be obtained from the operation display unit that can function as the information input unit, an external data input port, and the like. The input set information is then added and stored as a part of the set information group (normal data group) stored in the information storage unit. In this configuration, not only the set information obtained from the copying machine as the detection subject equipped with the abnormality determining apparatus, but also the set information obtained from other copying machines of the same standard are included in the set information group, thereby obtaining more normal data more quickly to increase the determination accuracy.

EXAMPLE 2

In the image forming apparatus such as the copying machine, during the period during which the set information group is constructed, such as the initial operation period, a period after an initial operation period has passed until the completion of maintenance, and a period after the completion of maintenance until the predetermined period has passed, an unexpected abnormality may occur due to some reason. For example, when the user forgets to buy and keep a toner container for storing toner for replenishment to be set in the copying machine body, the user may execute printing forcibly, acknowledging that insufficient image density will occur, even though the copying machine issues a warning of insufficient toner concentration. In such a case, until the toner is replenished, an abnormality of insufficient image density occurs temporarily. Furthermore, when the copying machine is temporarily used in a state inclined diagonally, or when transfer paper having a fold or wrinkles is used, temporary abnormality such as jam likely occurs. The set information obtained in such an abnormal state is not suitable as the constituent of the normal data group.

Figure 21:
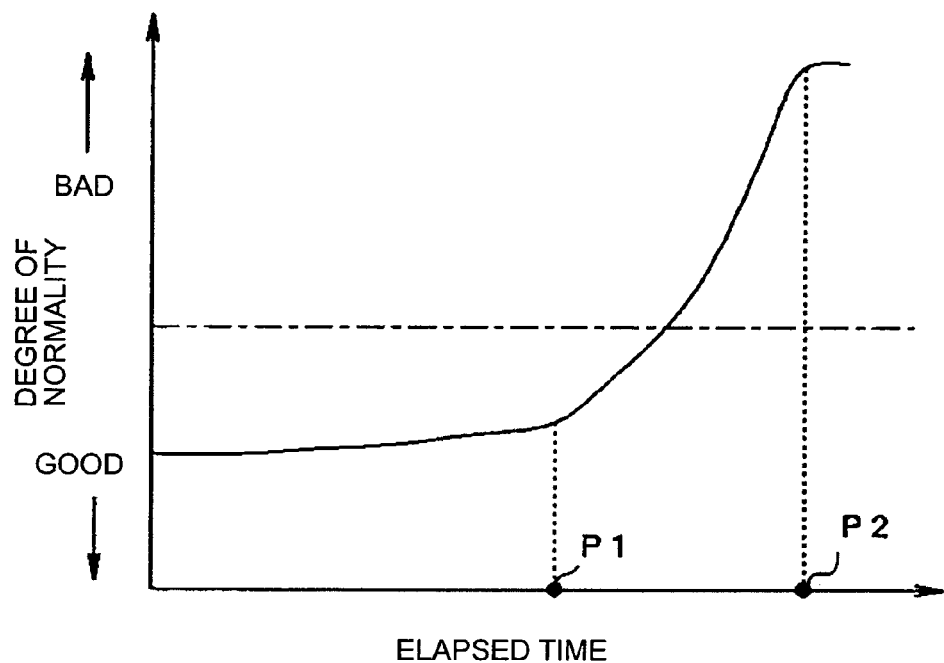
FIG. 21 is a graph of a change in the degree of normality of set information until abnormality visible to user's eyes occurs.

FIG. 21 is a graph of a change in the degree of normality of the set information until an abnormality visible to user's eyes occurs. In FIG. 21, it is shown that as the value in the Y-axis direction increases, the degree of normality degrades. Reference sign P1 denotes a point in time when a cause of a visible abnormality occurs, for example, when forcible printing is started regardless of toner shortage, or when the transfer paper starts to cause folding or wrinkles. At the point in time when the cause occurs, the degree of normality of the entire copying machine is relatively good. Thereafter, as the print job is carried out, the degree of normality gradually degrades. This degradation is due to an unexpected cause, and once the cause is eliminated, the copying machine resumes the normal state. One-dot chain line in FIG. 21 indicates a boundary between a state where there is no problem even if the obtained set information is handled as normal data and a state where there is a problem if the obtained set information is handled as normal data. At a point in time when a visible abnormality occurs, the copying machine is already in the latter state, and even in a certain period going back therefrom, the copying machine is in the latter state. When the copying machine becomes a visible abnormal state, some of the pieces of information obtained by the information obtaining unit often indicate values largely deviated from the normal values clearly. For example, jams occur frequently, or the toner concentration greatly decreases.

In the copying machine, therefore, when at least one of the pieces of information obtained by the information obtaining unit exceeds or falls below a predetermined threshold, the following process is performed. That is, a process for removing the set information stored during the certain period going back from the point in time when one of the pieces of information is obtained is performed. Specifically, in the copying machine as the detection subject, obtained date and time are stored in the information storage unit, in association with each of the pieces of set information stored in the obtained data table. When a certain type of information exceeds the predetermined threshold, the set information obtained, for example, within one week from the point in time when the certain type of information has been obtained is removed from the obtained data table. More specifically, for example, when the frequency of jams as the information exceeds the frequency threshold as the predetermined threshold, the set information obtained during a certain period going back from the point in time is removed from the obtained data table. Furthermore, for example, when the toner concentration falls below a predetermined concentration as the predetermined threshold, the set information obtained during a certain period going back from the point in time is removed from the obtained data table.

In the copying machine having such a configuration, when a temporary abnormality occurs during a period when the set information group construction process is performed, the set information inappropriate as the normal data is removed from the set information group, thereby avoiding a decrease in the determination accuracy due to including this set information in the set information group.

EXAMPLE 3

In the copying machine, the user determines that a visible abnormality has occurred, instead of determination based on at least one of the pieces of information obtained by the information obtaining unit. Specifically, the user can input abnormality occurrence information to the information input unit such as the operation display unit. Accordingly, when the abnormality occurrence information is input, the set information stored during the certain period going back from the point in time is removed from the obtained data table, as in Example 2.

EXAMPLE 4

In the abnormality determining apparatus according to the first and the second embodiments, determination of presence of abnormality is not carried out during the period during which the set information group is constructed, such as the initial operation period, the period after the initial operation period has passed until the completion of maintenance, and the period after the completion of maintenance until the predetermined period has passed. On the other hand, in the abnormality determining apparatus according to Example 4, also during these periods, the Mahalanobis distance D is obtained based on the set information group stored in the information storage unit and the set information obtained by the information obtaining unit, to determine the presence of abnormality in the copying machine. As described above, however, since there is the high possibility that a sufficient amount of normal data is not included in the set information group during these periods, there is the possibility that even if the copying machine is normal, the Mahalanobis distance D indicates a relatively large value, therefore, it is determined that there is an abnormality in the copying machine. In the abnormality determining apparatus, therefore, when it is determined that there is an abnormality during these periods, this matter is notified to the user by a display on the operation display unit as the notification unit. The user or the maintenance person inspects the state of the copying machine in response to the notification. After the inspection, abnormality presence information indicating the presence of abnormality is input to the information input unit. For example, only when it is recognized that there is no abnormality as a result of inspection, the information indicating that "there is no abnormality" is input, which becomes the abnormality presence information. When it is found that even though the copying machine is in the normal state, it is determined that there is an abnormality, the abnormality determining apparatus stores the set information used at the time of determining that there is an abnormality as a part of the set information group. Furthermore, when it is found that it is determined that abnormality is present with respect to the copying machine having an abnormality, the abnormality determining apparatus does not store the set information used at the time of determining that there is an abnormality as a part of the set information group.

In the copying machine having the above configuration, the presence of abnormality in the copying machine can be determined even during a period when the abnormality determination accuracy is increased by adding the set information (normal data) to the set information group (normal data group). Furthermore, even when an erroneous determination is made due to an insufficient amount of normal data in the set information group, the erroneous determination can be corrected.

EXAMPLE 5

The abnormality determining apparatus according to Example 5 can also determine the presence of abnormality during any period of the initial operation period, the period after the initial operation period has passed until the completion of maintenance, and the period after the completion of maintenance until the predetermined period has passed.

Figure 22:
FIG. 22 is a graph of a transition in the number of operated products in the market since a particular product (for example, copying machine) has been put on the market until the sales of the product comes to an end.
Figure 25:
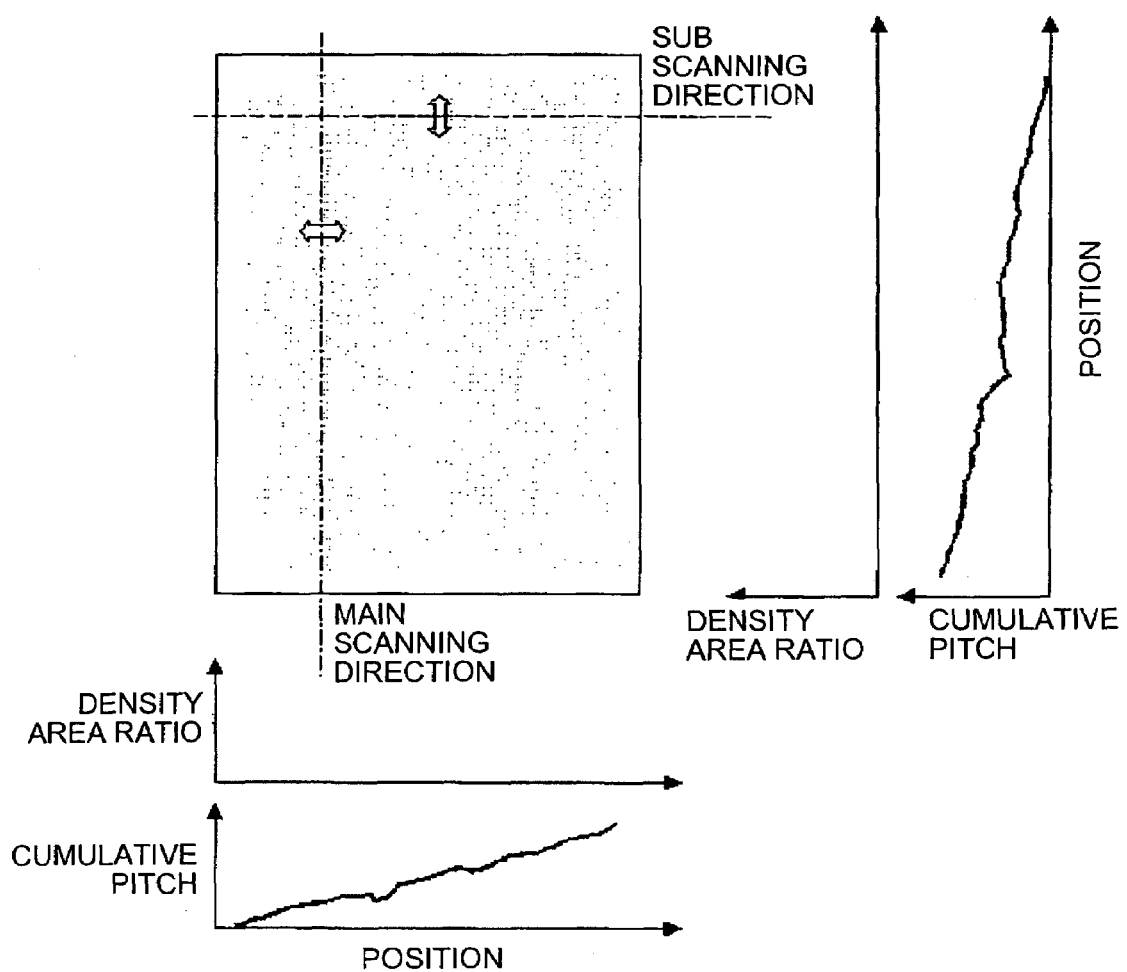
FIG. 25 is an explanatory diagram of a test print image and characteristics of respective numerical values obtained based on the read result thereof.

FIG. 22 is a graph of a transition in the number of operated products in the market since a particular product (for example, copying machine) has been put on the market until the sales comes to an end. At the initial stage of sales, the number of operated products (the number of sales) generally increases due to the new product effect, and gradually slows down. The number of sales passes through a period when the number of sales slightly increases because of the effect of sales promotion, and then starts to decrease after the end of the sales, as replacement by the next product makes a progress.

At the initial stage of sales when the amount of set information that can be obtained as the normal data is overwhelmingly short, a difference in distribution of the set information is small. When the set information obtained at the shipment destination is added to the set information group that can function as the normal data group, the distribution gradually starts to show an expanse. Therefore, as shown in FIG. 17, the Mahalanobis distance D indicates a large value at the initial stage of sales when the distribution of the normal data group is small, with respect to the set information at an absolute position of point A (see FIG. 16). As more types of set information are added to the set information group (normal data group) with a lapse of time from the start of sales, the distribution of the normal data group increases. Accordingly, the Mahalanobis distance D indicates a smaller value than that at the initial stage of sales with respect to the set information at the absolute position of point A. Accordingly, even if predictive detection is attempted at the initial stage of sales, abnormality is determined even with respect to the normal data, therefore, accurate abnormality determination cannot be performed.

In the copying machine according to Example 5, at the time of determining the presence of abnormality, the threshold to be compared with the Mahalanobis distance D is changed with an increase of the number of pieces of set information in the set information group. Specifically, the threshold, which is the determination standard, is set to a relatively large value at the initial stage of operation (or sales), and thereafter, the threshold is gradually decreased with an increase of the number of pieces of set information. The decreasing rate can be adjusted according to the determination accuracy.

In the abnormality determining apparatus having the above configuration, even during the period when the abnormality determination accuracy is increased by adding the set information (normal data) to the set information group (normal data group), the presence of abnormality in the copying machine can be determined. Furthermore, even when an erroneous determination is made due to an insufficient amount of normal data in the set information group, the erroneous determination can be corrected.

At the initial stage, the adjustment of the threshold as described above may be insufficient. In this case, the determination of the presence of abnormality had better not be performed until the determination accuracy reaches an allowable level.

EXAMPLE 6

The copying machine according to Example 6 performs trial run to print out a standard image under a predetermined condition, in response to an instruction of a user. The standard image output by the trial run is not a necessary output to the user; however, it is very effective for the abnormality determining apparatus to obtain the normal data from the copying machine operated under lots of different conditions, to increase the determination accuracy. It is because as the user performs trial run under various conditions, the normal data can be obtained under more operating conditions. However, if the user does not perform the trial run many times, the effect cannot be obtained.

In the abnormality determining apparatus, therefore, a trial run frequency calculation unit that calculates cumulative frequency of the trial run is provided. The main controller in the copying machine that functions as a part of the abnormality determining apparatus performs trial run when the user presses a trial run key, and calculates the cumulative frequency of the trial run. That is, the main controller functions as a trial run detector and a trial run frequency calculation unit in the abnormality determining apparatus.

When the cumulative frequency of the trial run is calculated, various benefits can be provided to the user according to the calculation result. For example, as the cumulative frequency increases, the maintenance contract rate for the copying machine is discounted, or if the copying machine is under lease, the printout can be done free of charge according to the cumulative frequency. Accordingly, the user can be urged to execute the trial run, to obtain the normal data group under many conditions.

EXAMPLE 7

The abnormality determining apparatus according to Example 7 have the configuration of the abnormality determining apparatus according to Example 4 or 5, and the configuration of the abnormality determining apparatus according to Example 6.

FIG. 23 is a diagram of a display screen in the operation display unit of the copying machine, which functions as a part of the abnormality determining apparatus according to Example 7.

When having detected a trial run command from a user, the abnormality determining apparatus displays a message, "A standard image is output to check the condition of the printer. Please press OK key." on the operation display unit. Thereby, the user is notified that a test print is carried out. After the test print finishes, a message, "If there is no problem in the standard image, please press the OK key. If there is a problem, please press NG key." is displayed. At this time, the pressing operation information with respect to the OK key and the NG key functions as the abnormality presence information. The abnormality determining apparatus determines based on the result whether to include the set information obtained at the time of trial run (test print) in the set information group. Alternatively, the abnormality determining apparatus corrects the threshold to be compared with the Mahalanobis distance D. After improving the detection accuracy in this manner, the abnormality determining apparatus calculates the cumulative frequency of trial run, and gives the benefit to the user according to the calculation result. In FIG. 23, a screen display example when 100 free printouts are offered as the benefit is shown. Until the free printout finishes, it is displayed how many free printouts the user can have, as shown in FIG. 23.

EXAMPLE 8

The abnormality determining apparatus according to Example 8 have the configuration of the abnormality determining apparatus according to Example 2 and the configuration of the abnormality determining apparatus according to Example 6.

FIG. 24 is a diagram of a display screen in the operation display unit of the copying machine, which functions as a part of the abnormality determining apparatus according to Example 8.

The procedure is the same as that of Example 7 until the user is notified by a message display that the test print is carried out. Thereafter, when the test print finishes, a message is displayed, "Please set the output standard image on the scanner. When you press the OK key, the standard image is read." When the test print image is read by the scanner, as the information obtaining unit, it is determined whether a predetermined threshold (it is not the threshold to be compared with the Mahalanobis distance D) is exceeded, with regard to the image information. If Yes, the set information obtained at that time is not included in the set information group, or the set information stored during a predetermined period going back from that time is removed from the set information group.

Various types of abnormalities can be detected by adding various parameters obtained from the image information, which is the information read from the test print image, to the set information. For example, in an example where an image formed of a plurality of dots in an isolated state, which are not continuous to each other, is designated as the test print image, the result of calculating a cumulative additional value of center distances of respective dots (cumulative pitch) in the sub scanning direction and the main scanning direction can be used as one of the pieces of information in the set information. If there is no rotational unevenness in the photoconductor and the developing sleeve, respective dots are formed approximately at an equal interval. Therefore, the graph indicating the relationship between the cumulative additional value of center distances of respective dots and the number of dots becomes linear. However, if there is a rotational unevenness, the graph becomes the one having undulations as shown in FIG. 22. Furthermore, nonuniform image density or the like can be detected by calculating an image area ratio or variations in the image density of the standard image. Furthermore, a defect such as a pinhole generated in the photoconductor can be detected by calculating the distribution of the area ratio of respective dots.

EXAMPLE 9

The abnormality determining apparatus according to Example 9 determines the end of respective periods of the initial operation period during which the set information group construction process is performed as set information adding and storing process, the period after the initial operation period has passed until the completion of maintenance, and the period after the completion of maintenance until the predetermined period has passed, in the following manner. That is, the operation display unit as the information input unit can input erroneous determination information indicating that there is erroneous determination regarding determination of the presence of abnormality performed during these periods. When the input frequency per unit time of the erroneous determination information (hereinafter, as "erroneous determination incidence rate") falls below a predetermined value, these periods are terminated.

Figure 26:
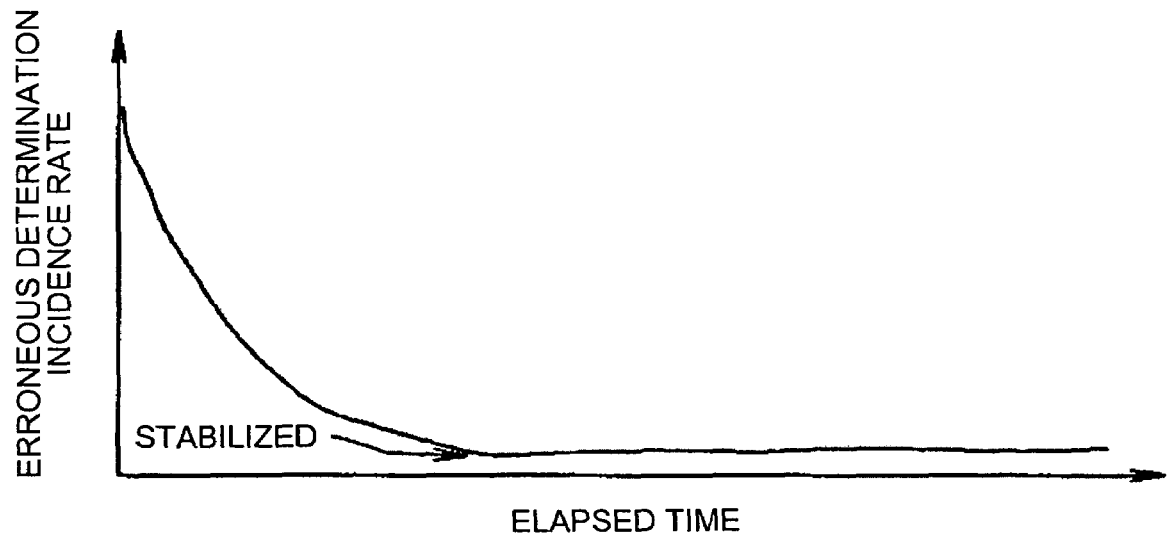
FIG. 26 is a graph of the relationship between erroneous determination incidence rate and elapsed time since the start of initial operation until a predetermined period has passed.

FIG. 26 is a graph of the relationship between erroneous determination incidence rate and elapsed time since the start of initial operation until a predetermined period has passed. For a while after the start of the operation, since a sufficient amount of normal data is not included in the set information group, erroneous determination frequently occurs, such as determining that there is an abnormality while there is no abnormality, or making an opposite determination. The erroneous determination is detected by the user himself or by the maintenance person. For example, although the maintenance person visits the site based on the abnormality notification, there is no abnormality in the copying machine. In this case, the erroneous determination is detected by the maintenance person. Although there is no abnormality notification, if a failure occurs, the user can find the erroneous determination.

As the amount of normal data in the set information group increases, the erroneous determination rate gradually decreases as shown in FIG. 26. This decreasing tendency continues for a while, and settles at a certain value. At this stage, the deviation of the normal data distribution is corrected substantially completely, thereby increasing the determination accuracy up to saturation. Thereafter, even if the normal data in the set information group increases, the determination accuracy is not increased further, since the distribution is in the range of normal data already stored.

Figure 27:
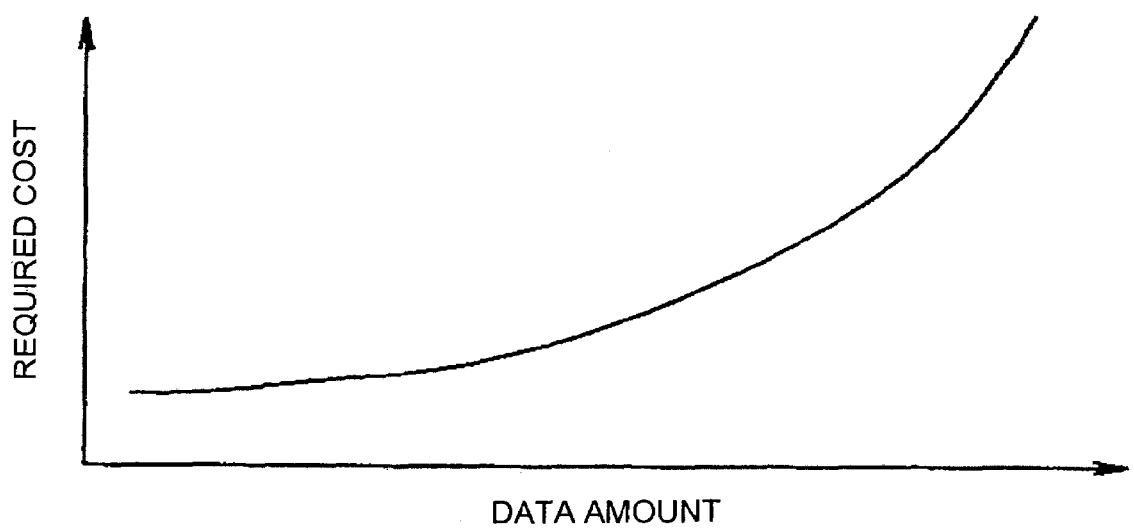
FIG. 27 is a graph of the relationship between cost required for abnormality determination and data amount in the set information group.

FIG. 27 is a graph of the relationship between the cost required for abnormality determination and data amount in the set information group. As shown in FIG. 27, as the data amount in the set information group increases, the required cost increases. Therefore, if unnecessary normal data is added continuously, useless cost is required.

Therefore, in the abnormality determining apparatus, when the erroneous determination incidence rate falls below a predetermined value, that is, when the determination accuracy increases to a certain degree, the period for performing the set information group construction process is terminated, to avoid inclusion of unnecessary normal data.

Third Embodiment

Another embodiment of the abnormality determining apparatus to which the present invention is applied is explained below.

The configuration of the image forming apparatus according to the third embodiment is the same as that shown in FIGS. 1 to 4, therefore, redundant explanations thereof are omitted.

The characteristic configuration of the copying machine is explained first.

Figure 28:
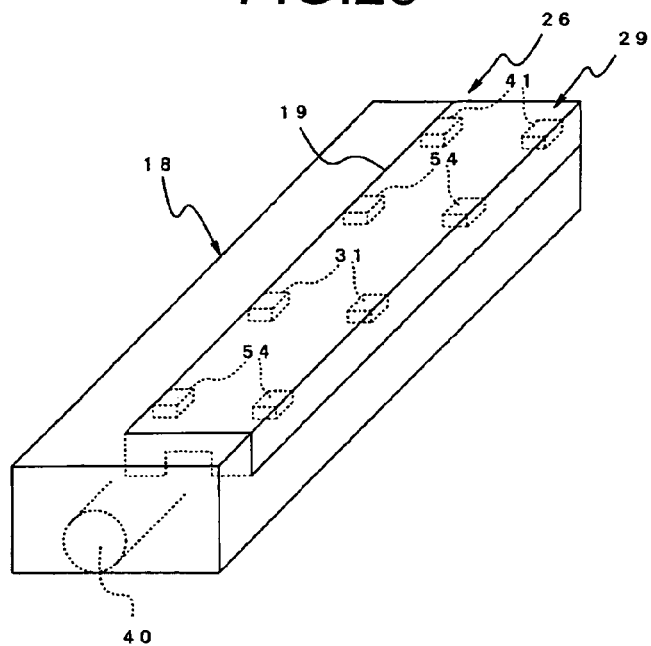
FIG. 28 is a perspective view of a configuration of a process unit in the copying machine.

FIG. 28 is a perspective view of any one of the process units for K, Y, M, and C. The configuration of the respective color process units is the same, suffixes K, Y, M and C added after the reference signs are omitted in FIG. 28. The process unit 18 includes a sensor support unit 19 detachably supported by the process unit body on the upper part thereof in the vertical direction. The sensor support unit 19 forms a part of a casing of the process unit 18, and a plurality of sensors is fixed at places, which are inside of the unit, when functioning as a part of the casing, that is, when being attached to the process unit body. Specifically, the sensor support unit 19 includes a first sensor row 26 having a plurality of sensors arranged in the axial direction of the photoconductor 40 and a second sensor row 29 arranged parallel to the first sensor row 26. These sensor rows respectively include two electrostatic microphones 54, one piezoelectric microphone 31, and an environmental sensor 41. One of the electrostatic microphones 54 is arranged at the end of the sensor row, the environmental sensor 41 is arranged at the other end, the other electrostatic microphone 54 is arranged next to the environmental sensor 41, and the piezoelectric microphone 31 is arranged between the two electrostatic microphones 54.

Figure 29:
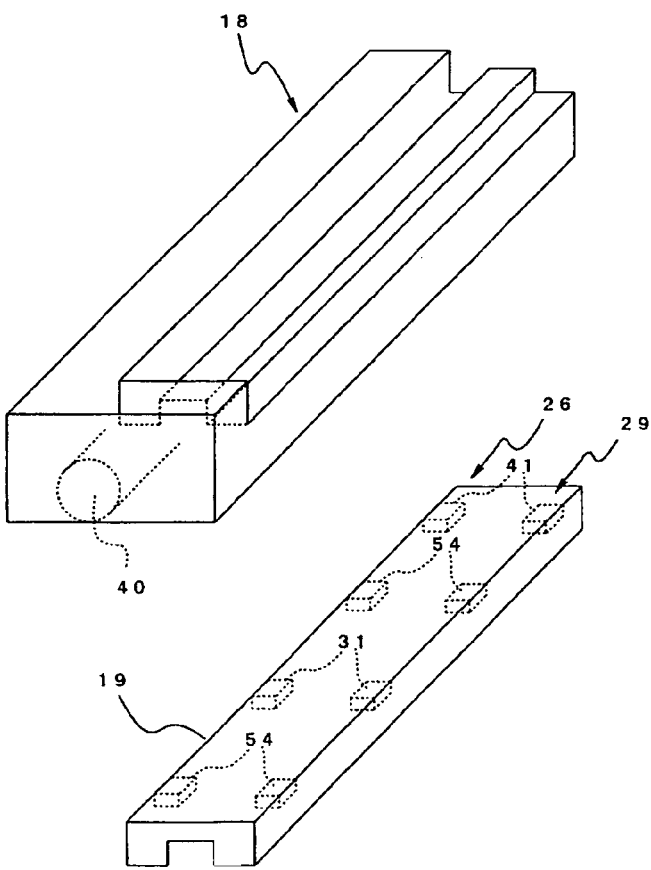
FIG. 29 is a perspective view of a configuration of a sensor support unit and a detached process unit.

The sensor support unit 19 in which the sensors that function as a part of the information obtaining unit are fixed, has a configuration, as shown in FIG. 29, detachable by one touch with respect to the process unit 18.

Figure 30:
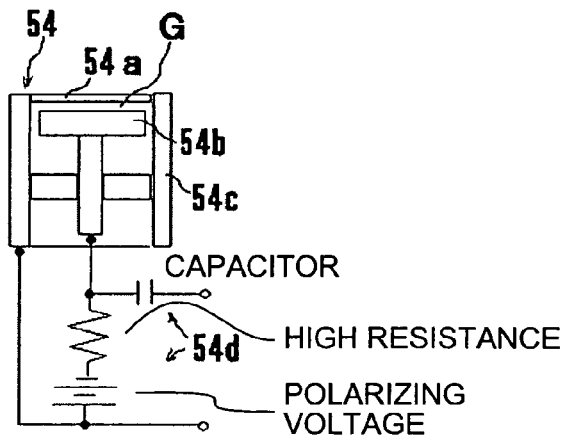
FIG. 30 is an explanatory diagram of a configuration of an electrostatic microphone in the sensor support unit.

The electrostatic microphone 54 as a tone detector that detects a tone pressure generated from the process unit 18 as the detection subject is suitable for detecting a high frequency tone signal. The electrostatic microphone 54 converts the tone pressure to an electric signal using a change in the electrostatic capacity, and includes, as shown in FIG. 30, a diaphragm 54a formed of an electrode, whose outside surface can be brought into contact with the outside air, a back plate 54b facing the inner surface thereof via a predetermined gap G, a nonconductive support body 54c that supports the diaphragm 54a and the back plate 54b, and a power circuit 54d that applies the voltage to the back plate 54b. When the diaphragm 54a vibrates by the tone pressure transmitted from outside, while the voltage is applied to the back plate 54b, the distance between the both electrodes changes. The electrostatic capacity between the both electrodes changes correspondingly thereto. The high frequency tone can be detected well by detecting the change in the electrostatic capacity.

The piezoelectric microphone 31 as a tone detector converts the tone pressure to an electric signal using a piezoelectric element by a well-known technique, and is suitable for detecting the low frequency tone.

Figure 31:
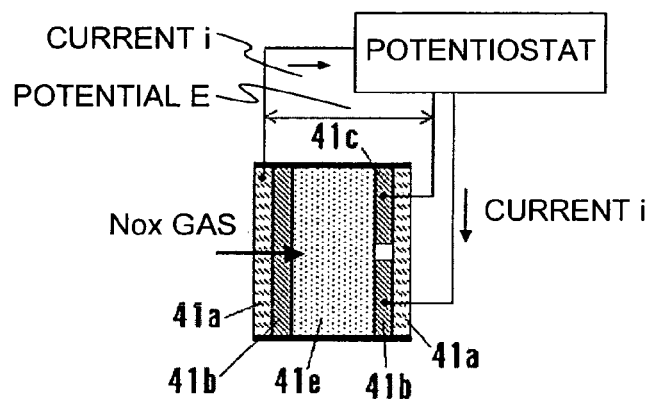
FIG. 31 is an explanatory diagram of a configuration of a nitrogen oxide detector of an environmental sensor in the sensor support unit.

The environmental sensor 41 can detect the temperature and humidity as the environmental information by the well-known technique. The environmental sensor 41 can also detect nitrogen oxide ($NO_x$) in the air as the environmental information. FIG. 31 is a diagram of a nitrogen oxide detector in the environmental sensor 41. The nitrogen oxide detector is formed of a controlled potential electrolysis sensor. In the nitrogen oxide detector, a working electrode 41b, an electrolyte 41e, a reference electrode 41c, and a counter electrode 41d are inserted between two gas permeable films 41a. The working electrode 41b is for causing a reaction in the nitrogen oxide having penetrated through the gas permeable films 41a. The reference electrode 41c becomes the basis of the electrochemical potential. The counter electrode 41d is for flowing a current I in a pair with the working electrode 41b opposite thereto via the electrolyte 41e. The nitrogen oxide contained in the air can be measured by measuring the value of the current i.

The copying machine determines the presence of abnormality in the respective process units 18 based on the tone information and the environmental information obtained by the microphone and the environmental sensor 41 in the respective process units 18. Specifically, the copying machine calculates the Mahalanobis distance according to the MTS method based on the set information formed of the tone information and the environmental information to determine whether an abnormality occurs in the apparatus.

To calculate the Mahalanobis distance, it is necessary to construct the set information group as the aggregate of various types of set information obtained from the copying machine in the normal state. The set information group is constructed at the time of operation based on the user's instruction, at the shipment destination of the copying machine. In the copying machine, the controller 1 functions as the determining unit that determines the presence of abnormality in the copying machine as the detection subject.

In a third embodiment, the obtained data table is the same as Table 1, the normalized data table is the same as Table 2, the normalized data is the same as equation 1, the reciprocal coefficient is the same as equation 2, the correlation coefficient matrix is the same as equation 3, the inverse matrix A is the same as equation 4, and the Mahalanobis distance is the same as equation 5, therefore, redundant explanations thereof are omitted. The series of processes from the set information group construction process to the matrix transformation process is the same as that shown in the flowchart of FIG. 6, and the procedure for calculating the Mahalanobis distance D based on the inverse matrix A and various obtained data is the same as that shown in FIG. 7, therefore, redundant explanations thereof are omitted.

After performing the set information group construction process for constructing the obtained data table, which is the set information group shown in Table 1, the copying machine constructs the inverse matrix A by a series of processes, that is, the information normalization process, the correlation coefficient calculation process, and the matrix transformation process, prior to performing the abnormality determination process. The copying machine then stores the inverse matrix A in the RAM 1b (see FIG. 4).

The copying machine in the respective examples where characteristic configurations are respectively added to the copying machine according to the third embodiment is explained.

EXAMPLE 1

Figure 32:
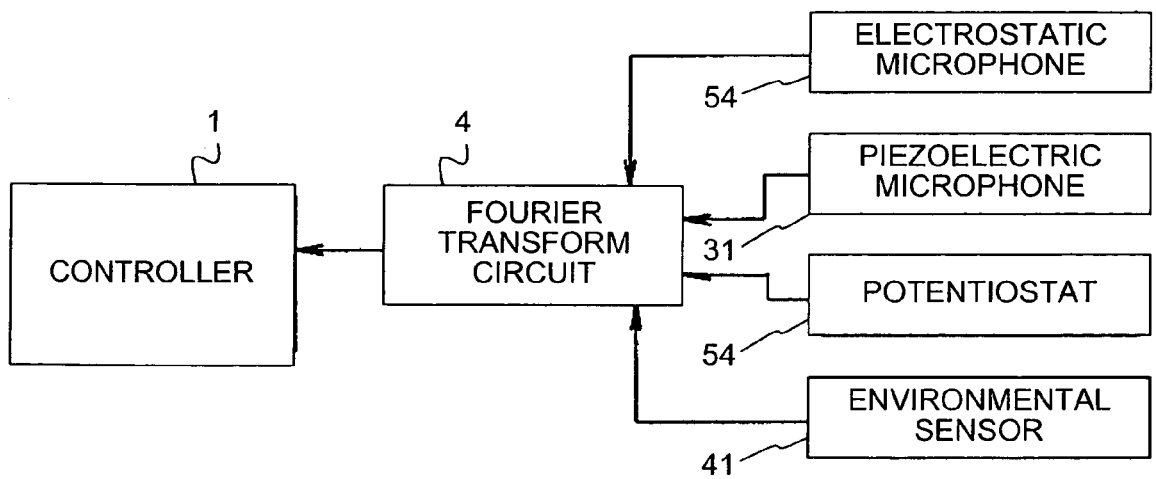
FIG. 32 is a block diagram of a partial configuration of an electric circuit of the copying machine according to a first embodiment of the present invention.

FIG. 32 is a block diagram of a part of the electric circuit of the copying machine according to Example 1. The controller 1 as the determining unit receives the tone signal output from the electrostatic microphone 54 or the piezoelectric microphone 31 not directly but via a Fourier transform circuit 4. The controller 1 constructs the obtained data table based on the Fourier-transformed tone signal. The tone information in which various frequencies are mixed can be analyzed for each frequency. In FIG. 32, only the microphone and the environmental sensor 41 for one process unit are shown for convenience sake. In reality, however, microphones and the environmental sensors 41 for four process units are connected to the controller 1.

Figure 33:
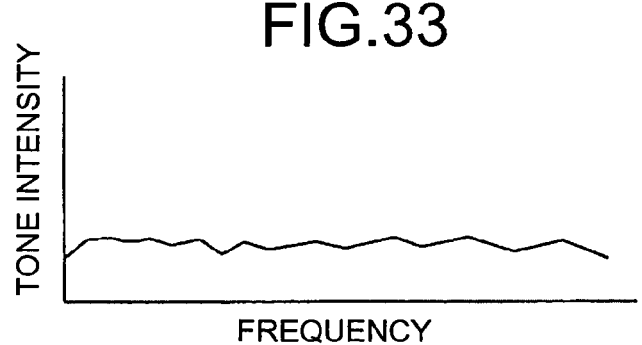
FIG. 33 is a graph of a waveform after Fourier transform of a low-frequency tone signal detected by a piezoelectric microphone in the process unit in the normal state.

FIG. 33 is a graph of a waveform after Fourier transform of a low-frequency tone signal detected by the piezoelectric microphone 31 in the process unit 18 in the normal state. When there is no abnormality in the process unit 18, the waveform becomes the one in which the tone intensity (amplitude) of respective frequencies in the low-frequency region appears substantially at the same value, without no undulation.

Figure 34:
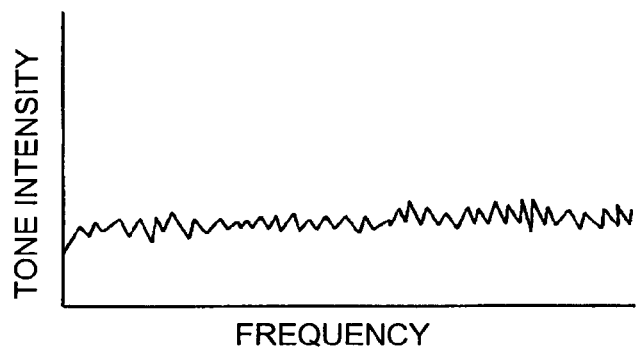
FIG. 34 is a graph of a waveform after Fourier transform of a low-frequency tone signal detected by an electrostatic microphone in the process unit in the normal state.

FIG. 34 is a graph of a waveform after Fourier transform of a high-frequency tone signal detected by the electrostatic microphone 54 in the process unit 18 in the normal state. When there is no abnormality in the process unit 18, as shown in FIG. 34, also in the high-frequency region, the waveform does not have undulations and the tone intensity (amplitude) of respective frequencies appears substantially at the same value.

Figure 35:
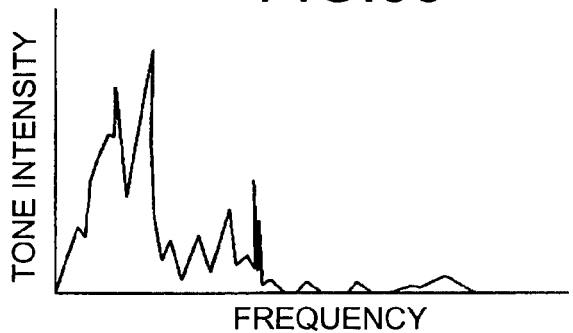
FIG. 35 is a graph of a waveform after Fourier transform of a low-frequency tone signal detected by the piezoelectric microphone in the process unit in an abnormal state.
Figure 36:
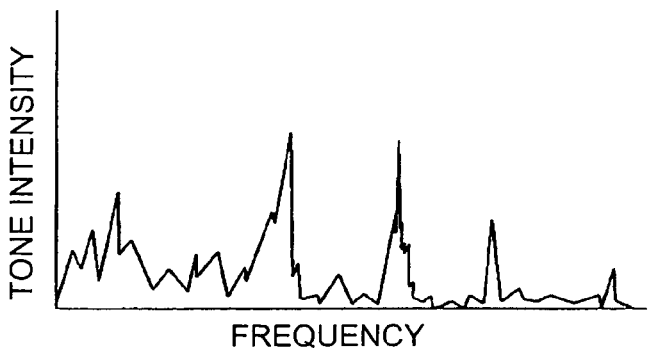
FIG. 36 is a graph of a waveform after Fourier transform of a low-frequency tone signal detected by the electrostatic microphone in the process unit in an abnormal state.

FIGS. 35 and 36 are graphs of a waveform after Fourier transform of a low- and a high-frequency tone signal detected respectively by the piezoelectric microphone 31 and the electrostatic microphone 54 in the process unit 18 in an abnormal state. When there is an abnormality in the process unit 18, as shown in FIGS. 35 and 36, the tone intensity (amplitude) of respective frequencies have often greatly different values for each frequency. However, according to the structure and the characteristics of the process unit 18, even in the normal state, only the tone component of a particular frequency can change largely according to the circumstances. Therefore, even if the tone intensity of a particular frequency has largely changed, it does not always indicate an abnormal state. In the copying machine, therefore, with regard to the tone signal output from the respective microphones and subjected to Fourier transform, the tone intensity is numerically converted for each of predetermined frequency, and stored in the obtained data table. Thus, the tone intensity is numerically converted for each frequency and included in the set information group, and based on this, the Mahalanobis distance is obtained. Accordingly, a difference in the waveform in the normal state can be determined as normal.

In the copying machine, the temperature, humidity, and concentration of nitrogen oxide in the air obtained by the environmental sensor 41 is taken in as a part of the set information group, in addition to the tone information obtained by the respective microphones. In this configuration, even if the temperature, humidity, and concentration of nitrogen oxide are changed, the degree of normality of the tone can be determined based on the reference corresponding to the value after the change. For example, under a high-humidity environment where the frictional resistance between the cleaning blade 75 and the photoconductor 40 becomes relatively large, even if the tone signal has a waveform having noticeable undulations, it can be avoided that it is erroneously determined to be abnormal. Accordingly, the presence of abnormality can be accurately determined regardless of an environmental change.

While an example where the abnormality determining apparatus is installed in the copying machine has been explained above, the abnormality determining apparatus and the copying machine can be formed separately. In this case, a reception unit in the abnormality determining apparatus that receives various types of information transmitted from the copying machine via the communication line functions as the information obtaining unit in the abnormality determining apparatus, instead of the various sensors or the controller installed in the copying machine. The abnormality determination or diagnosis can be performed in a remote place far away from the copying machine. Furthermore, a plurality of copying machines can be centrally controlled by one abnormality determining apparatus, thereby enabling abnormality determination in respective copying machines. If a transmission unit that transmits the determination result to external devices via the communication line is provided in the abnormality determining apparatus, the determination result can be transmitted and informed to operators of respective copying machines installed at different remotes places. For the communication line, wired and wireless communication lines can be used, and other than electric lines, all sorts of lines, such as the one using an optical fiber, can be used. Furthermore, an example where the Mahalanobis distance is obtained based on only the tone information and the environmental information has been explained. However, the Mahalanobis distance can be obtained based on other types of information in addition to these types of information, for example, vibrations, the toner concentration, the photoconductor potential, the coloring area ratio, and the like obtained by the above-described specific obtaining method of various types of information.

In the copying machine according to the third embodiment, the Fourier transform circuit 4, which is the Fourier transform unit that subjects the tone signal detected by the piezoelectric microphone 31 or the electrostatic microphone 54 as the tone detector, is provided, so that the presence of abnormality in the process unit 18 as the detection subject is determined based on the Fourier transformed signal. In this configuration, the intensity of the detected tone is analyzed for each frequency, thereby enabling detection of variation forms of various tones. Accordingly, variations of the tone due to the occurrence of abnormality can be accurately detected.

In the copying machine according to the embodiment, since a plurality of microphones as the tone detector is provided, tones in various directions in the process unit are respectively detected and used for the abnormality determination.

In the copying machine according to the third embodiment, since the piezoelectric microphone 31 and the electrostatic microphone 54 are provided as a plurality of tone detectors, the tone signal components from a low frequency to a high frequency can be accurately detected.

In the copying machine according to the third embodiment, since the environmental sensor 41 including a temperature detector that detects the temperature and a humidity detector that detects the humidity is provided as the environmental information detector, abnormality in the tone can be detected regardless of a change in the temperature or the humidity, by reflecting the relationship between a change in the temperature and the humidity and a change in the tone at the time of abnormality detection.

In the copying machine according to the third embodiment, since the environmental sensor 41 that detects nitrogen oxide in the air is provided as the environmental information detector, abnormality in the tone can be detected regardless of a change in nitrogen oxide in the air, by reflecting the relationship between a change in nitrogen oxide and a change in the tone at the time of abnormality detection. Accordingly, even under the environment of high nitrogen oxide density, in which a phenomenon referred to as image deletion likely occurs, a change in the tone resulting from the occurrence of image deletion is caught, thereby accurately determining an abnormality in the tone.

In the copying machine according to the third embodiment, the photoconductor 40 as the image carrier and the photoconductor cleaning apparatus 63 as the cleaning unit are formed in one unit supported by a common support body as the process unit 18, which is detachable with respect to the image forming apparatus. Various microphones as the tone detector and the environmental sensor 41 as the environmental information detector are arranged in the process unit 18. In this configuration, an abnormality occurring in the process unit 18 can be detected based on the tone generated in the unit.

In the copying machine according to the third embodiment, the respective microphones as the tone detector and the environmental sensor 41 as the environmental information detector are fixed detachably to a unit casing as the support body. In this configuration, at the time of replacing the process unit, only the unit body is replaced and the respective sensors are used again, or at the time of recycling the process unit, reproduction of the respective microphones is facilitated, thereby realizing a cost reduction.

In the copying machine according to the third embodiment, a plurality of process units 18 is provided, and the secondary transfer unit 22 as the transfer unit is formed so as to superpose and transfer a toner image as a visible image developed on the respective photoconductors 40 in the respective process units 18 to the transfer paper as the transfer body. The controller 1 as the determining unit is formed so as to determine the presence of abnormality in the respective process units 18, respectively, based on the detection result by the microphones and the environmental sensor 41 in the respective process units. In this configuration, the presence of abnormality in the respective process units can be determined individually, while a multicolor image is formed by superposing the respective toner images formed in the respective process units.

Fourth Embodiment

Embodiment 4-1

Another embodiment of the abnormality determining apparatus to which the present invention is applied is explained below.

The configuration of the image forming apparatus according to a fourth embodiment is the same as that shown in FIGS. 1 to 3, and the characteristic configuration of the copying machine is the same as that shown in FIGS. 8 to 12, therefore, redundant explanations thereof are omitted.

The abnormality determining apparatus 600 determines the presence of abnormality in the copying machine as the detection subject, based on the set information formed of the various types of information obtained by various sensors that functions as the information obtaining unit 601, the main controller, and the operation display unit in the copying machine 500. Specifically, the abnormality determining apparatus 600 obtains the Mahalanobis distance according to the MTS method based on the set information, and determines whether an abnormality has occurred in the apparatus. To obtain the Mahalanobis distance, it is necessary to construct the normal data group as the set information group, which is the aggregate of the various types of set information obtained by the copying machine in the normal state; however, the construction is not performed for individual product of the copying machine. It is performed based on the set information obtained from the standard copying machine in the factory or the like. The set information for each product can be obtained at the time of shipment and added to the normal data group stored beforehand.

In a fourth embodiment, the obtained data table is the same as Table 1, the normalized data table is the same as Table 2, the normalized data is the same as equation 1, the correlation coefficient is the same as equation 2, the correlation coefficient matrix is the same as equation 3, the inverse matrix A is the same as equation 4, and the Mahalanobis distance is the same as equation 5, therefore, redundant explanations thereof are omitted. The series of processes from the set information group construction process to the matrix transformation process is the same as that shown in the flowchart of FIG. 6, and the procedure for calculating the Mahalanobis distance D based on the inverse matrix A and various obtained data is the same as that shown in FIG. 7, therefore, redundant explanations thereof are omitted.

After performing the set information group construction process for constructing the obtained data table, which is the set information group shown in Table 1, the copying machine constructs the inverse matrix A by a series of processes, that is, the information normalization process, the correlation coefficient calculation process, and the matrix transformation process, prior to performing the abnormality determination process. The copying machine then stores the inverse matrix A in the information storage unit 602 (see FIG. 9).

When the normalized data group is to be constructed, k types of information $(y_{11}, y_{12}, \ldots, y_{1k})$ forming the first set of the set information is respectively obtained by the information obtaining unit of the standard machine. The information is stored in the information storage unit as the data of the first line in the data table. K types of information $(y_{21}, y_{22}, \ldots, y_{2k})$ forming the second set of the set information is respectively obtained by the standard machine, and stored as the data of the second line in the data table. Subsequently, the third set and after are sequentially obtained and stored as the data in the data table. The n-th set of the set information is then obtained and stored as the data of the n-th line in the data table. Thus, when the necessary amount of set information (n sets) is obtained, an average of n and a standard deviation (s) are obtained for the k types of information forming the respective pieces of set information, and stored in the obtained data table as the data of the (n+1)-th line and the (n+2)-th line.

The copying machine is shipped in the state with 10 inverse matrices A being stored in the information storage unit 602 in the abnormality determining apparatus 600. These inverse matrices A are respectively independently constructed based on the set information obtained from 10 standard copying machines different from each other, and the correlation coefficients in the ten pieces of set information are slightly different from each other. Those standard copying machines are confirmed to be in the normal state. It is not made clear why the correlation coefficients are slightly different, although all in the normal state.

A matrix selection table shown in Table 3 below is also stored in the information storage unit 602.

TABLE 3

| Selection number | Inverse matrix name |
|---|---|
| 1 | Inverse matrix A1 |
| 2 | Inverse matrix A2 |
| 3 | Inverse matrix A3 |
| 4 | Inverse matrix A4 |
| 5 | Inverse matrix A5 |
| 6 | Inverse matrix A6 |
| 7 | Inverse matrix A7 |
| 8 | Inverse matrix A8 |
| 9 | Inverse matrix A9 |
| 10 | Inverse matrix A10 |

The matrix selection table associates file names of 10 inverse matrices A stored in the information storage unit 602 with selection numbers added to the respective inverse matrices A.

Figure 37:
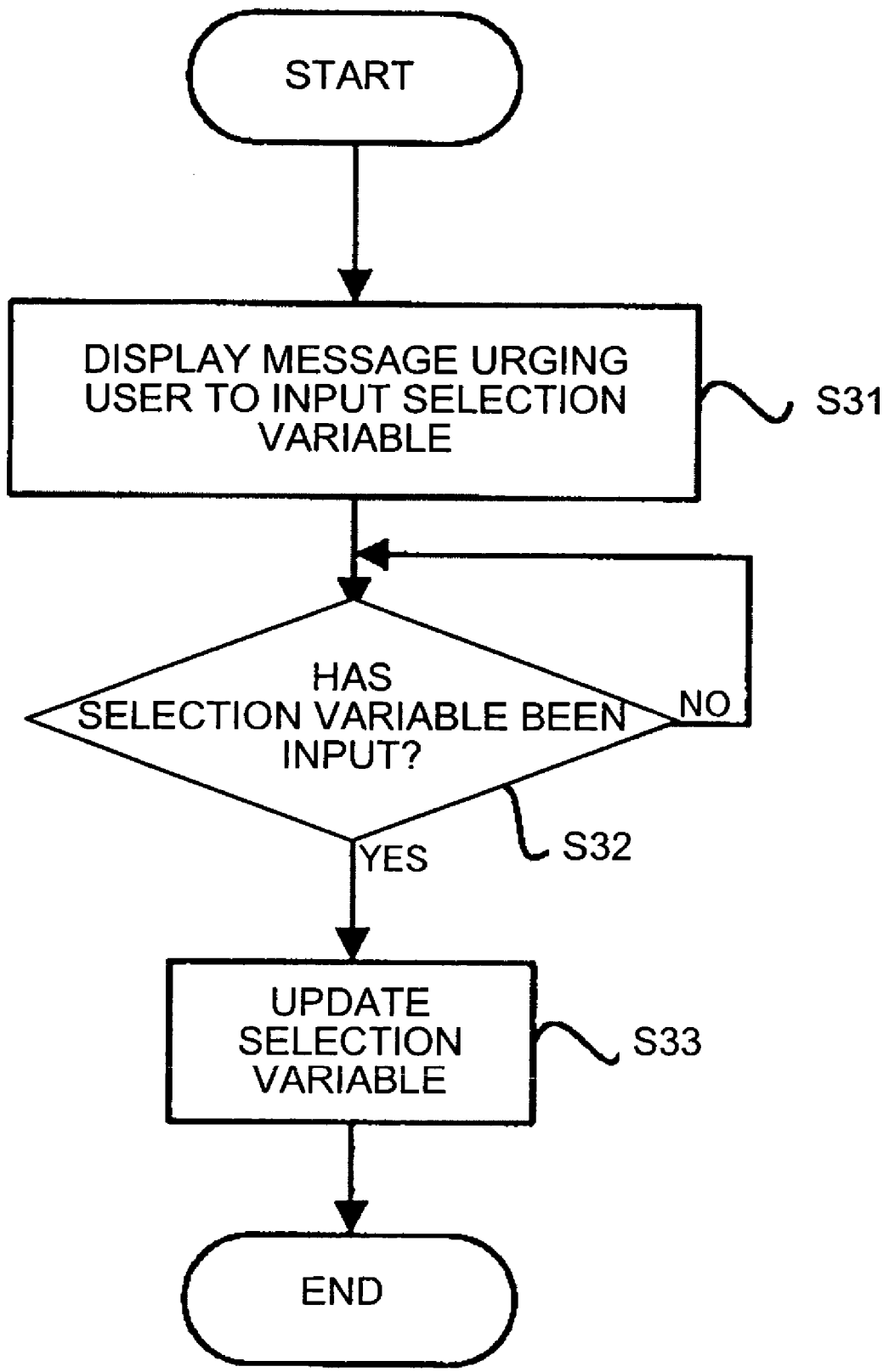
FIG. 37 is a flowchart of a matrix selection variable setting process.

FIG. 37 is a flowchart of a control flow of matrix selection variable setting process performed by the abnormality determining unit 602 in the abnormality determining apparatus 600. When the operator inputs the information for starting the selection variable setting process to the information input unit 604, the selection variable setting process is started. When the process is started, a message urging the operator to input a value of the selection variable is displayed on the display unit (not shown) (S31). When the value of the selection variable is input to the information input unit 604 in response to the message (S32, Yes), the value of the selection variable stored in the information storage unit 602 is updated to the input value (S33), and a series of control flow finishes.

Figure 38:
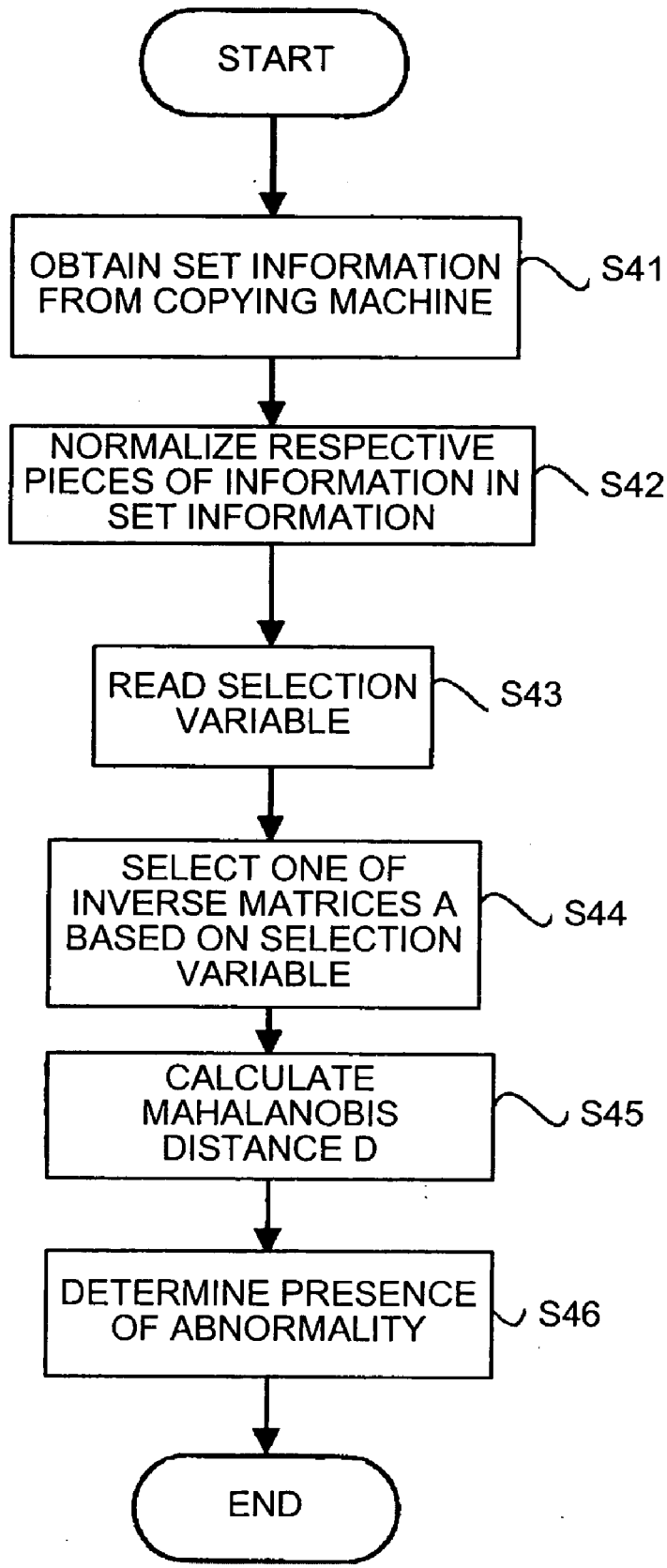
FIG. 38 is a flowchart of an abnormality determination process performed by a determining unit in the abnormality determining apparatus.

FIG. 38 is a flowchart of the control flow of the abnormality determination process performed by the determination unit 603 in the abnormality determining apparatus 600. When the abnormality determination process is started, the set information is obtained from the copying machine by the information obtaining unit 601 (S41), and then respective pieces of information in the set information is normalized (S42). The value of the selection variable stored in the information storage unit 602 is then read (S43), to specify the inverse matrix A, of the 10 inverse matrices A stored in the information storage unit 602, associated with the selection number of the same value as that of the selection variable read at S3 (see Table 3) (S44). The Mahalanobis distance D is then calculated based on the specified inverse matrix A and the respective pieces of information normalized at S42 (S45), and the presence of abnormality is determined by a comparison between the Mahalanobis distance D and the threshold (S46).

In the abnormality determination process, the determining unit 603 selects one inverse matrix A the same as the selection variable, which is the information input to the information input unit 604, out of 10 inverse matrices A stored in the information storage unit 602, and uses the inverse matrix A for abnormality determination. In this configuration, an operator sets a selection variable corresponding to the inverse matrix A by empirically finding which one of the 10 inverse matrices A is suitable for the copying machine held by the operator, or by using the information provided from a manufacturer. Accordingly, the presence of abnormality can be accurately determined, regardless of the production lot of the copying machine.

Embodiment 4-2

The copying machine according to embodiment 4-2 to which the present invention is applied is explained below. The basic configuration of the copying machine according to this embodiment is the same as the embodiment 4-1, unless otherwise specified.

The copying machine is shipped in the state with an inverse matrix A for spring and summer, and an inverse matrix A for fall and winter being stored in the information storage unit 602 in the abnormality determining apparatus 600. The inverse matrix A for spring and summer is constructed based on the set information obtained from the standard machine, for which trial run has been carried out in spring and summer. The inverse matrix A for fall and winter is constructed based on the set information obtained from the standard machine, for which trial run has been carried out in autumn and winter.

Figure 39:
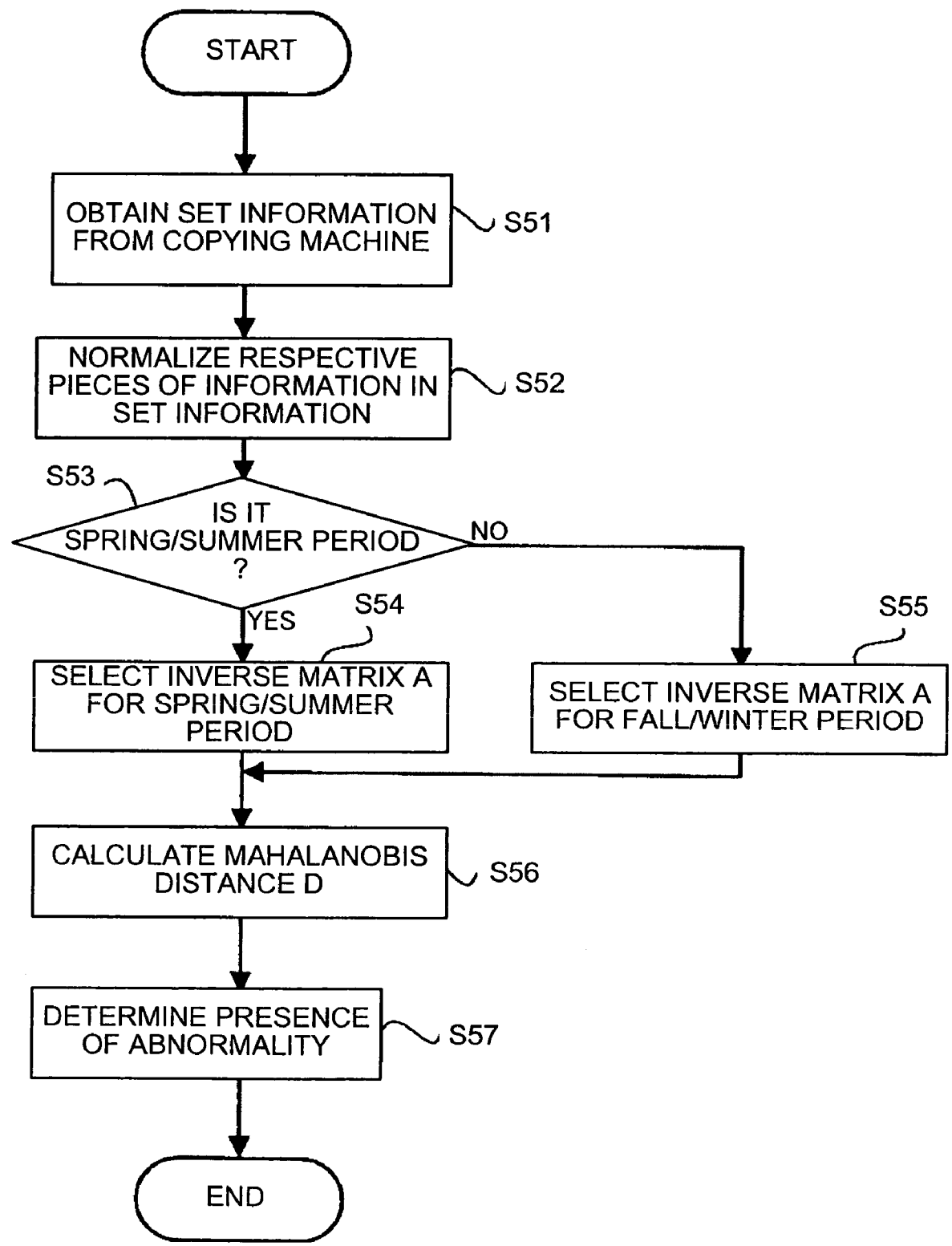
FIG. 39 is a flowchart of the abnormality determination process performed by the determining unit in the abnormality determining apparatus of the copying machine according to the embodiment.

FIG. 39 is a flowchart of the control flow of the abnormality determination process performed by the determining unit 603 in the abnormality determining apparatus 600 of the copying machine. When the abnormality determination process is started, the set information is obtained from the copying machine by the information obtaining unit 601 (S51), and then various types of information in the set information is normalized (S52). Subsequently, it is determined whether it is the spring/summer period at present based on the recorded time of the date by a clock circuit (S53). When it is the spring/summer period (S53, Yes), the inverse matrix A for spring and summer is selected (S54). On the other hand, when it is not spring/summer period (S53, No), the inverse matrix A for fall and winter is selected (S55). Subsequently, the Mahalanobis distance D is calculated based on the selected inverse matrix A and the respective pieces of information normalized at S52 (S56), and then the presence of abnormality is determined by comparing the Mahalanobis distance b with the threshold (S57).

In this abnormality determination process, an inverse matrix A appropriate to the season at the time of abnormality determination is selected and used for the abnormality determination throughout the year. Accordingly, the presence of abnormality in the copying machine can be accurately determined regardless of the season.

Embodiment 4-3

The copying machine according to embodiment 4-3 to which the present invention is applied is explained below. The basic configuration of the copying machine according to this embodiment is the same as the embodiment 4-1, unless otherwise specified.

The abnormality determining apparatus 600 in the copying machine includes a modem (not shown) as a reception unit that receives the inverse matrix A transmitted from a maintenance service company via the telephone line as the communication line. The abnormality determining apparatus 600 also includes an information update unit (not shown) that stores an inverse matrix A received by the modem, replacing the inverse matrix A stored in the information storage unit 602.

In this configuration, the inverse matrix A stored in the information storage unit 602 can be updated corresponding to the season or the production lot of the copying machine. Accordingly, the presence of abnormality in the copying machine can be accurately determined regardless of the season or the production lot.

Embodiment 4-4

The copying machine according to embodiment 4-4 to which the present invention is applied is explained below. The basic configuration of the copying machine according to this embodiment is the same as the embodiment 4-1, unless otherwise specified.

Figure 40:
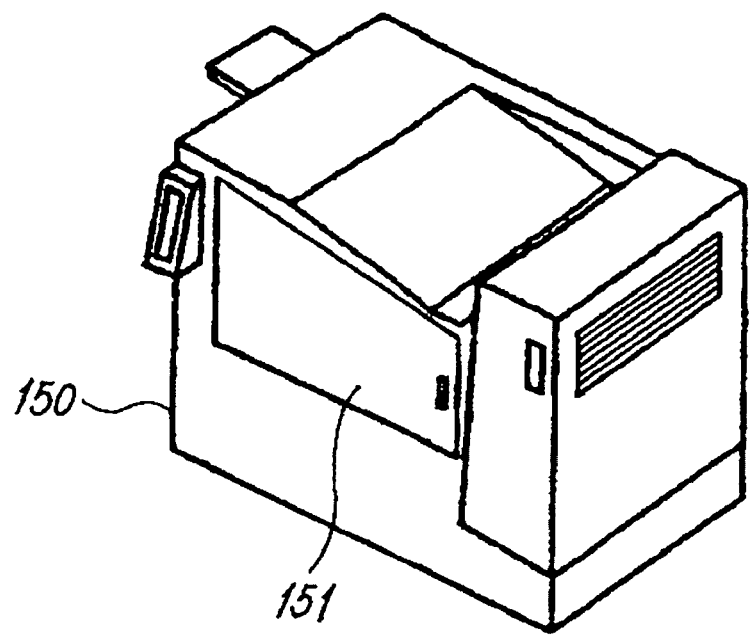
FIG. 40 is a perspective view of the printer unit in the copying machine according to the embodiment.
Figure 41:
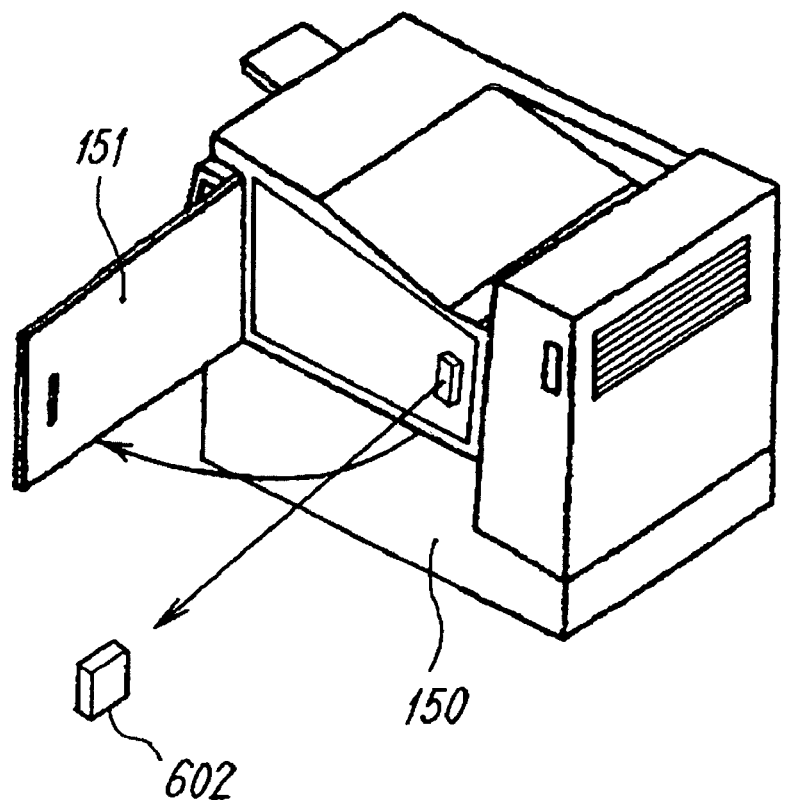
FIG. 41 is a perspective view of the printer unit when a front door is opened.

FIG. 40 is a perspective view of a printer unit (100) in the copying machine. A front door 151 is openably/closably fitted to an exterior cover 150 as a housing of the printer unit. When the front door 151 is opened, as shown in FIG. 41, a front opening of the exterior cover 150 opens widely, and the information storage unit 602 such as a hard disk mounted inside is exposed. The information storage unit 602 is detachable from the printer unit through the opening opened by the front door 151.

In this configuration, the inverse matrix A used by the determining unit 603 can be changed corresponding to the season or the production lot of the copying machine by changing the detachable information storage unit 602. Accordingly, the presence of abnormality in the copying machine can be accurately determined.

Fifth Embodiment

Embodiment 5-1

An embodiment of an information obtaining method for obtaining the information accumulated in the copying machine as the image forming apparatus is explained as embodiment 5-1 of the present invention.

FIG. 42 is a flowchart of the outline of an operation process in the information obtaining method according to embodiment 5-1. In the information obtaining method, a maintenance person of a service providing organization that offers maintenance service for the copying machine performs a character image forming process in which electronic information stored in the information storage unit such as the hard disk or the RAM of the copying machine is printed out as a character image by the copying machine at the user's place (step 1: hereinafter, step is described as S). The electronic information stored in the information storage unit of the copying machine includes detection information by various sensors, the control parameter information, variable count information, and the like.

FIG. 43 is an explanatory diagram of an example of printout paper, on which a character image is formed by the copying machine in the character image forming process. In FIG. 43, the counter value is a cumulative count value of the number of printouts. As the counter value, total counter value, monochrome counter value, color counter value, single color counter value, two-sided counter value, and A3 counter value are stored. The total counter value is an unconditionally counted value at the time of performing printout, regardless of the color of the printout image, the size of the printout paper, and classification of the two-sided print and single-sided print. The monochrome counter value is a value counted at the time of performing monochrome printing. The color counter value is a value counted at the time of performing two or more color printing. The single color counter value is a value counted at the time of performing one color printing other than black. The two-sided counter value is a value counted at the time of performing two-sided printing. The A3 counter value is a value counted at the time of performing printout on recording paper of A3 size.

The number of photoconductor operation is the number of rotation of the photoconductor. The number of operation of the developing device is the number of rotation of a developing roller. The number of fixing operation is the number of rotation of the fixing roller or the number of orbits of a fixing belt. The number of transfer operation is the number of orbits of the intermediate transfer belt. The average image area ratio is a value obtained by multiplying an accumulated mean value of image area ratio for each printout by 100. The image area ratio for each printout is a value obtained by multiplying by 100 a value obtained by dividing an image area on the printout paper calculated based on the number of output pixels by the page total area. The average image area ratio is calculated for each of Y, M, C, and K.

The development starting voltage is a value of developing bias applied to the developing sleeve at the time of starting the developing operation in the developing device. The developing device is provided for each color of Y, M, C, and K, hence, the development starting voltage is stored for each color.

These various types of information are stored as the electronic information in the information storage unit in the copying machine. The maintenance person prints out these various types of information as a character image as shown in FIG. 43 by inputting a special code to the operation panel of the copying machine. When the character image formation process is completed in this manner, information converting process (see FIG. 42) for converting the character image on the printout paper to electronic character data is performed, using an information processor such as a personal computer or an information terminal, which is not connected to the user's copying machine. Accordingly, the electronic information stored in the user's copying machine is indirectly obtained and stored in the information processor. In this information obtaining method, the electronic information stored in the copying machine is stored in the information processor without connecting the information processor in the service providing organization to the user's copying machine via the telephone line or cable. The electronic information to be obtained can be confirmed beforehand by the user as the character image on the printout paper. Accordingly, the user will not have a concern about the leakage of the individual information and confidential information.

The information converting process can be performed at the user's place by using the information processor brought in by the maintenance person, or the maintenance person can bring the printout paper to his office and perform the process. As a specific mode of the information converting process, for example, there is an instance that the character information is manually input by a key operation of the information processor, based on the character image recorded on the printout paper. In this case, however, manual input requires lots of time and energy. Therefore, it is desired to perform the following processes prior to the information converting process. That is, an image read process in which the character image on the printout paper is read by an image reader such as a scanner and then converted to electronic image data, and an information input process in which the electronic image data is input to the image processor. After performing these processes, in the information converting process, character identification/conversion process for identifying the character image included in the electronic image data input beforehand and converting the image to electronic character data (electronic text document) is performed with respect to the information processor. As the character identification/conversion process, a well known optical character recognition (OCR) process can be used. Accordingly, the time and energy for manually inputting the character information to the information processor can be eliminated, thereby enabling efficient operation.

Figures 44, 45:
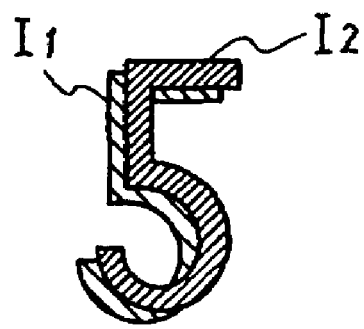
FIG. 44 is an explanatory diagram of another example of the printout paper.
FIG. 45 is an explanatory diagram of an example of a control program document read by a scanner in the copying machine.

In the character identification/conversion process, the identification accuracy by the information processor has a limitation, and misrecognition of characters cannot be avoided. Thereby, erroneous information may be obtained. When the character identification/conversion process is performed, therefore, it is desired to confirm the presence of misrecognition of characters according to the following manner. That is, at first, a character data imaging process for converting the electronic character data obtained by the character identification process to electronic image data such as bitmap data according to a well-known technique is performed by the information processor. A data synthesis process is then performed by the information processor for synthesizing the electronic image data (hereinafter, "electronic image data after character recognition") and the electronic image data obtained by reading the printout image provided from the user by the image reader (hereinafter, "original electronic image data") according to a well-known technique to form one electronic image data. A process for forming the character image based on the synthesized electronic image data by the image forming apparatus such as a printer installed in the service providing organization is then performed by the information processor, to print out the character image. According to this printout, for example as shown in FIG. 44, each character image I1 in the original electronic image data and each character image I2 in the electronic image data after character recognition are superposed and printed out. When misrecognition occurs in the character identification/conversion process, as shown by the arrow in the drawing, visual check of the character becomes difficult due to the superposition of the misrecognized character and the original character, therefore, the misrecognized character can be easily identified. If the original electronic image data and the electronic image data after character recognition are printed out in different colors, identification of the misrecognized character becomes easier.

A method of determining the presence of slight chronic abnormality in the copying machine based on various types of information obtained by the information obtaining method according to the embodiment 5-1 is explained next.

This determination is performed, for example, by obtaining the Mahalanobis distance according to the MTS method. To obtain the Mahalanobis distance, it is necessary to construct the set information group, which is the aggregate of various types of set information obtained from the copying machine in the normal state. This construction is performed by obtaining various types of information according to the information obtaining method in the first embodiment.

The obtained data table in this embodiment is the same as Table 1, the normalized data table is the same as Table 2, the normalized data is the same as equation 1, the reciprocal coefficient is the same as equation 2, the correlation coefficient matrix is the same as equation 3, the inverse matrix A is the same as equation 4, and the Mahalanobis distance is the same as equation 5, therefore, redundant explanations thereof are omitted. The series of processes from the set information group construction process to the matrix transformation process is the same as that shown in the flowchart of FIG. 6, and the procedure for calculating the Mahalanobis distance D based on the inverse matrix A and various obtained data is the same as that shown in FIG. 7, therefore, redundant explanations thereof are omitted.

In the set information group construction process, k types of information constituting the first set of set information $(y_{11}, y_{12}, \ldots y_{1k})$ are respectively obtained based on the printout paper, and stored in the information storage unit in the information processor as data of the first row in the data table. Subsequently, k types of information constituting the second set of set information $(y_{21}, y_{22}, \ldots y_{2k})$ are respectively obtained based on the printout paper, and stored in the information storage unit in the information processor as data of the second row in the data table. Thereafter, the third set of set information onward are sequentially obtained accompanying the print job, and stored as the data in the data table. The n-th set information is then obtained, and stored in the information storage unit as the data of the n-th row in the data table. After the predetermined period has passed, an average and a standard deviation ($\sigma$) of the respective n groups are determined for the k types of information constituting each set of set information and stored in the information storage unit in the information processor as data on the n+1 and n+2 rows.

Embodiment 5-2

An embodiment 5-2 is explained next. The configuration of the electrophotographic copying machine is the same as that shown in FIGS. 1 to 4, therefore, redundant explanations thereof are omitted.

In FIG. 4, the controller 1 regularly controls printout of the status information obtained accompanying the print job and stored in the RAM 1*b* or the hard disk as the character image, for example, as shown in FIG. 43. The printout paper on which such a character image is formed can be stocked by the user, and collected by the maintenance person. When the user stocks the printout paper, the user can visually confirm the content of information to be provided to the maintenance person. The maintenance person can obtain the status information of the copying machine according to the character image formed on the printout paper provided from the user, without connecting the information terminal to the copying machine. Accordingly, the maintenance person can obtain the status information stored in the hard disk or the like, without causing a concern about leakage of the personal information and the confidential information.

Printout of the status information can be regularly performed for each passage of predetermined time, or performed based on an instruction of the user or the maintenance person. When it is carried out regularly, such a situation that a large amount of printout is performed on one occasion, thereby occupying the copying machine can be avoided. When the printout is carried out based on the instruction, stain on the paper can be avoided when the printout paper is stocked by the user for long time.

In this configuration, when the character image of the status information stored in the hard disk or the like is printed out regularly, regardless of the presence of instruction from the operator, the time and energy of the user described below can be saved. That is, the user does not have to sort out whether the printout paper ejected onto the paper ejection tray 57 is obtained by the normal printout or by regularly outputting the character image of the status information.

It is desired that a stock device 28 as a second mounting unit exclusive for mounting the printout paper of the status information character image be arranged in the housing of the copying machine body, as shown in FIG. 4. Thereby, such a situation can be avoided that while the printout paper of the status information character image is exposed to the outside of the machine and stocked for long time, the printout paper is soiled.

The controller 1 is constructed so as to control deletion of the status information printed out as the character image from the information storage unit such as the hard disk after the character image is printed out. In this configuration, the status information in the information storage unit can be regularly deleted, thereby reducing the storage capacity.

Furthermore, when controlling the printout of the status information as the character image, the controller 1 performs a process for forming a predetermined standard image together with the character image. In this configuration, the maintenance person can understand the status of the image forming unit in the copying machine based on the image quality of the predetermined standard image.

Embodiment 5-3

An embodiment of the copying machine in which the technique for updating the control program is improved is explained as embodiment 5-3 of the present invention. The basic configuration of the copying machine according to this embodiment is the same as the embodiment 5-2, unless otherwise specified.

The control program for the control performed by the controller 1 is stored in the RAM 1a or the hard disk (not shown). When a predetermined input operation is performed with respect to the operation display unit by the maintenance person, a control program update process is performed. In this control program update process, the maintenance person is urged to set a control program document in the scanner 300, by a display on the operation display unit. The control program document is a document on which a character image in instruction words of the control program is printed, for example, as shown in FIG. 45. In the example shown in FIG. 45, a control program document when hexadecimal data array (address and data) is stored as the instruction words is shown.

When the maintenance person sets the control program document, the controller 1 makes the scanner 300 read the character image on the document as electronic image data. After the characters in the read electronic image data are identified by the method such as OCR and converted to electronic character data, the aggregate of the instruction words in the electronic character data is stored in a program storage unit such as the hard disk as a new control program, thereby updating the control program. In this configuration, the controller 1 functions as the character identification/conversion unit. The control program can be updated without connecting the information terminal to the copying machine. Accordingly, the control program can be updated, without causing a concern about leakage of the personal information and the confidential information.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An abnormality determining apparatus comprising:
an information obtaining unit that obtains a plurality of various types of information relating to a detection subject;
an information storage unit that stores therein a set information group formed of an aggregate of pieces of set information, which is a combination of the various types of information;
a determining unit that determines presence of abnormality in the detection subject based on the set information group stored in the information storage unit and the various types of information obtained by the information obtaining unit;
a timing obtaining unit that obtains a time point at which a predetermined period elapses since any one of start of use of the detection subject after factory shipment and repair of the detection subject;
a controlling unit that provides a control to sequentially store, until the time point is reached, the various types of information obtained by the information obtaining unit in the information storage unit to construct the set information group, and once the time point has passed, causes the determining unit to determine the presence of the abnormality in the detection subject based on the set information group and the various types of information obtained by the information obtaining unit and
an input unit to input a period value indicative of the predetermined period in the information storage unit, wherein the timing obtaining unit obtains the time point based on the period value stored in the information storage unit.

2. The abnormality determining apparatus according to claim 1, wherein the controlling unit determines whether an information value relating to at least a first information among the various information obtained by the information obtaining unit satisfies a predetermined condition, and if the information value relating to the first information satisfies the predetermined condition, deletes set information stored in a certain period going back from the point in time when the first information is obtained from the set information group.

3. The abnormality determining apparatus according to claim 1, further comprising an abnormality occurrence information input unit that inputs abnormality occurrence information indicative of occurrence of abnormality,
wherein the controlling unit deletes set information stored during a predetermined second period going back from input of the abnormality occurrence information from the set information group.

4. The abnormality determining apparatus according to claim 1, wherein the controlling unit calculates a Mahalanobis distance based on the set information group and the various types of information obtained by the information obtaining unit,
wherein the determining unit determines the presence of abnormality in the detection subject based on the Mahalanobis distance calculated by the controlling unit.

5. An image forming apparatus as a detection subject comprising an image forming unit that forms an image on a recording medium and an abnormality determining unit that determines presence of abnormality in the detection subject, wherein the abnormality determining apparatus according to claim 1 is used as the abnormality determining unit.

6. An abnormality determining apparatus comprising:
an information obtaining unit that obtains a plurality of various types of information relating to a detection subject;

an information storage unit that stores therein a set information group formed of an aggregate of pieces of set information, which is a combination of the various types of information;

a determining unit that determines presence of abnormality in the detection subject based on the set information group stored in the information storage unit and the various types of information obtained by the information obtaining unit; and a mode setting information input unit that inputs mode setting information indicative of setting of
- a storage mode in which a set information storage process is performed for storing the set information obtained by the information obtaining unit in the information storage unit as a part of the set information group, and
- a determination mode in which an abnormality determination process is performed for determining the presence of abnormality in the detection subject based on the set information group stored in the information storage unit and the various types of information obtained by the information obtaining unit; and a controlling unit that performs a processing corresponding to the mode setting information input by the mode setting information input unit, wherein the controlling unit determines whether an information value relating to at least a first information among the various information obtained by the information obtaining unit satisfies a predetermined condition, and if the information value relating to the first information satisfies the predetermined condition, deletes set information stored in a certain period going back from the point in time when the first information is obtained from the set information group.

7. The abnormality determining apparatus according to claim 6, further comprising an abnormality occurrence information input unit that inputs abnormality occurrence information indicative of occurrence of abnormality,
wherein the controlling unit deletes set information stored during a predetermined second period going back from input of the abnormality occurrence information from the set information group.

8. The abnormality determining apparatus according to claim 6, wherein the controlling unit calculates a Mahalanobis distance based on the set information group and the various types of information obtained by the information obtaining unit,
wherein determining unit that determines the presence of abnormality in the detection subject based on the Mahalanobis distance calculated by the controlling unit.

9. An image forming apparatus as a detection subject comprising an image forming unit that forms an image on a recording medium and an abnormality determining unit that determines presence of abnormality in the detection subject, wherein the abnormality determining apparatus according to claim 6 is used as the abnormality determining unit.

* * * * *